United States Patent
Satou et al.

(10) Patent No.: US 7,949,350 B2
(45) Date of Patent: May 24, 2011

(54) MOBILE COMMUNICATION SYSTEM FOR PROVIDING AREA INFORMATION TOGETHER WITH CONTROL INFORMATION

(75) Inventors: Hirotoshi Satou, Yokohama (JP); Masao Otsuka, Tokyo (JP); Koji Matsushita, Yokohama (JP); Sachiko Naito, Yokohama (JP); Hiroshi Tomozawa, Yokosuka (JP)

(73) Assignee: Evolium S.A.S., Paris (FR)

( * ) Notice: Subject to any disclaimer, the term of this patent is extended or adjusted under 35 U.S.C. 154(b) by 0 days.

(21) Appl. No.: 10/819,285

(22) Filed: Apr. 7, 2004

(65) Prior Publication Data

US 2004/0224673 A1 Nov. 11, 2004

(30) Foreign Application Priority Data

May 7, 2003 (JP) ................................. 2003-128568

(51) Int. Cl.
*H04W 24/00* (2009.01)
*H04M 11/04* (2006.01)

(52) U.S. Cl. ............... 455/456.3; 455/414.2; 455/414.3; 455/414.1; 455/404.2; 455/457; 455/446; 455/449; 455/425; 455/424; 455/456.2; 455/456.1

(58) Field of Classification Search ............... 455/414.2, 455/414.3, 456.1–456.3, 456.5
See application file for complete search history.

(56) References Cited

U.S. PATENT DOCUMENTS

| | | | |
|---|---|---|---|
| 5,790,953 A * | 8/1998 | Wang et al. | 455/435.3 |
| 6,108,533 A * | 8/2000 | Brohoff | 455/414.3 |
| 6,188,911 B1 * | 2/2001 | Wallentin et al. | 455/524 |
| 6,526,275 B1 * | 2/2003 | Calvert | 455/418 |
| 7,142,869 B2 * | 11/2006 | Juppi et al. | 455/456.1 |

FOREIGN PATENT DOCUMENTS

JP 2002183007 A * 6/2002

OTHER PUBLICATIONS

Patent Abstracts of Japan, Japanese Published Application No. 2002-183007 dated Jun. 28, 2003.

* cited by examiner

*Primary Examiner* — Charles N Appiah
*Assistant Examiner* — Emem Stephen
(74) *Attorney, Agent, or Firm* — Sughrue Mion, PLLC

(57) ABSTRACT

To provide a mobile communication system which can distribute area information from a radio Node to a mobile terminal in a unit of cell. A mobile communication system comprising: a radio Node having a plurality of cells; host apparatus connected to the radio Node so as to be able to communicate information with the radio Node; and a mobile terminal receiving information distributed from the radio Node, wherein area information different for each cell is distributed from the radio Node to the mobile terminals 40 existing in the cell included in the radio Node, the area information is transmitted, together with control information including type information added according to a content of the area information, from the host apparatus to the radio Node, and the cell to be distributed with the information is determined based on the type information.

2 Claims, 42 Drawing Sheets (PROCESSING FLOW OF RADIO NODE CONTROLLER)

(EXAMPLE IN WHICH RADIO NODE DETERMINES
THE CELL TO BE DISTRIBUTED WITH)

(EXAMPLE IN WHICH MOBILE EXCHANGE NETWORK OR THE NETWORK ELEMENT MANAGER DETERMINES THE CELL TO BE DISTRIBUTED WITH)

(PROCESSING FLOW OF MOBILE EXCHANGE NETWORK
OR THE NETWORKL ELEMENT MANAGER)

(EXAMPLE IN WHICH RADIO NODE CONTROLLER AND RADIO NODE DETERMINE THE CELL TO BE DISTRIBUTED WITH)

(EXAMPLE IN WHICH MOBILE EXCHENGE NETWORK OR NETWORK ELEMENT MANAGER, AND RADIO NODE CONTROLLER DETERMINE THE CELL TO BE DISTRIBUTED WITH)

(PROCESSING FLOW OF MOBILE EXCHANGE NETWORK OR THE NETWORK ELEMENT MANAGER)

(PROCESSING FLOW OF RADIO NODE CONTROLLER)

(PROCESSING FLOW OF RADIO NODE)

(EXAMPLE IN WHICH MOBILE EXCHENGE NETWORK OR NETWORK ELEMENT MANAGER, AND RADIO NODE DETERMINE THE CELL TO BE DISTRIBUTED WITH)

(PROCESSING FLOW OF MOBILE EXCHANGE NETWORK OR THE NETWORK ELEMENT MANAGER)

(PROCESSING FLOW OF RADIO NODE CONTROLLER)

(PROCESSING FLOW OF RADIO NODE)

(EXAMPLE IN WHICH MOBILE EXCHENGE NETWORK OR THE NETWORK ELEMENT MANAGER, RADIO NODE CONTROLLER AND RADIO NODE DETERMINE THE CELL TO BE DISTRIBUTED WITH)

(PROCESSING FLOW OF RADIO NODE)

(EXAMPLE IN WHICH RADIO NODE CONTROLLER
DETERMINES THE CELL TO BE DISTRIBUTED WITH)

(PROCESSING FLOW OF RADIO NODE CONTROLLER)

(EXAMPLE IN WHICH RADIO NODE DETERMINES
THE CELL TO BE DISTRIBUTED WITH)

(PROCESSING FLOW OF RADIO NODE)

(EXAMPLE IN WHICH MOBILE EXCHENGE NETWORK OR THE NETWORK ELEMENT MANAGER DETERMINES THE CELL TO BE DISTRIBUTED WITH)

(PROCESSING FLOW OF MOBILE EXCHANGE NETWORK
OR THE NETWORK ELEMENT MANAGER)

(EXAMPLE IN WHICH RADIO NODE CONTROLLER AND RADIO NODE DETERMINE THE CELL TO BE DISTRIBUTED WITH)

(EXAMPLE IN WHICH MOBILE EXCHENGE NETWORK OR NETWORK ELEMENT MANAGER, AND RADIO NODE CONTROLLER DETERMINE THE CELL TO BE DISTRIBUTED WITH)

(PROCESSING FLOW OF RADIO NODE)

(EXAMPLE IN WHICH MOBILE EXCHANGE NETWORK OR THE NETWORK ELEMENT MANAGER, AND RADIO NODE DETERMINE THE CELL TO BE DISTRIBUTED WITH)

(PROCESSING FLOW OF RADIO NODE)

(EXAMPLE IN WHICH MOBILE EXCHENGE NETWORK OR THE NETWORK ELEMENT MANAGER, RADIO NODE CONTROLLER AND RADIO NODE DETERMINE THE CELL TO BE DISTRIBUTED WITH)

(PROCESSING FLOW OF RADIO NODE)

MOBILE COMMUNICATION SYSTEM FOR PROVIDING AREA INFORMATION TOGETHER WITH CONTROL INFORMATION

FIELD OF INVENTION

The present invention relates to a mobile communication system, and more specifically, relates to a mobile communication system having a radio Node having a plurality of cells (or sectors), host apparatus connected to the radio Node so as to be able to communicate information with the radio Node, and a mobile terminal receiving information distributed from the radio Node, wherein area information different for each cell is distributed from the radio Node to the mobile terminal existing in the cell included in the radio Node. The invention is based on a priority application JP 2003-128568 which is hereby incorporated by reference.

PRIOR ART

For example, the method of distributing to a mobile terminal the area information, being information relating to a specific communication area in the mobile communication system, in which the mobile terminal exists, includes a method of carrying the area information in report information in a unit of radio Node and distributing the area information. Here, the area information is information relating to a specific communication area, such as weather information, traffic jam information or advertising information. The report information is information including the system condition and a call connection signal, regularly transmitted from the radio Node to the mobile terminal existing in the cells included in the radio Node.

The conventional distribution method of the area information in the mobile communication system is for distributing the area information in a unit of radio Node, and cannot distribute the area information in a unit of cell. Therefore, information relating to other cells, which is not required for a user of the mobile terminal existing in the cell is also distributed. Moreover, the mobile terminal cannot select only the necessary area information, being information relating to the cell in which the mobile terminal exists, with respect to the area information distributed from the radio Node.

Therefore, the mobile terminal also receives unnecessary area information, and hence the time for reception processing and power consumption increase, and according to circumstances, mental anguish is given to the user of the mobile terminal. On the other hand, since the radio Node distributes unnecessary area information to the mobile terminal, useless resources relating to the distribution of the area information increase, thereby increasing a load. Therefore, distribution of the area information becomes a main cause resulting in insufficient resources causing congestion.

Further, as another method, Japanese Patent Application Laying Open (KOKAI) No. 2002-183007 discloses a limited information providing method, in which an information transmission apparatus is installed at a place for transmitting information, to transmit information to a mobile phone which comes into the information providing area. With such a method, the information transmission apparatus must be installed other than the radio Node for ordinary communication performed by the mobile terminal, which requires the cost for equipment investment.

[Patent Document 1]
Japanese Patent Application Laying Open (KOKAI) No. 2002-183007

PROBLEMS TO BE SOLVED BY THE INVENTION

In view of the above problems, it is an object of the present invention to provide a mobile communication system, which can distribute to a mobile terminal only the necessary area information relating to the cell (or the sector) in which the mobile terminal to be distributed exists, in a limited manner, by distributing the area information to the mobile terminal from a radio Node in a unit of cell (or sector), and can improve the use efficiency of the resources such as radio Nodes and radio Node controllers or the like, and save the resources in the whole system.

MEANS FOR SOLVING THE PROBLEMS

In order to achieve the above object, the mobile communication system according to claim 1 is a mobile communication system comprising: a radio Node having a plurality of cells; host apparatus connected to the radio Node so as to be able to communicate information with the radio Node; and a mobile terminal receiving information distributed from the radio Node, characterized in that area information different for each cell is distributed from the radio Node to the mobile terminals existing in the cell included in the radio Node, the area information is transmitted, together with control information including type information added according to a content of the area information, from the host apparatus to the radio Node, and the cell to which each area information is to be distributed is determined based on the type information.

By this mode, the cell to which each area information is to be distributed is determined based on the type information added according to the content of the area information. Therefore, the area information can be distributed to the mobile terminal from the radio Node in a unit of cell, to prevent unnecessary distribution of the area information to the mobile terminal, and the use efficiency of the resources such as radio Nodes and radio Node controllers can be improved, and the resources in the whole system can be saved.

The mobile communication system according to claim 2 is characterized in that the area information is carried in report information and distributed to the mobile terminal.

By this mode, the area information can be carried in the report information and distributed to the mobile terminal without setting up special information for distribution of the area information.

The mobile communication system according to claim 3 is characterized in that the area information is carried in an area information distribution message irrelevant to the report information and distributed to the mobile terminal.

By this mode, the area information can be distributed to the mobile terminal, freely at any timing irrelevant to the report information.

The mobile communication system according to claim 4 is characterized in that the host apparatus includes a radio Node controller, and a mobile exchange network or a network element manager; the radio Node controller is connected to a plurality of radio Nodes so as to be able to communicate information with the radio Nodes, and corresponds to the host apparatus for the radio Nodes; and the mobile exchange network or the network element manager is connected to a plurality of radio Node controllers so as to be able to communicate information with the radio Node controllers, the mobile exchange network or the network element manager corresponding to the host apparatus for the radio Node controllers and being a distribution source of the area information; and either one of the radio Node, the radio Node controller, and the mobile exchange network or the network element manager performs determination of the cell to which the area information is to be distributed based on the type information.

In the mode in which the radio Node determines the cell to be distributed with the information, the load due to the processing relating to the distribution of area information can be prevented from increasing with respect to the radio Node controller, and the mobile exchange network or the network element manager, being the host apparatus controlling the whole mobile communication system.

In the mode in which the radio Node controller determines the cell to be distributed with the information, it is not necessary to provide means necessary for determining the cell to be distributed with the information (an information notification matrix table), respectively, in each of the plurality of radio Nodes, and hence the cost for equipment investment can be reduced.

In the mode in which the mobile exchange network or the network element manager determines the cell to be distributed with the information, since the host apparatus determines the cell to which the area information is to be distributed, transmission of the area information not required to transmit to the radio Node controller, the radio Node and the mobile terminal via the line can be reduced, and as a result, wasteful use of the line by useless information transmission can be prevented.

The mobile communication system according to claim 5 is characterized in that the host apparatus includes a radio Node controller, and a mobile exchange network or a network element manager; the radio Node controller is connected to a plurality of radio Nodes so as to be able to communicate information with the radio Nodes, and corresponds to the host apparatus for the radio Node; and the mobile exchange network or the network element manager is connected to a plurality of radio Node controllers so as to be able to communicate information with the radio Node controllers, the mobile exchange network or the network element manager corresponding to the host apparatus for the radio Node controllers and being a distribution source of the area information, and determination of the cell to which the area information is to be distributed based on the type information is performed by an arbitrary combination of the radio Node, the radio Node controller, and the mobile exchange network or the network element manager, the apparatus corresponding to the uppermost apparatus in the arbitrary combination determines the cell to which the area information is to be distributed based on the type information, sets up in the control information the searched information indicating that the cell has been determined, and transmits the area information together with the control information to the lower apparatus, the lower apparatus having received the area information checks if the searched information has been set up in the control information, and when the searched information has been set up, the lower apparatus distributes the area information to a lower apparatus including the cell to be distributed with the information or to the cell to be distributed with the information, without performing determination of the cell to be distributed with the information based on the type information, and when the searched information has not been set up, the lower apparatus performs determination of the cell to be distributed with the information based on the type information, sets up in the control information the searched information indicating that the cell has been determined, and distributes the area information to the lower apparatus including the cell to be distributed with the information or to the cell to be distributed with the information.

By this mode, determination of the cell to be distributed with the information based on the type information can be performed by an arbitrary combination of apparatus, thereby increasing the degree of the freedom in the system design. Further, when the host apparatus has already determined the cell to be distributed with the information, it can be prevented that the lower apparatus again performs determination of the cell to be distributed with the information. As a result, the load due to the processing relating to the area information distribution can be prevented from increasing, thereby the cost for equipment investment can be reduced and the line use can be saved.

The embodiments of the mobile communication system of the present invention will be described in detail, with reference to the drawings.

EMBODIMENTS OF THE INVENTION

FIG. 1 is a system block diagram showing the configuration of the mobile communication system according to the present invention.

As shown in FIG. 1, the mobile communication system according to the present invention includes a network element manager (NEM) 50, a mobile exchange network (CN) 10, a plurality of radio Node controllers (RNC) 20-1 and 20-2, a plurality of radio Nodes (Nodes B) 30-1 and 30-2, and a mobile terminal (UE) 40 performing radio communication with the radio Nodes 30-1 and 30-2 in a cell (or a sector) included in the radio Nodes 30-1 and 30-2.

The mobile terminal 40 has a Radio transmitter-receiver, and is generally a mobile phone or personal information-processing equipment, which is carried by a user and can be moved geographically, but also includes a fixed telephone fixed and installed geographically. The radio Node controllers 20-1 and 20-2 are the host apparatus with respect to the radio Nodes 30-1 and 30-2, and the mobile exchange network 10 and the network element manager 50 are the host apparatus with respect to the radio Node controllers 20-1 and 20-2.

The area information is information of area relating to the cell included in the radio Nodes 30-1 and 30-2, such as weather information, traffic jam information, or advertising information, and the network element manager 50 is the distribution source of the area information.

The arrangement and function of the respective constituents of the mobile communication system according to the present invention shown in FIG. 1 will be described below.

The mobile exchange network 10 connects a plurality of radio Node controllers 20-1, 20-2, and the network element manager (NEM) 50, so as to be able to communicate information with each other. The radio Node controllers 20-1, 20-2 are also connected with a line directly or via an exchanger. Moreover, the radio Node controllers 20-1, 20-2 are connected with a plurality of radio Nodes 30-1, 30-2, so as to be able to communicate information with each other. The operation of the radio Nodes 30-1 and 30-2, such as start and stop of transmission of a radio signal is controlled by the radio Node controllers 20-1 and 20-2. The radio Nodes 30-1 and 30-2 regularly transmit a report signal, being report information including a signal indicating the system condition and a call connection signal, to the mobile terminals existing in the radio communication area consisting of a plurality of cells (or sectors).

The mobile terminal 40 existing in the cell receives the report information regularly, and monitors the system condition, for example, in which cell in the radio Nodes 30-1, 30-2 the mobile terminal 40 exists, and the presence or absence of the call connection signal to the mobile terminal.

FIG. 2 is a diagram showing the configuration of the radio Node controller (RNC) 20 in the mobile communication system of the present invention.

In FIG. 2, the radio Node controller (RNC) 20 comprises a control monitoring section 201, a radio Node monitoring section 202 connected to the control monitoring section 201, a report signal generating section 203, a switch 204, and line termination sections 205 and 206. When the radio Node controller 20 determines the cell to which the area information is to be distributed based on the type information, the radio Node controller 20 includes an information notification matrix table described later.

The control monitoring section 201 has a function of performing monitoring and control of the overall condition of the radio Node controller 20, controls the radio Node monitoring section 202, the report signal generating section 203, the switch 204, and the line termination sections 205 and 206, and monitors the traffic in the radio Node controller 20. The radio Node monitoring section 202 has a function of monitoring the condition of the radio Node (Node B) 30 connected to a subordinate controlled by the radio Node controller 20, and monitoring the traffic. The report signal generating section 203 has a function of editing a new report signal, when the system condition changes, and it becomes necessary to change the report signal, being the report information transmitted from either one of the plurality of radio Nodes 30-1 and 30-2 to the mobile terminal 40.

The switch 204 has a function of switching the connection between the line termination section 205 and the line termination section 206. The line termination section 205 is for terminating the connection line between the radio Nodes 30-1, 30-2 and the mobile terminal 40, and has a function of terminating a communication protocol and a radio signal encoding and decoding function. The line termination section 206 is for terminating the connection line between the host apparatus such as the mobile exchange network 10 or the network element manager 50 and other radio Node controllers, and has a function of terminating the communication protocol.

FIG. 3 is a diagram showing the configuration of the radio Node (Node B) 30 in the mobile communication system of the present invention.

The radio Node (Node B) shown in FIG. 3 comprises a control monitoring section 301, a report signal generating section 302 connected to the control monitoring section 301, a bearer signal transfer section 303, a Radio transmitter-receiver 304, and a line termination section 305. When the radio Node 30 determines the cell to which the area information is to be distributed based on the type information, the radio Node 30 includes the information notification matrix table described later.

The control monitoring section 301 has a function of performing monitoring and control of the overall condition of the radio Node (Node B) 30, and controls the report signal generating section 302, the bearer signal transfer section 303, the Radio transmitter-receiver 304, and the line termination section 305. The report signal generating section 302 has a function of editing a new report signal, when the system condition changes, and it becomes necessary to change the report signal, transmitted by radio from the radio Node 30, and a function of distributing the generated report signal onto the air via the radio transmitter receiver 304. The bearer signal transfer section 303 has a function of distributing the signal from the mobile terminal received from the Radio transmitter-receiver 304 to the radio Node controller 20 via the line termination section 305, and a function of distributing a signal to the mobile terminal received via the line termination section 305, via the Radio transmitter-receiver 304.

The Radio transmitter-receiver 304 is for terminating the radio connection line with the mobile terminal 40, and has a function of terminating a radio communication protocol. The line termination section 304 is for terminating the connection line with the radio Node controller 20, and has a function of terminating the communication protocol.

FIG. 4 is a diagram showing the configuration of the mobile terminal 40 in the mobile communication system of the present invention.

The mobile terminal 40 shown in FIG. 4 comprises a control monitoring section 401, a man-machine interface (MMI) section 402 connected to the control monitoring section 401, a report signal receiving section 403, a message signal transmitter-receiver 404, a voice signal transmitter-receiver 405, a data signal transmitter-receiver 406, and Radio transmitter-receiver 407.

The control monitoring section 401 has a function of performing monitoring and control of the overall condition of the mobile terminal 40, and controls the man-machine interface (MMI) section 402, the report signal receiving section 403, the message signal transmitter-receiver 404, the voice signal transmitter-receiver 405, the data signal transmitter-receiver 406, and the Radio transmitter-receiver 407. The man-machine interface (MMI) section 402 has a function of controlling the man-machine interface, and comprises a display 4021, an input key 4022, a speaker 4023 and a microphone 4024. The report signal receiving section 403 has a function of accumulating the newest report signal. The message signal transmitter-receiver 404 has a function of transmitting and receiving a point-to-point message. The voice signal transmitter-receiver 405 has a function of transmitting and receiving a point-to-point voice signal.

The data signal transmitter-receiver 406 has a function of transmitting and receiving a point-to-point data communication signal. The Radio transmitter-receiver 407 is for terminating the radio line with the respective radio Nodes 30 and the respective radio Node controllers 20, and has a radio signal encoding and decoding function, and a function of terminating the communication protocol.

FIG. 5 and FIG. 6 are diagrams showing one example of data organization of the area information in the mobile communication system of the present invention.

The area information shown in FIG. 5 and FIG. 6 respectively has control data and area information (main body), and a difference between the area information shown in FIG. 5 and FIG. 6 resides in the content of the control data. That is, FIG. 5 shows the area information in the case where the area information is carried in the report information and distributed, and the control data includes a search flag, cell information, category types and group types. Here, the category type and the group type stand for the type information added corresponding to the content of the area information. On the other hand, FIG. 6 shows the area information in the case where the area information is carried in the area information distribution message irrelevant to the report information and distributed, and the control data does not include the cell information, and includes only the search flag, category types and group types.

The cell information herein stands for the information for recognizing where the own cell is located (to which radio Node 30 the own cell is connected). That is, the radio Node 30 uses the cell information as the information representing the subordinate cell, the radio Node controller 20 uses the cell information as the information representing the subordinate radio Node 30, and the mobile exchange network 10 or the network element manager 50 uses the cell information as the information representing the subordinate radio Node controller 20.

The report information is basically distributed to all the connected cells without specifying the cell. Therefore, for the area information carried in the report information and distributed as shown in FIG. 5, this cell information is required for recognizing the cell to which the area information is to be distributed. On the other hand, since the area information distribution message is for transmitting the message only to the cell to which the area information is to be distributed, such cell information is not required for the area information carried in the area information distribution message irrelevant to the report information and distributed, as shown in FIG. 6.

The search flag is a flag indicating whether the category type and group type in the area information has been already searched for by the host apparatus. If the host apparatus has already searched for the category type and the group type and determined the cell to be distributed with the information, the search flag is set, and the lower apparatus having received the area information in which the search flag is set does not search for the category type and the group type again.

The category type indicates the category of area information, and the group type indicates a group associated with the correspondence to which cell the area information of each category classified by the category type is to be distributed, and the correspondence between the respective groups and the cells to be distributed is shown in FIG. 8.

FIG. 7 is a diagram showing the data organization of the report information when the area information shown in FIG. 5 is carried in the report information and distributed.

The area information is distributed to the mobile terminal, with the area information comprising the control data and the area information (main body) shown in FIG. 5 being carried in an unused area in the report information shown in FIG. 7.

FIG. 8 is an example showing the information notification matrix table indicating the correspondence between the group type of the area information and the cell to be distributed with the information, in the mobile communication system of the present invention.

In the example shown in FIG. 8, the information notification matrix table is shown, wherein to which cell (1 to 4) the area information is to be distributed is defined by group (a to c) in the respective information categories.

The area information shown in FIG. 8 is classified by category, and the information notification matrix table is defined. The category herein is a content category of the area information, such as category 1 (weather information), category 2 (traffic jam information) and category 3 (other information). In the respective information notification matrix tables, for example, in the case of the weather information table in category 1 shown in FIG. 8, the correspondence between the cells to be distributed and the group by category type of the respective area information is defined, such that group a (for example, sunny weather information) is to be distributed to cells 1 to 3, but it is not necessary to distribute the information to cell 4, and group b (for example rainy weather information) is to be distributed to cells 1 to 2, but it is not necessary to distribute the information to cells 3 to 4. However, as the group type, it is possible to use the one obtained by subdividing the content of the area information to be distributed, such as weather information in a certain time zone, or rainfall probability.

In order to distribute the area information to the required cells according to the category, the radio Node 30, the radio Node controller 20, or the mobile exchange network 10 or the network element manager 50 can have the information notification matrix table. It is predetermined to which radio Node 30 the cell is connected, by which radio Node controller 20 the radio Node 30 is controlled, and to which mobile exchange network 10 or the network element manager 50 the radio Node controller 20 is connected.

When the apparatus having the information notification matrix table receives the area information, the apparatus reads the category type and group type from the control data in the area information, and confirms whether the data of the cell to be distributed with the information corresponding to the read category type and group type exists in the information notification matrix table.

When the data exists, the area information is distributed (or a distribution request is transmitted) to the apparatus having the cell specified by the data (in the case of radio Node 30, to the mobile terminal 40 existing in the cell specified by the data; in the case of the radio Node controller 20, to the radio Node 30 having the cell specified by the data; in the case of the mobile exchange network 10 or the network element manager 50, to the radio Node controller 20 controlling the radio Node 30 having the cell specified by the data).

When the search flag has been set in the control data, since the host apparatus has determined the cell to be distributed with the information, corresponding to the category type and the group type, the area information is transmitted to the specified cell or to the radio Node having the specified cell, without conducting the processing relating to the determination of the cell to be distributed with the information.

The operation of the mobile communication system according to the present invention will be described, with reference to the drawings.

At first, the embodiment in which the area information is carried in the report information and distributed will be described with reference to FIG. 9 to FIG. 22B.

FIG. 9 shows a sequence example in which the radio Node controller (RNC) 20 comprises the information notification matrix table, and executes the determination of the cell (or the sector) to be distributed. FIG. 10 shows an example of the processing flow executed by the radio Node controller 20.

According to the sequence example shown in FIG. 9, the mobile exchange network 10 or the network element manager 50 transmits the area information including the control data to all the radio Node controllers 20 connected thereto (A1). The radio Node controller 20 having received this area information uses the control data included in the transmitted area information to refer to the information notification matrix table, and when the cell to be distributed with the information is determined, transmits the area information to the radio Node 30 including the cell to be distributed with the information, and when the cell to be distributed with the information is not determined, transmits the area information to all the radio Nodes 30 controlled by the radio Node controller 20 (A2). The radio Node 30 having received the area information distributes the area information carried in the report information to the determined cell when the cell to be distributed with the information has been determined, and to all the cells when the cell to be distributed with the information has not been determined (A3).

According to the processing flow executed by the radio Node controller 20 shown in FIG. 10, the radio Node controller 20 receives the area information from the mobile exchange network 10 or the network element manager 50, being the host apparatus (step A11). The radio Node controller 20 reads the category type and group type included in the control data in the received area information (step A12). Moreover, the radio Node controller 20 confirms whether the data of the cell to be distributed with the information corresponding to the read category type and group type exists in the information notification matrix table (step A13).

When the data exists, the radio Node controller 20 transmits the area information including the control data to the radio Node 30 including the cell to be distributed with the information (step A14), and the radio Node 30 having received this area information distributes the area information carried in the report information to the cell to be distributed with the information.

When the data does not exist, the radio Node controller 20 transmits the area information including the control data to all the radio Nodes 30 controlled by the radio Node controller 20 (step A15), and the radio Node 30 having received this area information distributes the area information carried in the report information to all the cells.

The mobile terminal 40 existing in the cell to which the area information is distributed will receive the area information.

FIG. 11 shows a sequence example in which the radio Node (Node B) 30 has the information notification matrix table, and determines the cell to be distributed with the information. FIG. 12 shows an example of the processing flow executed by the radio Node 30.

According to the sequence example shown in FIG. 11, the mobile exchange network 10 or the network element manager 50 transmits the area information including the control data to all the radio Node controllers 20 connected thereto (B1). The radio Node controller 20 having received this area information transmits the area information to all the radio Nodes 30 controlled by the radio Node controller 20 (B2). The radio Node 30 having received the area information uses the control data included in the transmitted area information to refer to the information notification matrix table, and when the cell to be distributed with the information is determined, transmits the area information to the cell to be distributed with the information, and when the cell to be distributed with the information is not determined, transmits the area information carried in the report information to all the cells (B3).

According to the processing flow executed by the radio Node 30 shown in FIG. 12, the radio Node 30 receives the area information from the radio Node controller 20, being the host apparatus (step B11). The radio Node 30 reads the category type and group type included in the received control data (step B12). Moreover, the radio Node 30 confirms whether the data of the cell to be distributed with the information, corresponding to the read category type and group type exists in the information notification matrix table (step B13).

When the data exists, the radio Node 30 distributes the area information carried in the report information to the cell to be distributed with the information (step B14), and when the data does not exist, the radio Node 30 distributes the area information carried in the report information to all the cells (step B15).

The mobile terminal 40 existing in the cell to which the area information is distributed will receive the area information.

FIG. 13 shows a sequence example in which the mobile exchange network (CN) 10 or the network element manager (NEM) 50 has the information notification matrix table, and executes determination of the cell to be distributed with the information. FIG. 14 shows an example of the processing flow executed by the mobile exchange network (CN) 10 or the network element manager (NEM) 50.

According to the sequence example shown in FIG. 13, the mobile exchange network 10 or the network element manager 50 uses the control data included in the area information to refer to the information notification matrix table, and when the cell to be distributed with the information is determined, transmits the area information to the radio Node controller 20 controlling the radio Node 30 including the cell to be distributed with the information, and when the cell to be distributed with the information is not determined, transmits the area information to all the radio Node controllers 20 (C1).

The radio Node controller 20 having received the area information transmits the area information to the radio Node 30 including the determined cell when the cell to be distributed with the information has been determined, or to all the radio Nodes 30 when the cell to be distributed with the information has not been determined (C2). The radio Node 30 having received the area information distributes the area information carried in the report information to the determined cell when the cell to be distributed with the information has been determined, or to all the cells when the cell to be distributed with the information has not been determined (C3).

According to the processing flow executed by the mobile exchange network 10 or the network element manager 50 shown in FIG. 14, when a distribution request of the area information is generated (step C11), the mobile exchange network 10 or the network element manager 50 reads the category type and group type included in the control data in the area information (step C12). Moreover, the mobile exchange network 10 or the network element manager 50 confirms whether the data of the cell to be distributed with the information, corresponding to the read category type and group type exists in the information notification matrix table (step C13).

When the data exists, the mobile exchange network 10 or the network element manager 50 transmits the area information including the control data to the radio Node controller 20 controlling the radio Node 30 including the cell to be distributed with the information (step C14). The radio Node controller 20 having received the area information transmits the area information including the control data to the radio Node 30 including the cell to be distributed with the information. The radio Node 30 having received this area information distributes the area information carried in the report information to the cell to be distributed with the information.

When the data does not exist, the mobile exchange network 10 or the network element manager 50 transmits the area information including the control data to all the radio Node controllers 20 controlled by the mobile exchange network 10 or the network element manager 50 (step C15). The radio Node controller 20 having received the area information transmits the area information including the control data to all the radio Nodes 30 controlled by the radio Node controller 20 (step C15). The radio Node 30 having received the area information distributes the area information carried in the report information to all the cells.

The mobile terminal 40 existing in the cell to which the area information is distributed will receive the area information.

Next, explanation will be given to an embodiment in which the cell to be distributed with the information is determined by a combination of either two of the mobile exchange network (CN) 10 or the network element manager (NEM) 50, the radio Node controller 20, and the radio Node 30.

FIG. 15 is a sequence example in which the radio Node controller 20 and the radio Node 30 respectively have the information notification matrix tables, and execute determination of the cell (or the sector) to be distributed. FIG. 16 shows an example of the processing flow executed by the radio Node controller 20 and the radio Node 30.

According to the sequence example shown in FIG. 15, the mobile exchange network 10 or the network element manager 50 transmits the area information including the control data to all the radio Node controllers 20 connected thereto (D1). The radio Node controller 20 having received this area information uses the control data included in the transmitted area information to refer to the information notification matrix table, and when the cell to be distributed with the information is determined, sets the search flag and transmits the area information to the radio Node 30 including the cell to be distributed with the information, and when the cell to be distributed with the information is not determined, transmits the area information to all the radio Nodes 30 controlled by the radio Node controller 20 (D2).

When the search flag has been set, the radio Node 30 having received the area information distributes the area information carried in the report information to the determined cell, and when the search flag has not been set, uses the control data included in the transmitted area information to refer to the information notification matrix table, and when the cell to be distributed with the information is determined, distributes the area information carried in the report information to the determined cell, or to all the cells when the cell to be distributed with the information is not determined (D3).

According to the processing flow executed by the radio Node controller 20 and the radio Node 30 shown in FIG. 16, the radio Node controller 20 receives the area information including the control data from the mobile exchange network 10 or the network element manager 50, being the host apparatus (step D11). The radio Node controller 20 reads the category type and group type included in the received control data (step D12). Moreover, the radio Node controller 20 confirms whether the data of the cell to be distributed with the information, corresponding to the read category type and group type exists in the information notification matrix table (step D13).

When the data exists, the radio Node controller 20 sets the search flag in the control data (step D14) and transmits the area information including the control data to the radio Node 30 including the cell to be distributed with the information (step D15). When the data does not exist, the radio Node controller 20 transmits the area information including the control data to all the radio Nodes 30 controlled by the radio Node controller 20 (step D16).

The radio Node 30 receives the area information from the radio Node controller 20, being the host apparatus (step D21). The radio Node 30 then reads the search flag, the category type and the group type included in the received control data (step D22).

The radio Node 30 confirms whether the search flag has been set (step D23). When the search flag has been set, the radio Node 30 distributes the area information carried in the report information to the cell to be distributed with the information (step D27). When the search flag has not been set, the radio Node 30 confirms whether the data of the cell to be distributed with the information corresponding to the read category type and group type exists in the information notification matrix table (step D24).

When the data exists, the radio Node 30 distributes the area information carried in the report information to the cell to be distributed with the information (step D25). When the data does not exist, the radio Node 30 distributes the area information carried in the report information to all the cells (step D26).

The mobile terminal 40 existing in the cell to which the area information is distributed will receive the area information.

FIG. 17 shows a sequence example in which the mobile exchange network 10 or the network element manager 50, and the radio Node controller 20 respectively have the information notification matrix tables, and execute determination of the cell to be distributed with the information. FIG. 18A shows an example of the processing flow executed by the mobile exchange network 10 or the network element manager 50 and the radio Node controller 20, and FIG. 18B shows an example of the processing flow executed by the radio Node 30.

According to the sequence example shown in FIG. 17, firstly, the mobile exchange network 10 or the network element manager 50 uses the control data included in the transmitted area information to refer to the information notification matrix table, and when the cell to be distributed with the information is determined, sets the search flag and transmits the area information to the radio Node controller 20 controlling the radio Node 30 including the cell to be distributed with the information, and when the cell to be distributed with the information is not determined, transmits the area information to all the radio Node controllers 20 (E1).

When the search flag has been set, the radio Node controller 20 having received the area information transmits the area information to the radio Node 30 including the determined cell, and when the search flag has not been set, uses the control data included in the transmitted area information to refer to the information notification matrix table, and when the cell to be distributed with the information is determined, transmits the area information to the radio Node 30 including the determined cell, or to all the radio Nodes 30 when the cell to be distributed with the information is not determined (E2).

The radio Node 30 having received the area information distributes the area information carried in the report information to the determined cell when the cell to be distributed with the information is determined, or to all the cells when the cell to be distributed with the information is not determined (E3).

According to the processing flow executed by the mobile exchange network 10 or the network element manager 50 and the radio Node controller 20 shown in FIG. 18A, when a distribution request of the area information is generated (step E11), the mobile exchange network 10 or the network element manager 50 reads the category type and group type included in the received control data (step E12). Moreover, the mobile exchange network 10 or the network element manager 50 confirms whether the data of the cell to be distributed with the information corresponding to the read category type and group type exists in the information notification matrix table (step E13).

When the data exists, the mobile exchange network 10 or the network element manager 50 sets the search flag in the control data (step E14) and transmits the area information including the control data to the radio Node controller 20 controlling the radio Node 30 including the cell to be distributed with the information (step E15). When the data does not exist, the mobile exchange network 10 or the network element manager 50 transmits the area information including the control data to all the radio Node controllers 20 controlled by the mobile exchange network 10 or the network element manager 50 (step E16).

The radio Node controller 20 receives the area information from the mobile exchange network 10 or the network element manager 50, being the host apparatus (step E21). The radio Node controller 20 then reads the search flag, the category type and the group type included in the received control data (step E22).

The radio Node controller 20 confirms whether the search flag has been set (step E23). When the search flag has been set, the radio Node controller 20 transmits the area information to the radio Node 30 including the cell to be distributed with the information (step E27). When the search flag has not been set, the radio Node controller 20 confirms whether the data of the cell to be distributed with the information corresponding to the read category type and group type exists in the information notification matrix table (step E24).

When the data exists, the radio Node controller 20 transmits the area information to the radio Node 30 including the cell to be distributed with the information (step E25). When the data does not exist, the radio Node controller 20 transmits the area information to all the radio Nodes 30 controlled by the radio Node controller 20 (step E26).

According to the processing flow executed by the radio Node 30 shown in FIG. 18B, the radio Node 30 receives the area information from the radio Node controller 20, being the host apparatus (step E31). When the cell to be distributed with the information is determined, the radio Node 30 distributes the area information carried in the report information to the cell to be distributed with the information, and when the cell to be distributed with the information is not determined, distributes the area information carried in the report information to all the cells (step E32).

The mobile terminal 40 existing in the cell to which the area information is distributed will receive the area information.

FIG. 19 shows a sequence example in which the mobile exchange network 10 or the network element manager 50, and the radio Node 30 respectively have the information notification matrix tables, and execute determination of the cell to be distributed with the information. FIG. 20A shows an example of the processing flow executed by the mobile exchange network 10 or the network element manager 50 and the radio Node controller 20, and FIG. 20B shows an example of the processing flow executed by the radio Node 30.

According to the sequence example shown in FIG. 19, the mobile exchange network 10 or the network element manager 50 uses the control data included in the transmitted area information to refer to the information notification matrix table, and when the cell to be distributed with the information is determined, sets the search flag and transmits the area information to the radio Node controller 20 controlling the radio Node 30 including the cell to be distributed with the information, and when the cell to be distributed with the information is not determined, transmits the area information to all the radio Node controllers 20 (F1).

The radio Node controller 20 having received the area information transmits the area information to the radio Node 30 including the determined cell when the cell to be distributed with the information has been determined, and when the cell to be distributed with the information has not been determined, transmits the area information to all the radio Nodes 30 (F2).

When the search flag has been set, the radio Node 30 having received the area information distributes the area information carried in the report information to the determined cell, and when the search flag has not been set, uses the control data included in the transmitted area information to refer to the information notification matrix table, and when the cell to be distributed with the information is determined, distributes the area information carried in the report information to the determined cell, or to all the cells when the cell to be distributed with the information is not determined (F3).

According to the processing flow executed by the mobile exchange network 10 or the network element manager 50 and the radio Node controller 20 shown in FIG. 20A, when a distribution request of the area information is generated (step F11), the mobile exchange network 10 or the network element manager 50 reads the category type and group type included in the received control data (step F12). Moreover, the mobile exchange network 10 or the network element manager 50 confirms whether the data of the cell to be distributed with the information corresponding to the read category type and group type exists in the information notification matrix table (step F13).

When the data exists, the mobile exchange network 10 or the network element manager 50 sets the search flag in the control data (step F14) and transmits the area information including the control data to the radio Node controller 20 controlling the radio Node 30 including the cell to be distributed with the information (step F15). When the data does not exist, the mobile exchange network 10 or the network element manager 50 transmits the area information including the control data to all the radio Node controllers 20 controlled by the mobile exchange network 10 or the network element manager 50 (step F16).

The radio Node controller 20 receives the area information from the mobile exchange network 10 or the network element manager 50, being the host apparatus (step F21). When the cell to be distributed with the information has been determined, the radio Node controller 20 transmits the area information including the control data to the radio Node 30 including the cell, and when the cell to be distributed with the information has not been determined, transmits the area information including the control data to all the radio Nodes 30 controlled by the radio Node controller 20 (step F22).

According to the processing flow executed by the radio Node 30 shown in FIG. 20B, the radio Node 30 receives the area information from the radio Node controller 20, being the host apparatus (step F31). The radio Node 30 then reads the search flag, the category type and the group type included in the received control data (step F32).

The radio Node 30 further confirms whether the search flag has been set (step F33). When the search flag has been set, the radio Node 30 distributes the area information carried in the report information to the cell to be distributed with the information (step F37). When the search flag has not been set, the radio Node 30 confirms whether the data of the cell to be distributed with the information corresponding to the read category type and group type exists in the information notification matrix table (step F34).

When the data exists, the radio Node 30 distributes the area information carried in the report information to the cell to be distributed with the information (step F35). When the data does not exist, the radio Node 30 distributes the area information carried in the report information to all the cells (step F36).

The mobile terminal 40 existing in the cell to which the area information is distributed will receive the area information.

Next, explanation will be given to an embodiment in which the cell to be distributed with the information is determined by the mobile exchange network (CN) 10 or the network element manager (NEM) 50, the radio Node controller 20, and the radio Node 30.

FIG. 21 is a sequence example in which the mobile exchange network 10 or the network element manager 50, the radio Node controller 20 and the radio Node 30 respectively have the information notification matrix tables, and execute determination of the cell to be distributed with the information. FIG. 22A shows an example of the processing flow executed by the mobile exchange network 10 or the network element manager 50, and the radio Node controller 20, and FIG. 22B shows an example of the processing flow executed by the radio Node 30.

According to the sequence example shown in FIG. 21, the mobile exchange network 10 or the network element manager 50 uses the control data included in the area information to refer to the information notification matrix table, and when the cell to be distributed with the information is determined, sets the search flag and transmits the area information to the radio Node controller 20 controlling the radio Node 30 including the cell to be distributed with the information, and when the cell to be distributed with the information is not determined, transmits the area information to all the radio Node controllers 20 (G1).

When the search flag has been set, the radio Node controller 20 having received the area information transmits the area information to the radio Node 30 including the determined cell, and when the search flag has not been set, uses the control data included in the transmitted area information to refer to the information notification matrix table, and when the cell to be distributed with the information is determined, sets the search flag and transmits the area information to the radio Node 30 including the determined cell, or to all the radio Nodes 30 when the cell to be distributed with the information is not determined (G2).

When the search flag has been set, the radio Node 30 having received the area information distributes the area information carried in the report information to the determined cell, and when the search flag has not been set, uses the control data included in the transmitted area information to refer to the information notification matrix table, and when the cell to be distributed with the information is determined, distributes the area information carried in the report information to the determined cell, or to all the cells when the cell to be distributed with the information is not determined (G3).

According to the processing flow executed by the mobile exchange network 10 or the network element manager 50, and the radio Node controller 20 shown in FIG. 22A, when a distribution request of the area information is generated (step G11), the mobile exchange network 10 or the network element manager 50 reads the category type and group type included in the received control data (step G12). Moreover, the mobile exchange network 10 or the network element manager 50 confirms whether the data of the cell to be distributed with the information corresponding to the read category type and group type exists in the information notification matrix table (step G13).

When the data exists, the mobile exchange network 10 or the network element manager 50 sets the search flag in the control data (step G14) and transmits the area information including the control data to the radio Node controller 20 controlling the radio Node 30 including the cell to be distributed with the information (step G15). When the data does not exist, the mobile exchange network 10 or the network element manager 50 transmits the area information including the control data to all the radio Node controllers 20 controlled by the mobile exchange network 10 or the network element manager 50 (step G16).

The radio Node controller 20 receives the area information from the mobile exchange network 10 or the network element manager 50, being the host apparatus (step G21). The radio Node controller 20 then reads the search flag, the category type and the group type included in the received control data (step G22).

The radio Node controller 20 further confirms whether the search flag has been set (step G23). When the search flag has been set, the radio Node controller 20 distributes the area information carried in the report information to the radio Node 30 including the cell to be distributed with the information (step G28). When the search flag has not been set, the radio Node controller 20 confirms whether the data of the cell to be distributed with the information corresponding to the read category type and group type exists in the information notification matrix table (step G24).

When the data exists, the radio Node controller 20 sets the search flag in the control data (step G25), and transmits the area information to the radio Node 30 including the cell to be distributed with the information (step G26). When the data does not exist, the radio Node controller 20 transmits the area information to all the radio Nodes 30 controlled by the radio Node controller 20 (step G27).

According to the processing flow executed by the radio Node 30 shown in FIG. 22B, the radio Node 30 receives the area information from the radio Node controller 20, being the host apparatus (step G31). The radio Node 30 then reads the search flag, the category type and the group type included in the received control data (step G32).

The radio Node 30 further confirms whether the search flag has been set (step G33). When the search flag has been set, the radio Node 30 distributes the area information carried in the report information to the cell to be distributed with the information (step G37). When the search flag has not been set, the radio Node 30 confirms whether the data of the cell to be distributed with the information corresponding to the read category type and group type exists in the information notification matrix table (step G34).

When the data exists, the radio Node 30 distributes the area information carried in the report information to the cell to be distributed with the information (step G35). When the data does not exist, the radio Node 30 distributes the area information carried in the report information to all the cells (step G36).

The mobile terminal 40 existing in the cell to which the area information is distributed will receive the area information.

Next, explanation will be given to an embodiment in which the area information is distributed, carried in an area information distribution message irrelevant to the report information, with reference to FIG. 23 to FIG. 36B.

At first, an embodiment in which either one of the mobile exchange network 10 or the network element manager 50, the radio Node controller 20, and the radio Node 30 comprises the information notification matrix table, and determines the cell (or sector) to be distributed will be described.

FIG. 23 shows a sequence example in which the radio Node controller (RNC) 20 comprises the information notification matrix table, and executes determination of the cell (or sector) to be distributed. FIG. 24 shows an example of a processing flow executed by the radio Node controller 20.

According to the sequence example shown in FIG. 23, the mobile exchange network 10 or the network element manager 50 transmits the area information including the control data to all the radio Node controllers 20 connected thereto (H1). The radio Node controller 20 having received the area information uses the control data included in the transmitted area information to refer to the information notification matrix table, and when the cell to be distributed with the information is determined, transmits the area information to the radio Node 30 including the cell to be distributed with the information, or to all the radio Nodes 30 controlled by the radio Node controller 20 when the cell to be distributed with the information is not determined (H2). When the cell to be distributed with the information has been determined, the radio Node 30 having received the area information distributes the area information carried in the area information distribution message to the determined cell, or to all the cells when the cell to be distributed with the information has not been determined (H3).

According to the processing flow executed by the radio Node controller 20 shown in FIG. 24, the radio Node controller 20 receives the area information from the mobile exchange network 10 or the network element manager 50, being the host apparatus (step H11). The radio Node controller 20 then reads the category type and the group type included in the control data in the received area information (step GH12). The radio Node controller 20 further confirms whether the data of the cell to be distributed with the information corresponding to the read category type and group type exists in the information notification matrix table (step H13).

When the data exists, the radio Node controller 20 transmits the area information including the control data to the radio Node 30 including the cell to be distributed with the information (step H14), and the radio Node 30 having received this area information distributes the area information carried in the area information distribution message to the cell to be distributed with the information.

When the data does not exist, the radio Node controller 20 transmits the area information including the control data to all the radio Nodes 30 controlled by the radio Node controller 20 (step H15), and the radio Node 30 having received this area information distributes the area information carried in the area information distribution message to all the cells.

The mobile terminal 40 existing in the cell to which the area information is distributed will receive the area information.

FIG. 25 shows a sequence example in which the radio Node (Node B) 30 has the information notification matrix table, and determines the cell to be distributed with the information. FIG. 26 shows an example of the processing flow executed by the radio Node 30.

According to the sequence example shown in FIG. 25, the mobile exchange network 10 or the network element manager 50 transmits the area information including the control data to all the radio Node controllers 20 connected thereto (I1). The radio Node controller 20 having received this area information transmits the area information to all the radio Nodes 30 controlled by the radio Node controller 20 (I2). Then, the radio Node 30 having received the area information uses the control data included in the transmitted area information to refer to the information notification matrix table, and when the cell to be distributed with the information is determined, transmits the area information carried in the area information distribution message to the cell to be distributed with the information, and when the cell to be distributed with the information is not determined, transmits the area information carried in the area information distribution message to all the cells (I3).

According to the processing flow executed by the radio Node 30 shown in FIG. 26, the radio Node 30 receives the area information from the radio Node controller 20, being the host apparatus (step I11). The radio Node 30 reads the category type and group type included in the received control data (step I12). Moreover, the radio Node 30 confirms whether the data of the cell to be distributed with the information, corresponding to the read category type and group type exists in the information notification matrix table (step I13).

When the data exists, the radio Node 30 distributes the area information carried in the area information distribution message to the cell to be distributed with the information (step I14), and when the data does not exist, the radio Node 30 distributes the area information carried in the area information distribution message to all the cells (step I15).

The mobile terminal 40 existing in the cell to which the area information is distributed will receive the area information.

FIG. 27 shows a sequence example in which the mobile exchange network (CN) 10 or the network element manager (NEM) 50 has the information notification matrix table, and executes determination of the cell to be distributed with the information. FIG. 28 shows an example of the processing flow executed by the mobile exchange network (CN) 10 or the network element manager (NEM) 50.

According to the sequence example shown in FIG. 27, the mobile exchange network 10 or the network element manager 50 uses the control data included in the area information to refer to the information notification matrix table, and when the cell to be distributed with the information is determined, transmits the area information to the radio Node controller 20 controlling the radio Node 30 including the cell to be distributed with the information, and when the cell to be distributed with the information is not determined, transmits the area information to all the radio Node controllers 20 (J1).

The radio Node controller 20 having received the area information transmits the area information to the radio Node 30 including the determined cell when the cell to be distributed with the information has been determined, or to all the radio Nodes 30 when the cell to be distributed with the information has not been determined (J2). The radio Node 30 having received the area information distributes the area information carried in the area information distribution message to the determined cell when the cell to be distributed with the information has been determined, or to all the cells when the cell to be distributed with the information has not been determined (J3).

According to the processing flow executed by the mobile exchange network 10 or the network element manager 50 shown in FIG. 28, when a distribution request of the area information is generated (step J11), the mobile exchange network 10 or the network element manager 50 reads the category type and group type included in the control data in the area information (step J12). Then, the mobile exchange network 10 or the network element manager 50 confirms whether the data of the cell to be distributed with the information, corresponding to the read category type and group type exists in the information notification matrix table (step J13).

When the data exists, the mobile exchange network 10 or the network element manager 50 transmits the area information including the control data to the radio Node controller 20 controlling the radio Node 30 including the cell to be distributed with the information (step J14). The radio Node controller 20 having received the area information transmits the area information including the control data to the radio Node 30 including the cell to be distributed with the information. The radio Node 30 having received this area information distributes the area information carried in the area information distribution message to the cell to be distributed with the information.

When the data does not exist, the mobile exchange network 10 or the network element manager 50 transmits the area information including the control data to all the radio Node controllers 20 controlled by the mobile exchange network 10 or the network element manager 50 (step J15). The radio Node controller 20 having received the area information transmits the area information including the control data to all the radio Nodes 30 controlled by the radio Node controller 20. The radio Node 30 having received the area information distributes the area information carried in the area information distribution message to all the cells.

The mobile terminal 40 existing in the cell to which the area information is distributed will receive the area information.

Next, explanation will be given to an embodiment in which the cell to be distributed with the information is determined by a combination of either two of the mobile exchange network (CN) 10 or the network element manager (NEM) 50, the radio Node controller 20, and the radio Node 30.

FIG. 29 is a sequence example in which the radio Node controller 20 and the radio Node 30 respectively have the information notification matrix tables, and execute determination of the cell (or the sector) to be distributed. FIG. 30 shows an example of the processing flow executed by the radio Node controller 20 and the radio Node 30.

According to the sequence example shown in FIG. 29, the mobile exchange network 10 or the network element manager 50 transmits the area information including the control data to all the radio Node controllers 20 connected thereto (K1). The radio Node controller 20 having received this area information uses the control data included in the transmitted area information to refer to the information notification matrix table, and when the cell to be distributed with the information is determined, sets the search flag and transmits the area information to the radio Node 30 including the cell to be distributed with the information, and when the cell to be distributed with the information is not determined, transmits the area information to all the radio Nodes 30 controlled by the radio Node controller 20 (K2).

When the search flag has been set, the radio Node 30 having received the area information distributes the area information carried in the area information distribution message to the determined cell, and when the search flag has not been set, uses the control data included in the transmitted area information to refer to the information notification matrix table, and when the cell to be distributed with the information is determined, distributes the area information carried in the area information distribution message to the determined cell, or to all the cells when the cell to be distributed with the information is not determined (K3).

According to the processing flow executed by the radio Node controller 20 and the radio Node 30 shown in FIG. 30, the radio Node controller 20 receives the area information including the control data from the mobile exchange network 10 or the network element manager 50, being the host apparatus (step K11). Then, the radio Node controller 20 reads the category type and group type included in the received control data (step K12). Moreover, the radio Node controller 20 confirms whether the data of the cell to be distributed with the information, corresponding to the read category type and group type exists in the information notification matrix table (step K13).

When the data exists, the radio Node controller 20 sets the search flag in the control data (step K14) and transmits the area information including the control data to the radio Node 30 including the cell to be distributed with the information (step K15). When the data does not exist, the radio Node controller 20 transmits the area information including the control data to all the radio Nodes 30 controlled by the radio Node controller 20 (step K16).

The radio Node 30 receives the area information from the radio Node controller 20, being the host apparatus (step K21). The radio Node 30 then reads the search flag, the category type and the group type included in the received control data (step K22).

Further, the radio Node 30 confirms whether the search flag has been set (step K23). When the search flag has been set, the radio Node 30 distributes the area information carried in the area information distribution message to the cell to be distributed with the information (step K27). When the search flag has not been set, the radio Node 30 confirms whether the data of the cell to be distributed with the information corresponding to the read category type and group type exists in the information notification matrix table (step K24).

When the data exists, the radio Node 30 distributes the area information carried in the area information distribution message to the cell to be distributed with the information (step K25). When the data does not exist, the radio Node 30 distributes the area information carried in the area information distribution message to all the cells (step K26).

The mobile terminal 40 existing in the cell to which the area information is distributed will receive the area information.

FIG. 31 shows a sequence example in which the mobile exchange network 10 or the network element manager 50, and the radio Node controller 20 respectively have the information notification matrix tables, and execute determination of the cell to be distributed with the information. FIG. 32A shows an example of the processing flow executed by the mobile exchange network 10 or the network element manager 50 and the radio Node controller 20, and FIG. 32B shows an example of the processing flow executed by the radio Node 30.

According to the sequence example shown in FIG. 31, the mobile exchange network 10 or the network element manager 50 uses the control data included in the transmitted area information to refer to the information notification matrix table, and when the cell to be distributed with the information is determined, sets the search flag and transmits the area information to the radio Node controller 20 controlling the radio Node 30 including the cell to be distributed with the information, and when the cell to be distributed with the information is not determined, transmits the area information to all the radio Node controllers 20 (L1).

When the search flag has been set, the radio Node controller 20 having received the area information transmits the area information to the radio Node 30 including the determined cell, and when the search flag has not been set, uses the control data included in the transmitted area information to refer to the information notification matrix table, and when the cell to be distributed with the information is determined, transmits the area information to the radio Node 30 including the determined cell, or to all the radio Nodes 30 when the cell to be distributed with the information is not determined (L2).

The radio Node 30 having received the area information distributes the area information carried in the area information distribution message to the determined cell when the cell to be distributed with the information is determined, or to all the cells when the cell to be distributed with the information is not determined (L3).

According to the processing flow executed by the mobile exchange network 10 or the network element manager 50 and the radio Node controller 20 shown in FIG. 32A, when a distribution request of the area information is generated (step L11), the mobile exchange network 10 or the network element manager 50 reads the category type and group type included in the received control data (step L12). Moreover, the mobile exchange network 10 or the network element manager 50 confirms whether the data of the cell to be distributed with the information corresponding to the read category type and group type exists in the information notification matrix table (step L13).

When the data exists, the mobile exchange network 10 or the network element manager 50 sets the search flag in the control data (step L14) and transmits the area information including the control data to the radio Node controller 20 controlling the radio Node 30 including the cell to be distributed with the information (step L15). When the data does not exist, the mobile exchange network 10 or the network element manager 50 transmits the area information including the control data to all the radio Node controllers 20 controlled by the mobile exchange network 10 or the network element manager 50 (step L16).

The radio Node controller 20 receives the area information from the mobile exchange network 10 or the network element manager 50, being the host apparatus (step L21). The radio Node controller 20 then reads the search flag, the category type and the group type included in the received control data (step L22).

The radio Node controller 20 confirms whether the search flag has been set (step L23). When the search flag has been set, the radio Node controller 20 transmits the area information to the radio Node 30 including the cell to be distributed with the information (step L27). When the search flag has not been set, the radio Node controller 20 confirms whether the data of the cell to be distributed with the information corresponding to the read category type and group type exists in the information notification matrix table (step L24).

When the data exists, the radio Node controller 20 transmits the area information to the radio Node 30 including the cell to be distributed with the information (step L25). When the data does not exist, the radio Node controller 20 transmits the area information to all the radio Nodes 30 controlled by the radio Node controller 20 (step L26).

According to the processing flow executed by the radio Node 30 shown in FIG. 32B, the radio Node 30 receives the area information from the radio Node controller 20, being the host apparatus (step L31). When the cell to be distributed with the information is determined, the radio Node 30 distributes the area information carried in the area information distribution message to the cell to be distributed with the information, and when the cell to be distributed with the information is not determined, distributes the area information carried in the area information distribution message to all the cells (step L32).

The mobile terminal 40 existing in the cell to which the area information is distributed will receive the area information.

FIG. 33 shows a sequence example in which the mobile exchange network 10 or the network element manager 50, and the radio Node 30 respectively have the information notification matrix tables, and execute determination of the cell to be distributed with the information. FIG. 34A shows an example of the processing flow executed by the mobile exchange network 10 or the network element manager 50 and the radio Node controller 20, and FIG. 34B shows an example of the processing flow executed by the radio Node 30.

According to the sequence example shown in FIG. 33, the mobile exchange network 10 or the network element manager 50 uses the control data included in the transmitted area information to refer to the information notification matrix table, and when the cell to be distributed with the information is determined, sets the search flag and transmits the area information to the radio Node controller 20 controlling the radio Node 30 including the cell to be distributed with the information, and when the cell to be distributed with the information is not determined, transmits the area information to all the radio Node controllers 20 (M1).

The radio Node controller 20 having received the area information transmits the area information to the radio Node 30 including the determined cell when the cell to be distributed with the information has been determined, and when the cell to be distributed with the information has not been determined, transmits the area information to all the radio Nodes 30 (M2).

When the search flag has been set, the radio Node 30 having received the area information distributes the area information carried in the area information distribution message to the determined cell, and when the search flag has not been set, uses the control data included in the transmitted area information to refer to the information notification matrix table, and when the cell to be distributed with the information is determined, distributes the area information carried in the area information distribution message to the determined cell, or to all the cells when the cell to be distributed with the information is not determined (M3).

According to the processing flow executed by the mobile exchange network 10 or the network element manager 50 and the radio Node controller 20 shown in FIG. 34A, when a distribution request of the area information is generated (step M11), the mobile exchange network 10 or the network element manager 50 reads the category type and group type included in the received control data (step M12). Moreover, the mobile exchange network 10 or the network element manager 50 confirms whether the data of the cell to be distributed with the information corresponding to the read category type and group type exists in the information notification matrix table (step M13).

When the data exists, the mobile exchange network 10 or the network element manager 50 sets the search flag in the control data (step M14) and transmits the area information including the control data to the radio Node controller 20 controlling the radio Node 30 including the cell to be distributed with the information (step M15). When the data does not exist, the mobile exchange network 10 or the network element manager 50 transmits the area information including the control data to all the radio Node controllers 20 controlled by the mobile exchange network 10 or the network element manager 50 (step M16).

The radio Node controller 20 receives the area information from the mobile exchange network 10 or the network element manager 50, being the host apparatus (step M21). When the cell to be distributed with the information has been determined, the radio Node controller 20 transmits the area information including the control data to the radio Node 30 including the cell, and when the cell to be distributed with the information has not been determined, transmits the area information including the control data to all the radio Nodes 30 controlled by the radio Node controller 20 (step M22).

According to the processing flow executed by the radio Node 30 shown in FIG. 34B, the radio Node 30 receives the area information from the radio Node controller 20, being the host apparatus (step M31). The radio Node 30 then reads the search flag, the category type and the group type included in the received control data (step M32).

The radio Node 30 further confirms whether the search flag has been set (step M33). When the search flag has been set, the radio Node 30 distributes the area information carried in the area information distribution message to the cell to be distributed with the information (step M37). When the search flag has not been set, the radio Node 30 confirms whether the data of the cell to be distributed with the information corresponding to the read category type and group type exists in the information notification matrix table (step M34).

When the data exists, the radio Node 30 distributes the area information carried in the area information distribution message to the cell to be distributed with the information (step M35). When the data does not exist, the radio Node 30 distributes the area information carried in the area information distribution message to all the cells (step M36).

The mobile terminal 40 existing in the cell to which the area information is distributed will receive the area information.

Next, explanation will be given to an embodiment in which the cell to be distributed with the information is determined by the mobile exchange network (CN) 10 or the network element manager (NEM) 50, the radio Node controller 20, and the radio Node 30.

FIG. 35 is a sequence example in which the mobile exchange network 10 or the network element manager 50, the radio Node controller 20 and the radio Node 30 respectively have the information notification matrix tables, and execute determination of the cell to be distributed with the information. FIG. 36A shows an example of the processing flow executed by the mobile exchange network 10 or the network element manager 50, and the radio Node controller 20, and FIG. 36B shows an example of the processing flow executed by the radio Node 30.

According to the sequence example shown in FIG. 35, the mobile exchange network 10 or the network element manager 50 uses the control data included in the area information to refer to the information notification matrix table, and when the cell to be distributed with the information is determined, sets the search flag and transmits the area information to the radio Node controller 20 controlling the radio Node 30 including the cell to be distributed with the information, and when the cell to be distributed with the information is not determined, transmits the area information to all the radio Node controllers 20 (N1).

When the search flag has been set, the radio Node controller 20 having received the area information transmits the area information to the radio Node 30 including the determined cell, and when the search flag has not been set, uses the control data included in the transmitted area information to refer to the information notification matrix table, and when the cell to be distributed with the information is determined, sets the search flag and transmits the area information to the radio Node 30 including the determined cell, or to all the radio Nodes 30 when the cell to be distributed with the information is not determined (N2).

When the search flag has been set, the radio Node 30 having received the area information distributes the area information carried in the area information distribution message to the determined cell, and when the search flag has not been set, uses the control data included in the transmitted area information to refer to the information notification matrix table, and when the cell to be distributed with the information is determined, distributes the area information carried in the area information distribution message to the determined cell, or to all the cells when the cell to be distributed with the information is not determined (N3).

According to the processing flow executed by the mobile exchange network 10 or the network element manager 50, and the radio Node controller 20 shown in FIG. 36A, when a distribution request of the area information is generated (step N11), the mobile exchange network 10 or the network element manager 50 reads the category type and group type included in the received control data (step N12). Further, the mobile exchange network 10 or the network element manager 50 confirms whether the data of the cell to be distributed with the information corresponding to the read category type and group type exists in the information notification matrix table (step N13).

When the data exists, the mobile exchange network 10 or the network element manager 50 sets the search flag in the control data (step N14) and transmits the area information including the control data to the radio Node controller 20 controlling the radio Node 30 including the cell to be distributed with the information (step N15). When the data does not exist, the mobile exchange network 10 or the network element manager 50 transmits the area information including the control data to all the radio Node controllers 20 controlled by the mobile exchange network 10 or the network element manager 50 (step N16).

The radio Node controller 20 receives the area information from the mobile exchange network 10 or the network element manager 50, being the host apparatus (step N21). The radio Node controller 20 then reads the search flag, the category type and the group type included in the received control data (step N22).

The radio Node controller 20 further confirms whether the search flag has been set (step N23). When the search flag has been set, the radio Node controller 20 distributes the area information carried in the area information distribution message to the radio Node 30 including the cell to be distributed with the information (step N28). When the search flag has not been set, the radio Node controller 20 confirms whether the data of the cell to be distributed with the information corresponding to the read category type and group type exists in the information notification matrix table (step N24).

When the data exists, the radio Node controller 20 sets the search flag in the control data (step N25), and transmits the area information to the radio Node 30 including the cell to be distributed with the information (step N26). When the data does not exist, the radio Node controller 20 transmits the area information to all the radio Nodes 30 controlled by the radio Node controller 20 (step N27).

According to the processing flow executed by the radio Node 30 shown in FIG. 36B, the radio Node 30 receives the area information from the radio Node controller 20, being the host apparatus (step N31). The radio Node 30 then reads the search flag, the category type and the group type included in the received control data (step N32).

The radio Node 30 further confirms whether the search flag has been set (step N33). When the search flag has been set, the radio Node 30 distributes the area information carried in the area information distribution message to the cell to be distributed with the information (step N37). When the search flag has not been set, the radio Node 30 confirms whether the data of the cell to be distributed with the information corresponding to the read category type and group type exists in the information notification matrix table (step N34).

When the data exists, the radio Node 30 distributes the area information carried in the area information distribution message to the cell to be distributed with the information (step N35). When the data does not exist, the radio Node 30 distributes the area information carried in the area information distribution message to all the cells (step N36).

The mobile terminal 40 existing in the cell to which the area information is distributed will receive the area information.

EFFECTS OF THE INVENTION

As described above, according to the mobile communication system of the present invention, since the cell to be distributed with the information is determined based on the type information added corresponding to the content of the respective area information, the area information can be distributed from the radio Node to the mobile terminal in a unit of cell. As a result, distribution of unnecessary area information to the mobile terminal can be prevented, the use efficiency of the resources such as the radio Node and the radio Node controller or the like can be improved, and the resources of the whole system can be saved.

In the mode in which the area information is distributed, carried in the report information, the area information can be distributed to the mobile terminal without setting special information for distributing the area information. Moreover, in the mode in which the area information is distributed, carried in the area information distribution message irrelevant to the report information, the area information can be distributed to the mobile terminal, freely at any timing irrelevant to the report information.

Furthermore, the load due to the processing relating to the distribution of the area information can be prevented from increasing, and the cost for equipment investment can be reduced, or saving in the line use can be realized.

EXPLANATION OF REFERENCE NUMERALS

Figure 1:
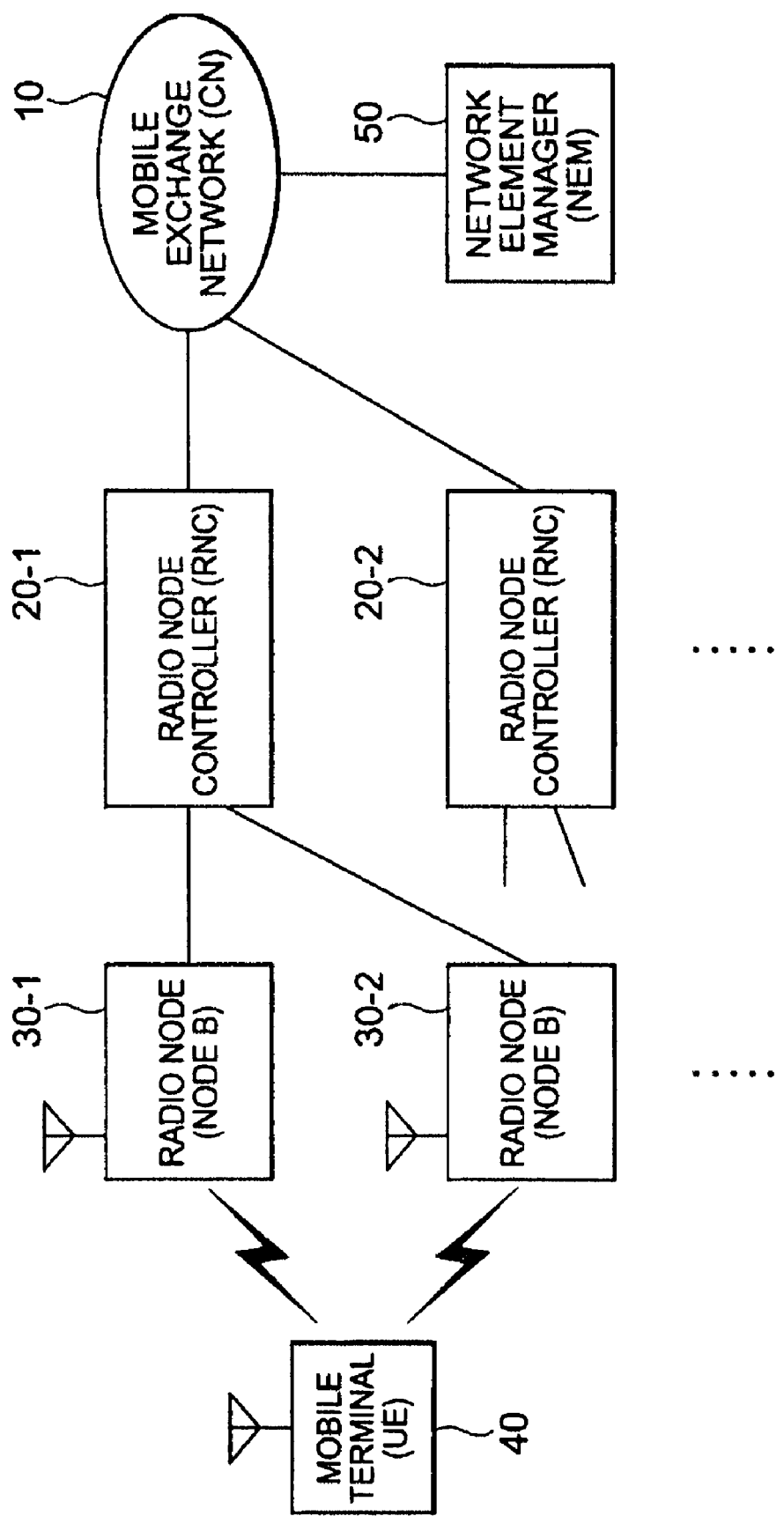
FIG. 1 is a system block diagram showing the configuration of a mobile communication system according to the present invention.
Figure 2:
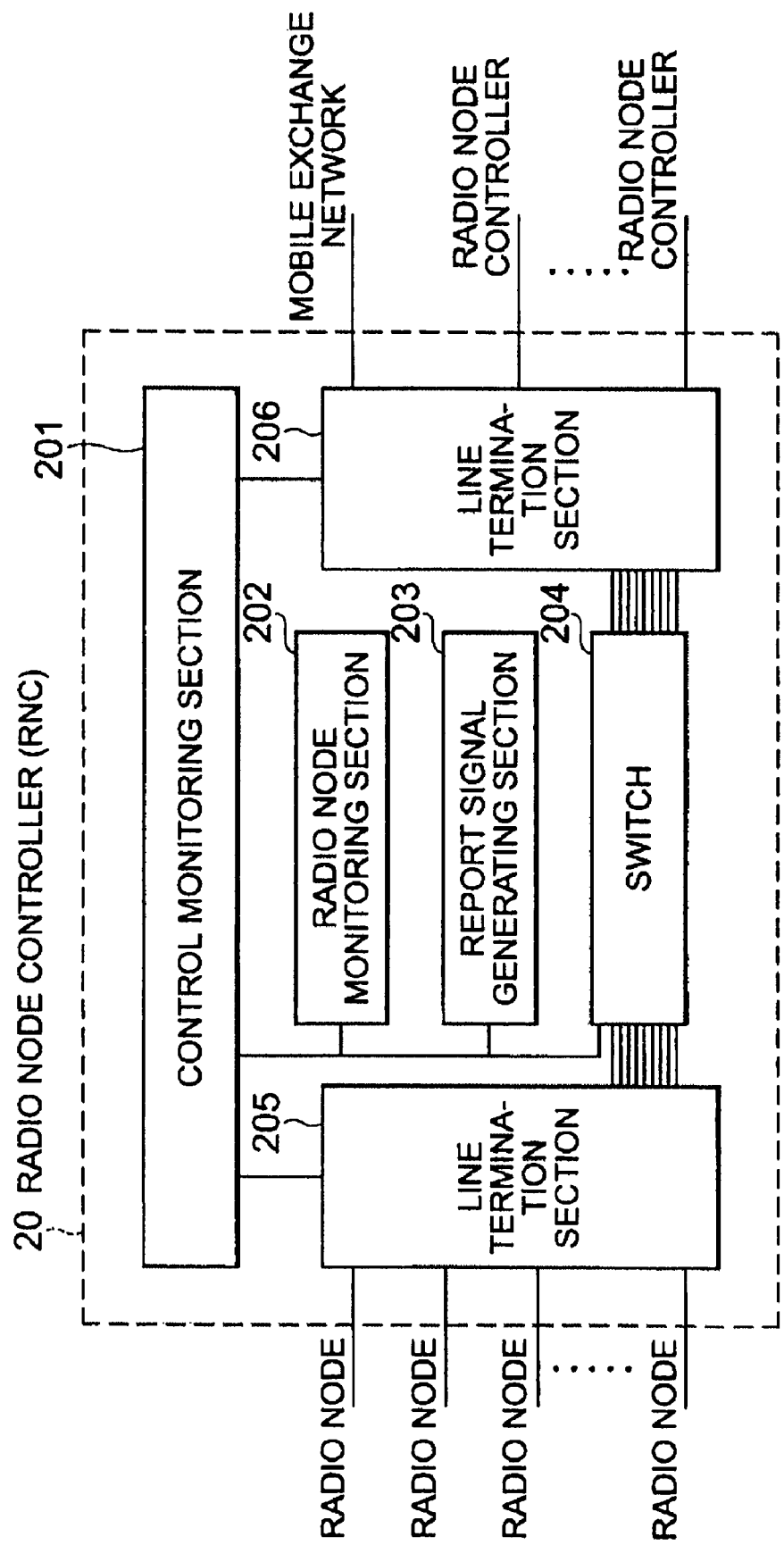
FIG. 2 is a diagram showing the configuration of a radio Node controller in the mobile communication system of the present invention.
Figure 3:
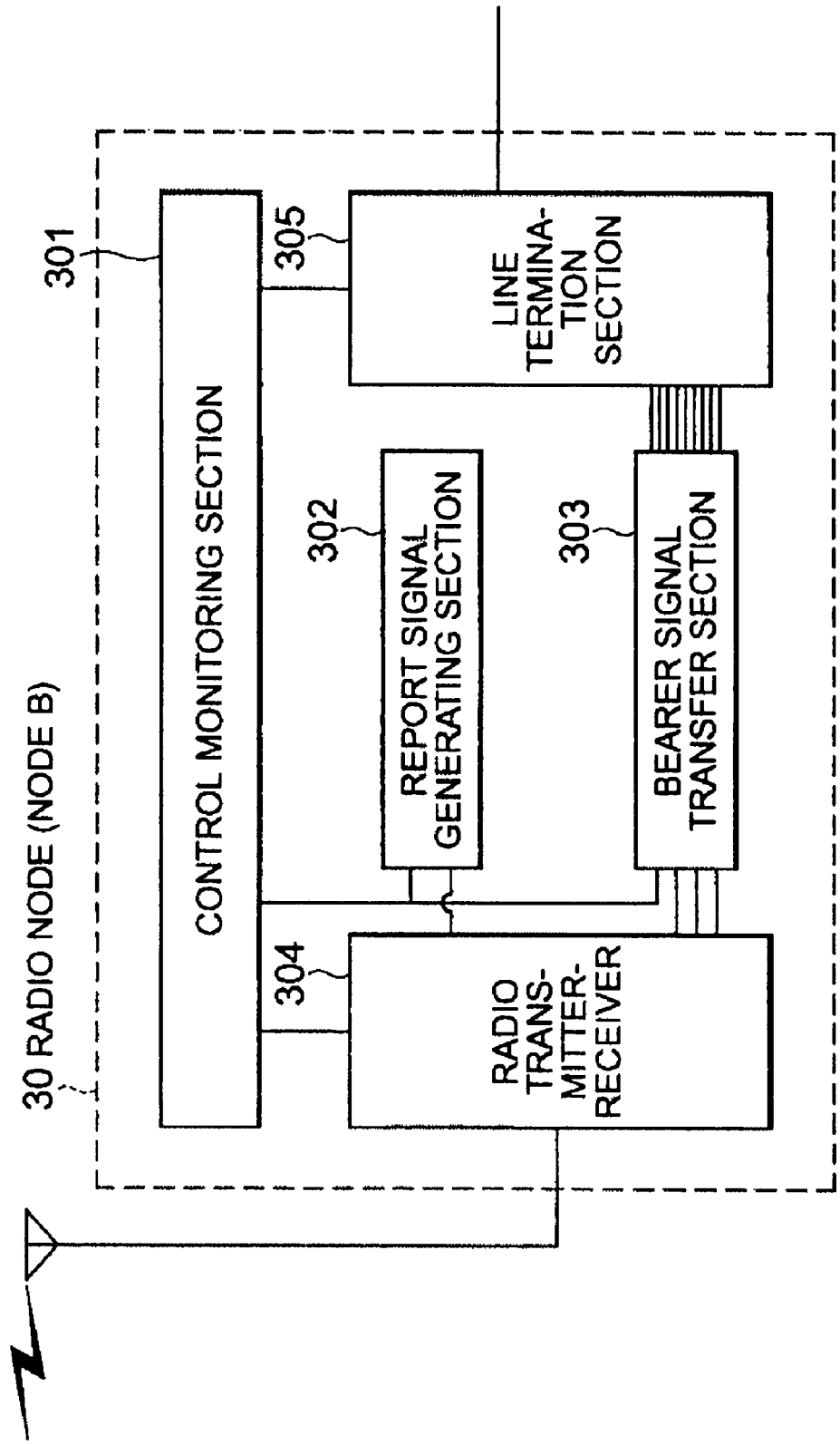
FIG. 3 is a diagram showing the configuration of a radio Node in the mobile communication system of the present invention.
Figure 4:
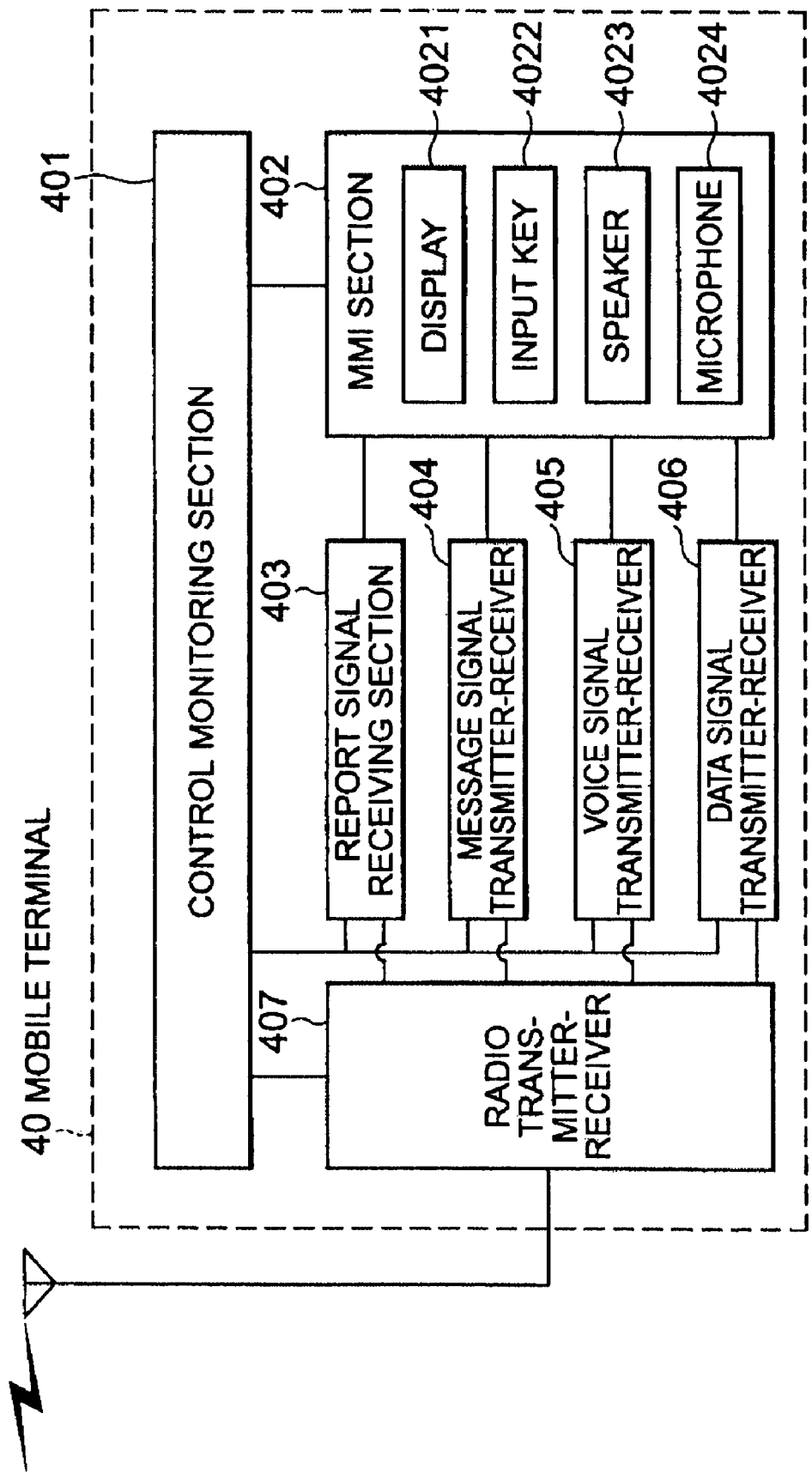
FIG. 4 is a diagram showing the configuration of a mobile terminal in the mobile communication system of the present invention.
Figure 5:
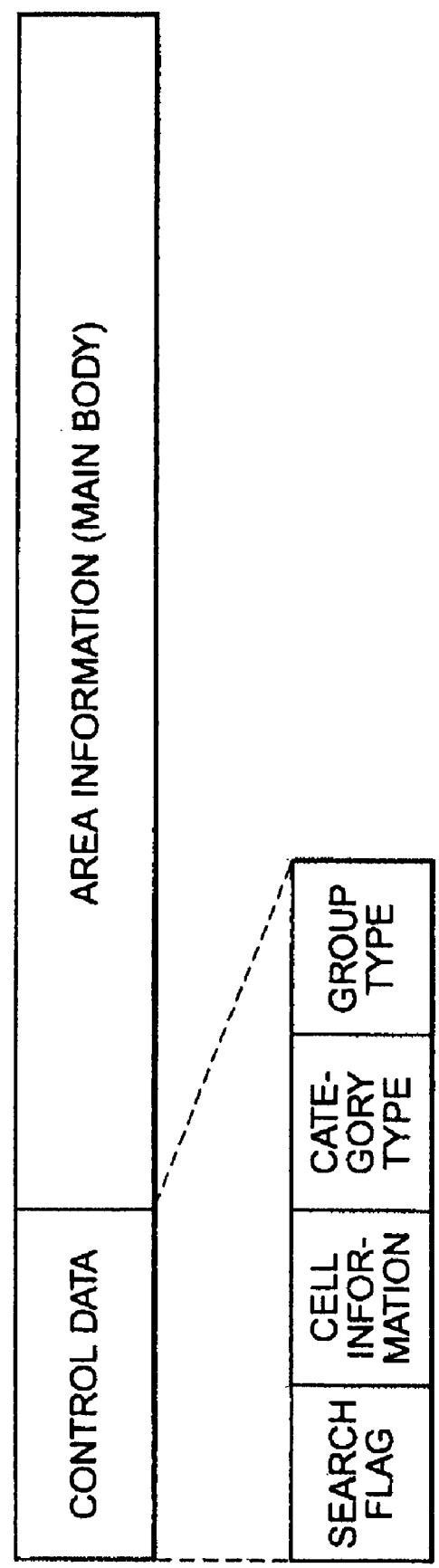
FIG. 5 shows one example of data organization of area information in the mobile communication system of the present invention.
Figure 6:
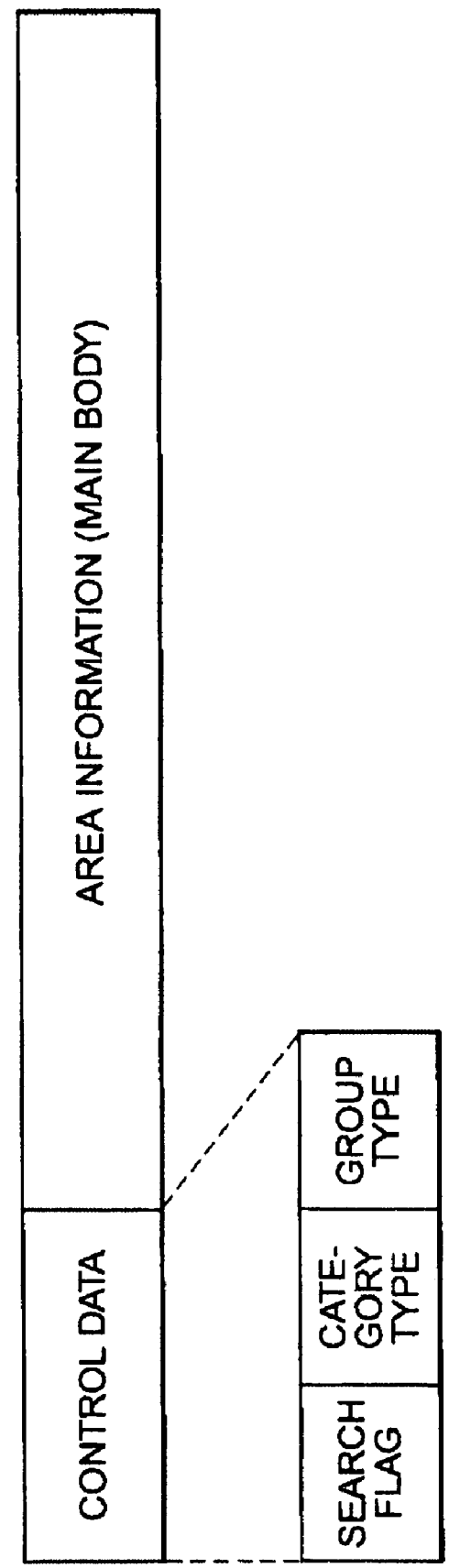
FIG. 6 shows another example of data organization of the area information in the mobile communication system of the present invention.
Figure 7:
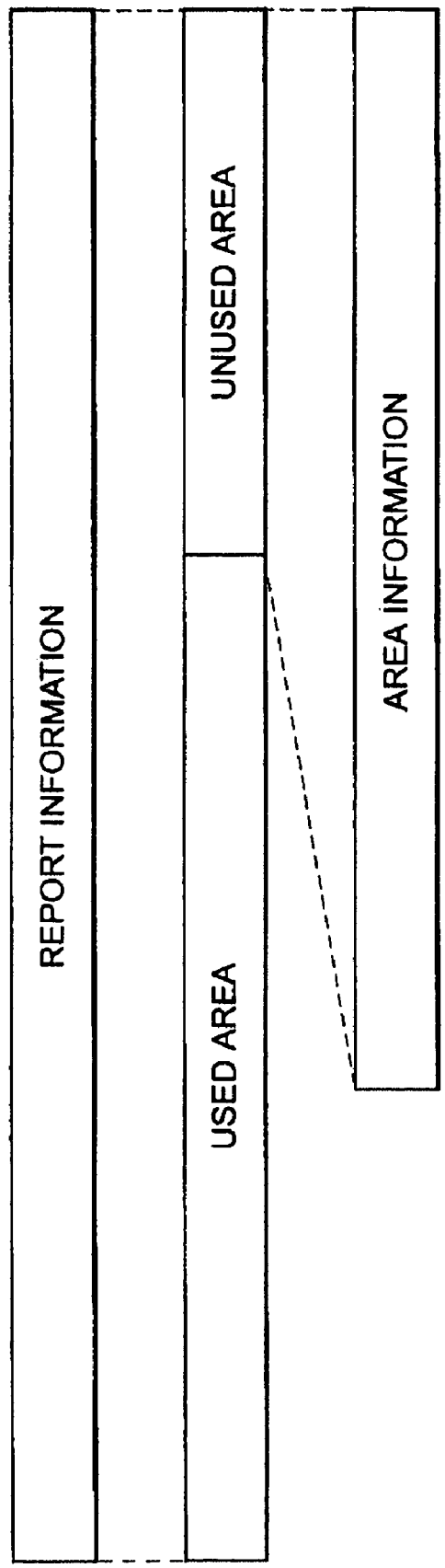
FIG. 7 shows the data organization of report information when the area information is carried in the report information and distributed.
Figure 8:
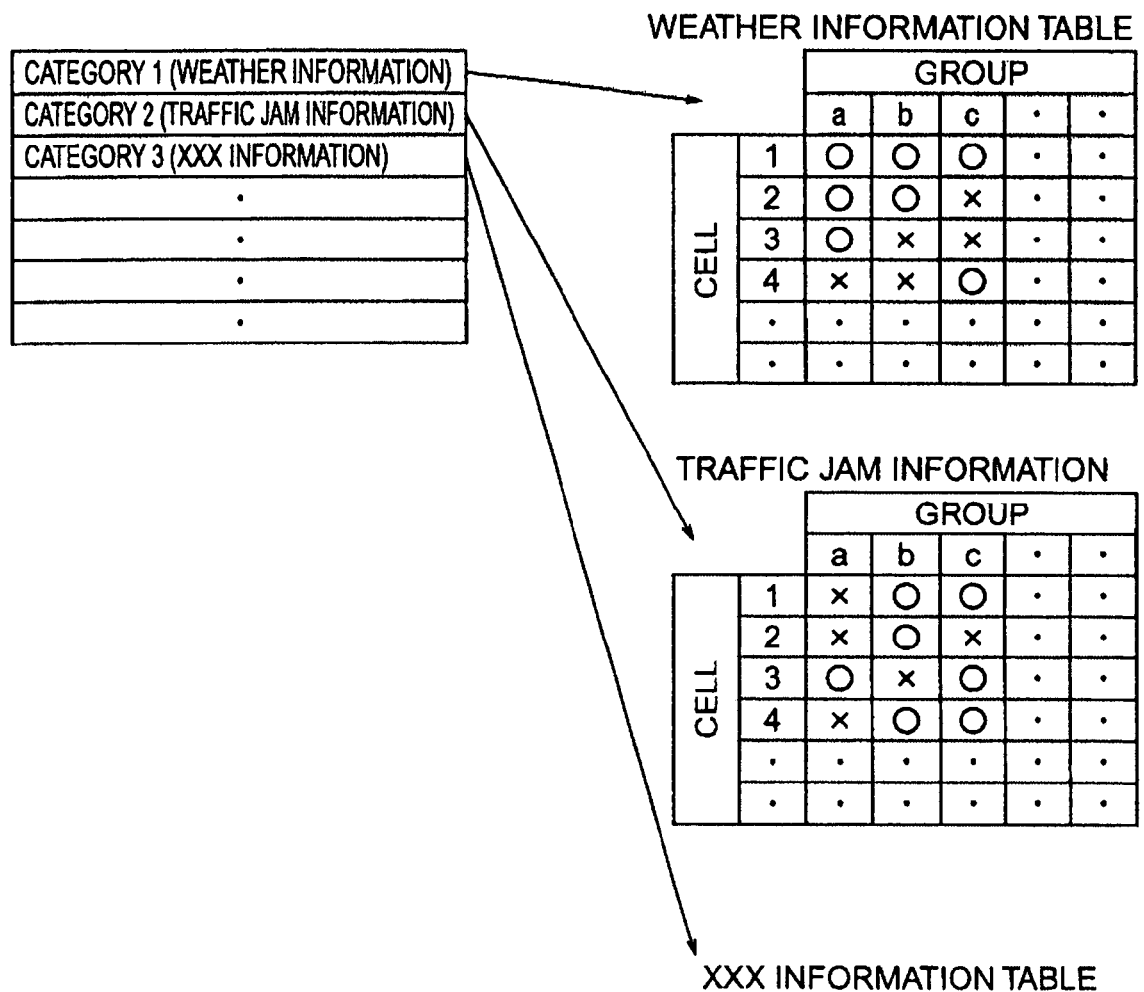
FIG. 8 shows an example of an information notification matrix table indicating the correspondence between the group type in the area information and a cell to be distributed with the information, in the mobile communication system of the present invention.
Figure 9:
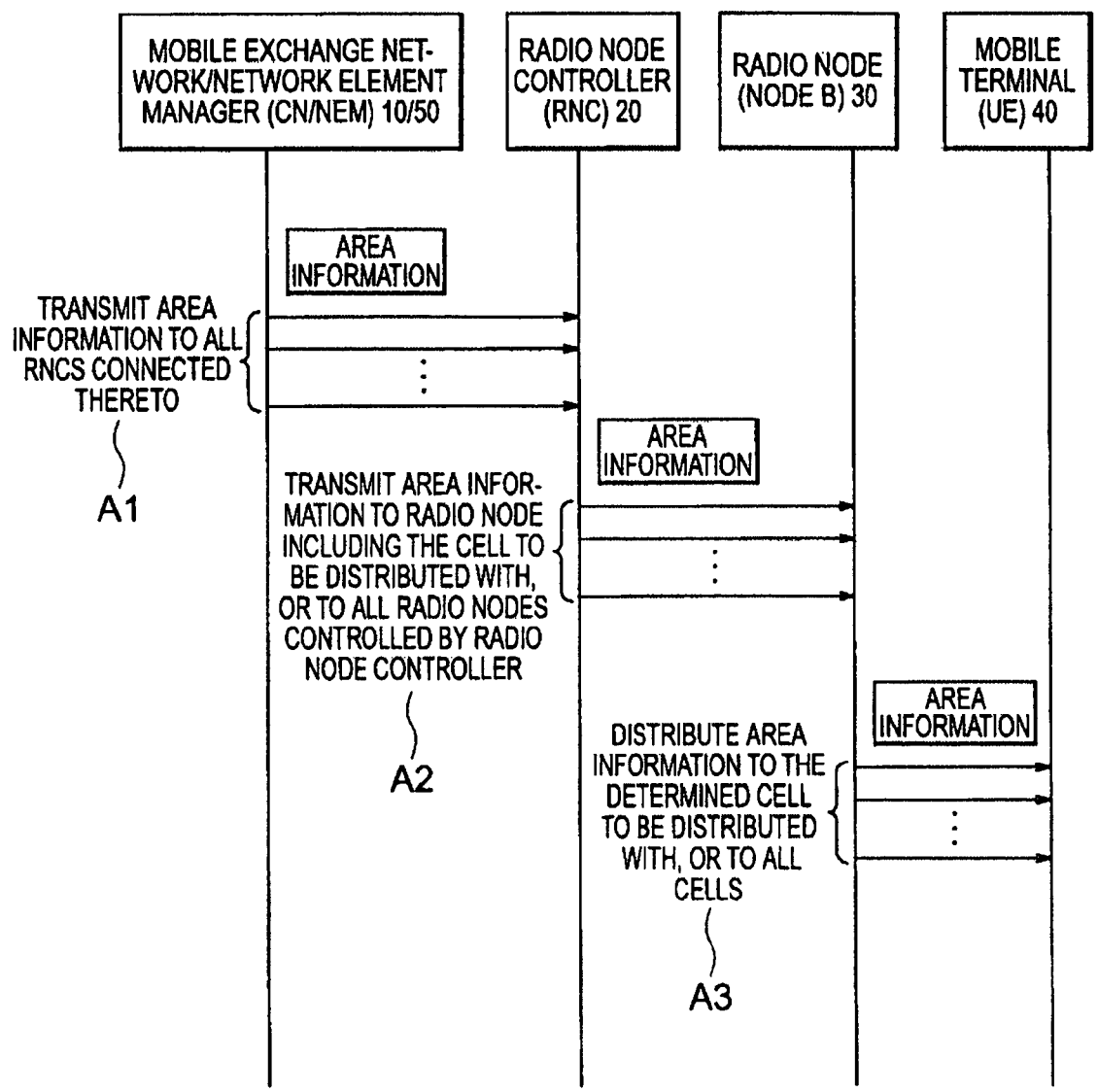
FIG. 9 shows an example of a sequence chart in which the radio Node controller executes determination of the cell to be distributed with the information.
Figure 10:
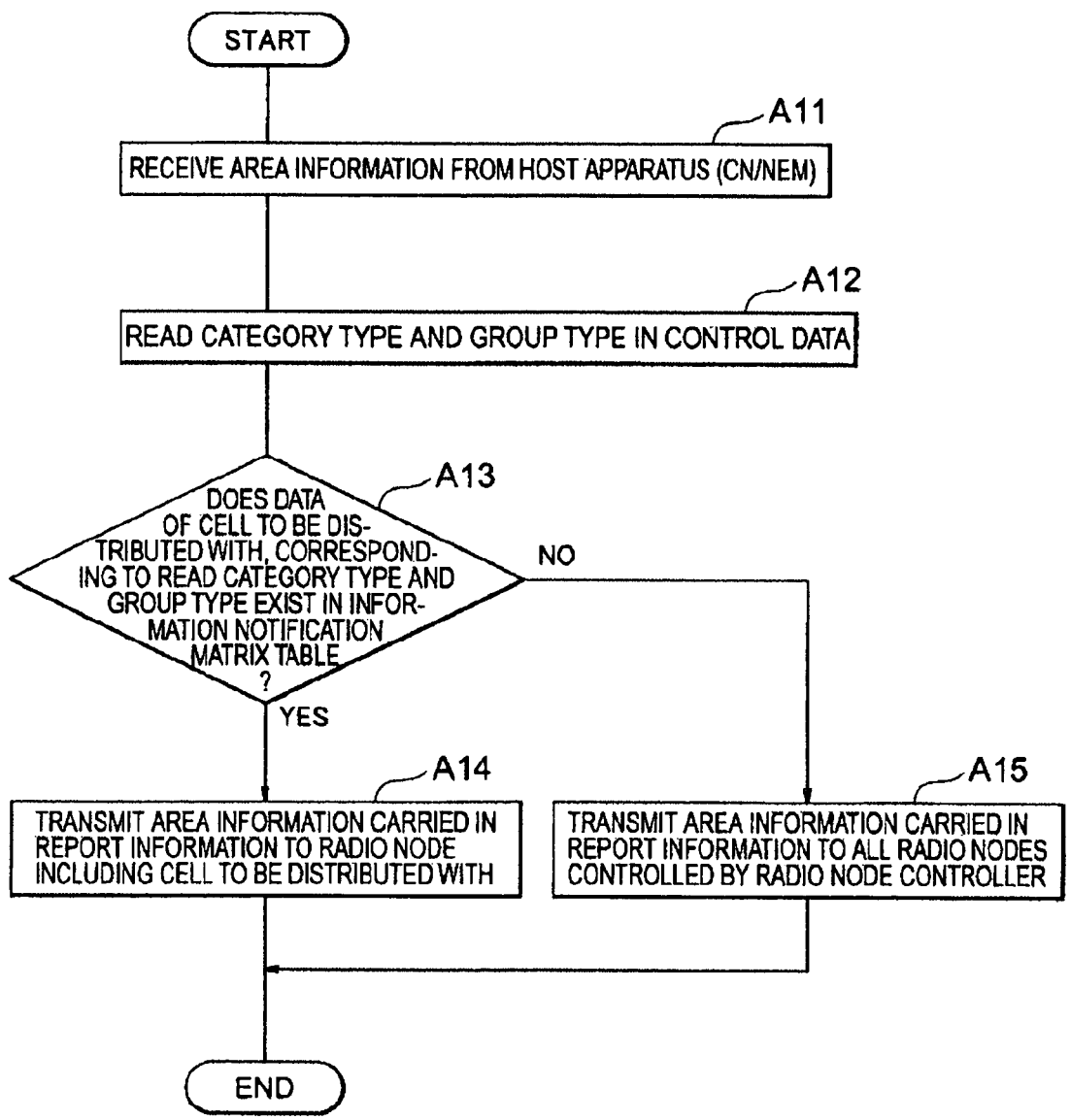
FIG. 10 shows an example of processing flow executed by the radio Node controller shown in FIG. 9.
Figure 11:
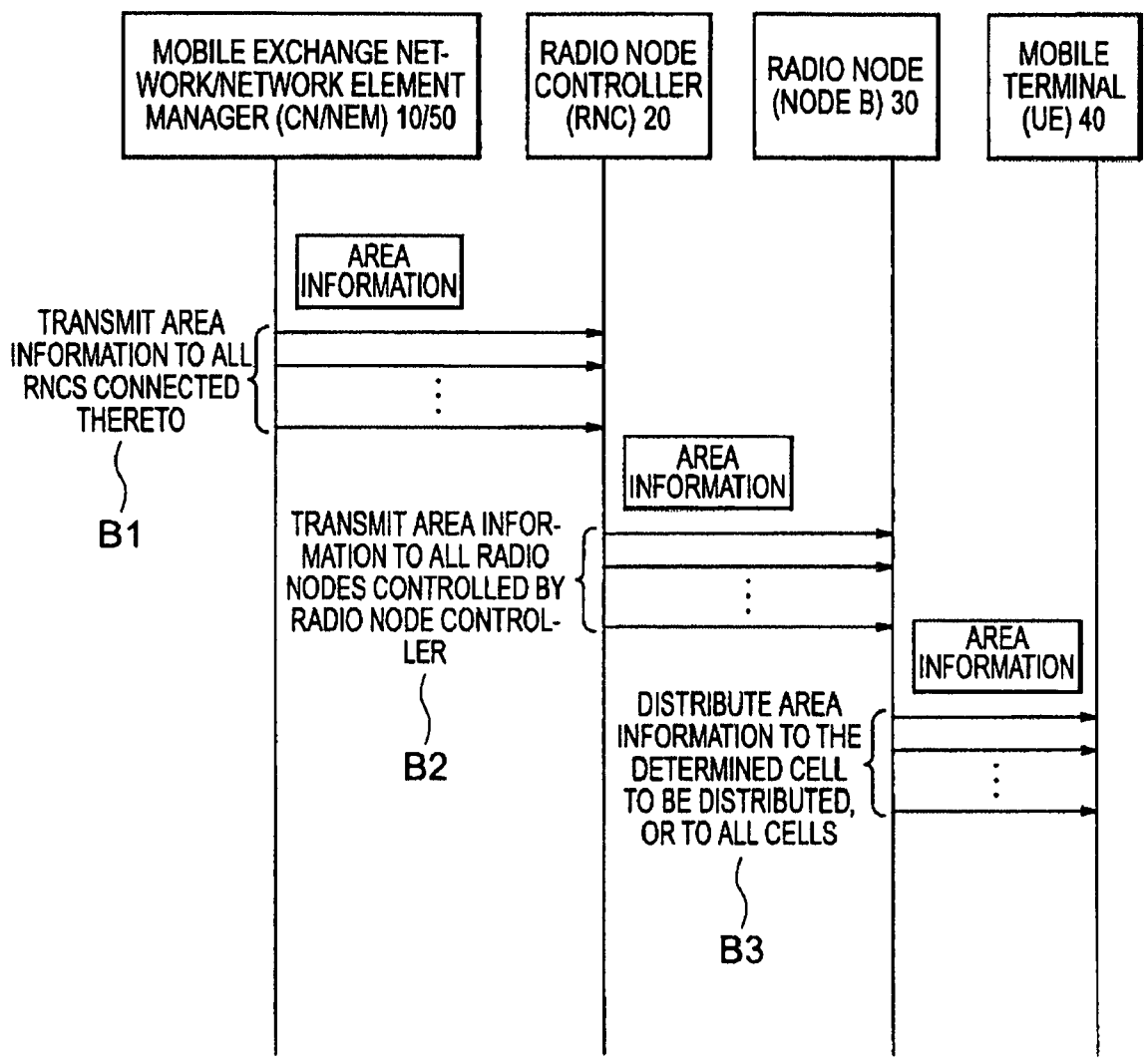
FIG. 11 shows an example of a sequence chart in which the radio Node executes determination of the cell to be distributed with the information.
Figure 12:
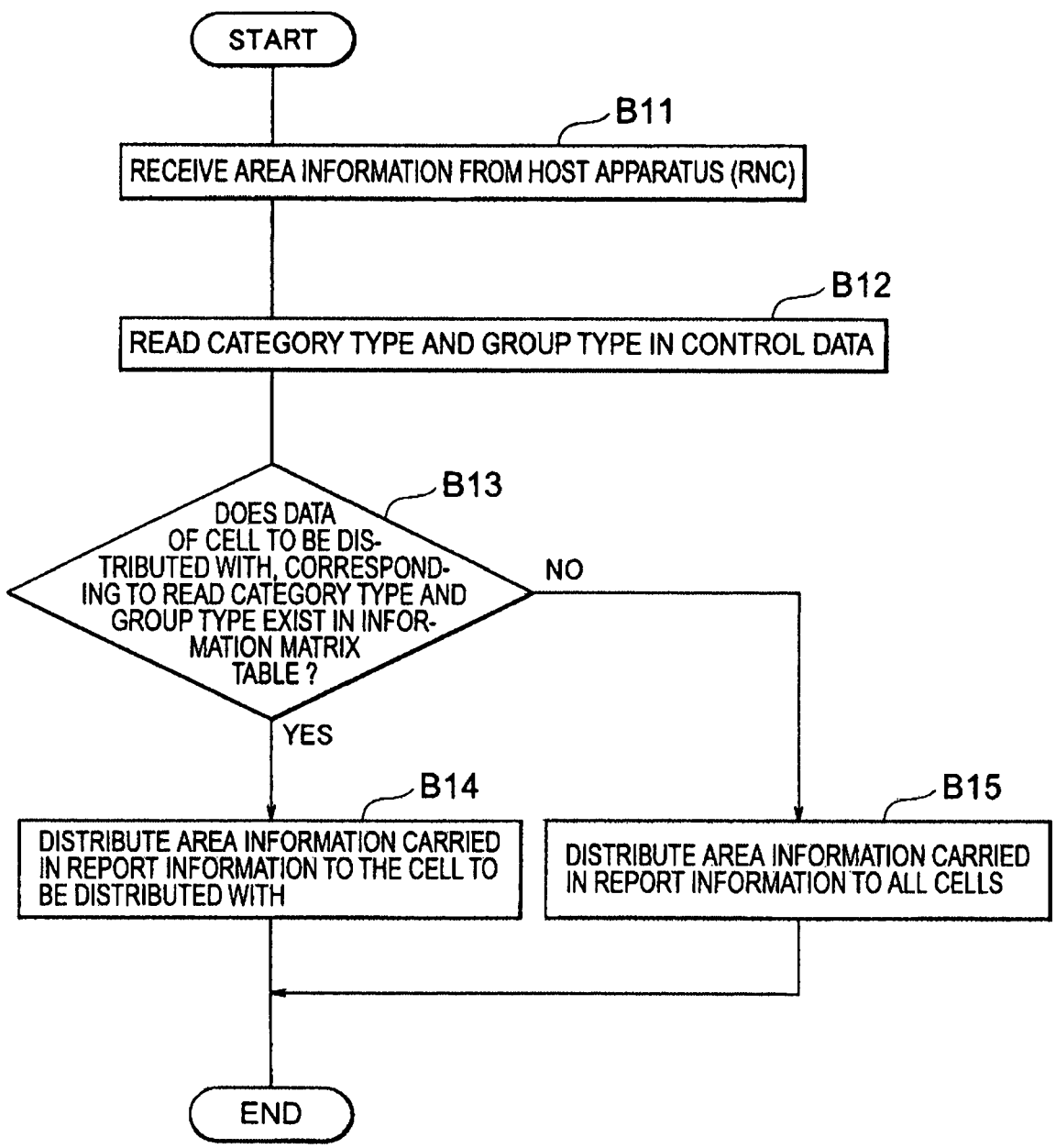
FIG. 12 shows an example of the processing flow executed by the radio Node shown in FIG. 11.
Figure 13:
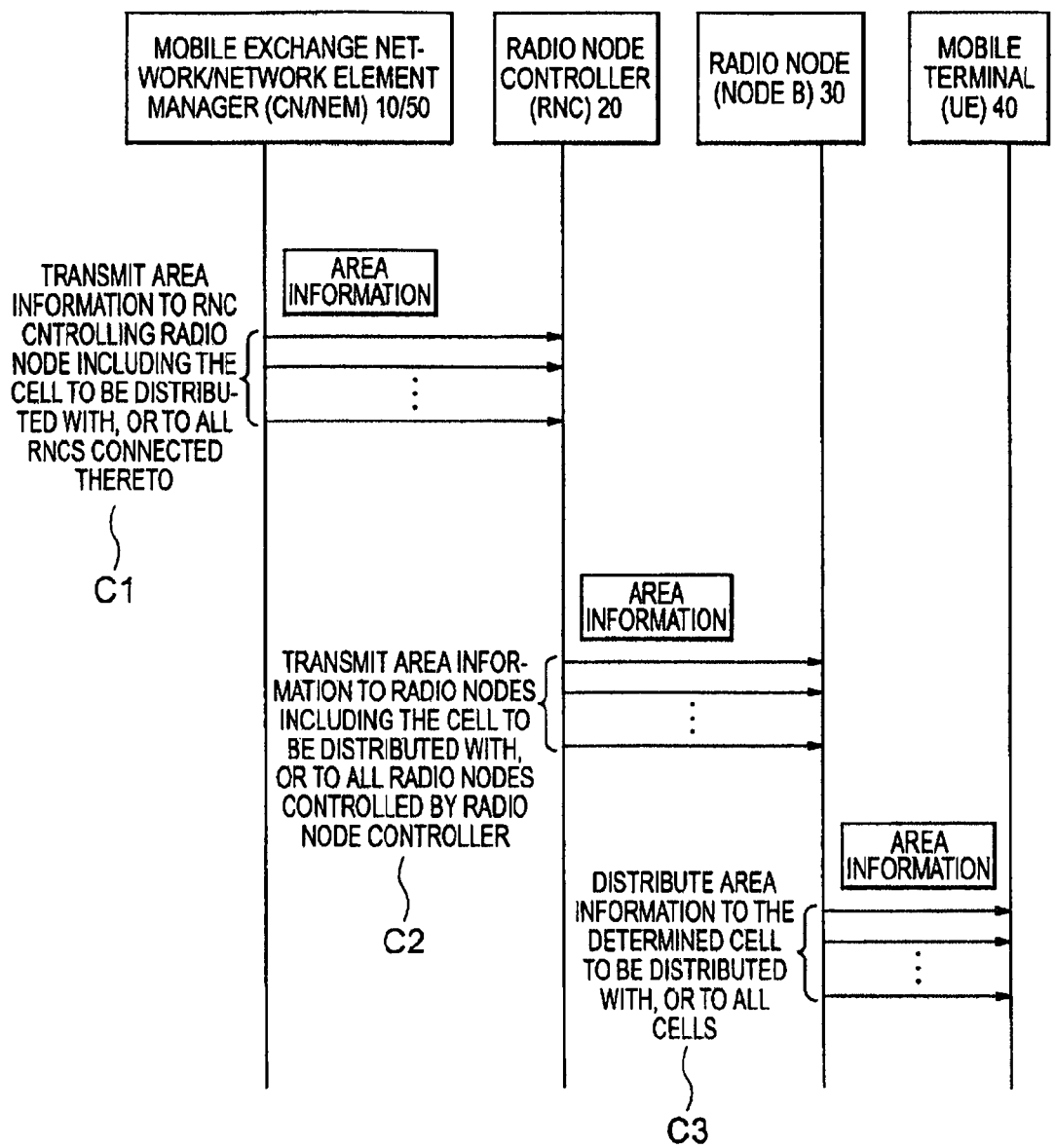
FIG. 13 shows an example of a sequence chart in which a mobile exchange network or a network element manager executes determination of the cell to be distributed with the information.
Figure 14:
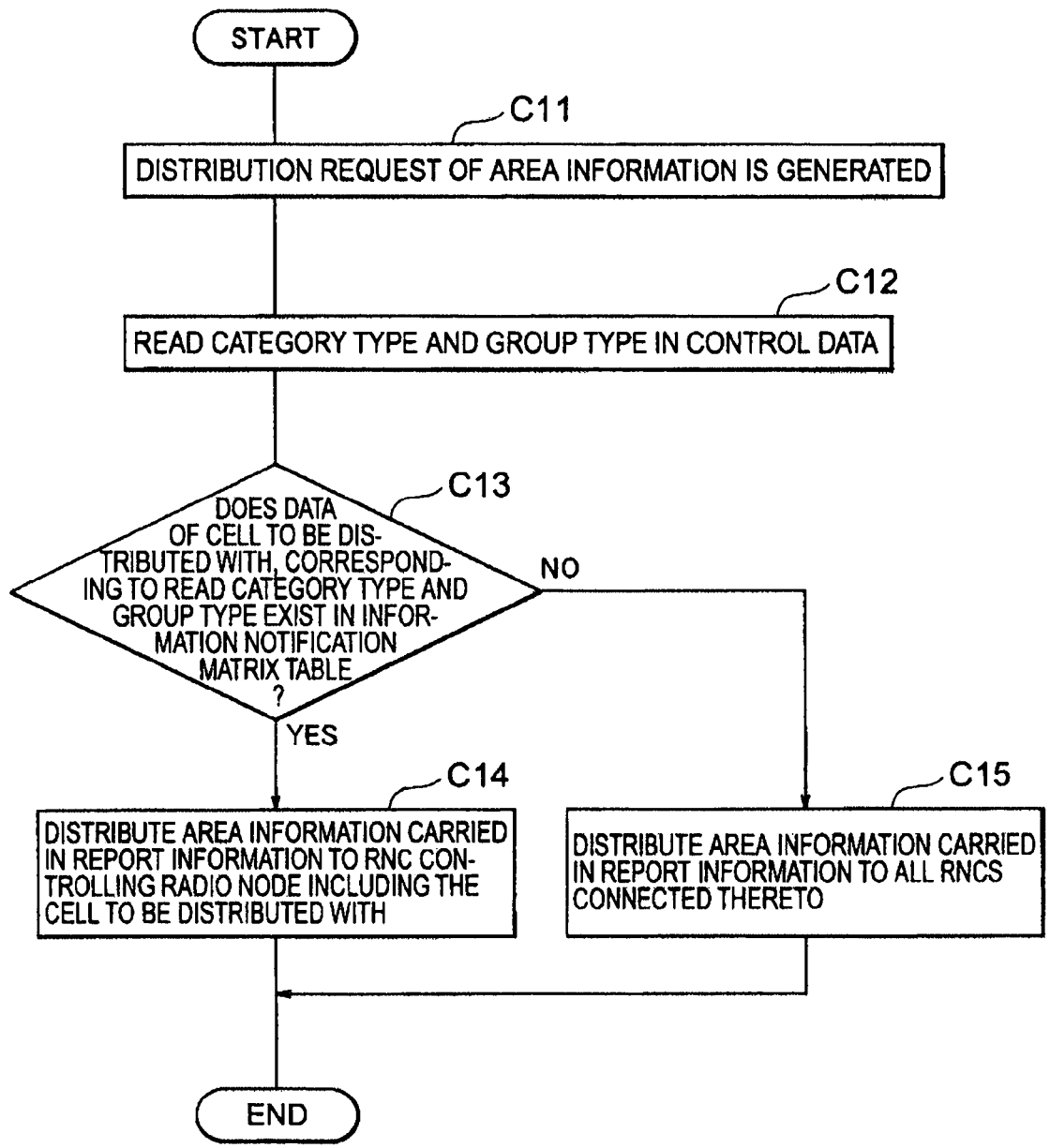
FIG. 14 shows an example of the processing flow executed by the mobile exchange network or the network element manager shown in FIG. 13.
Figure 15:
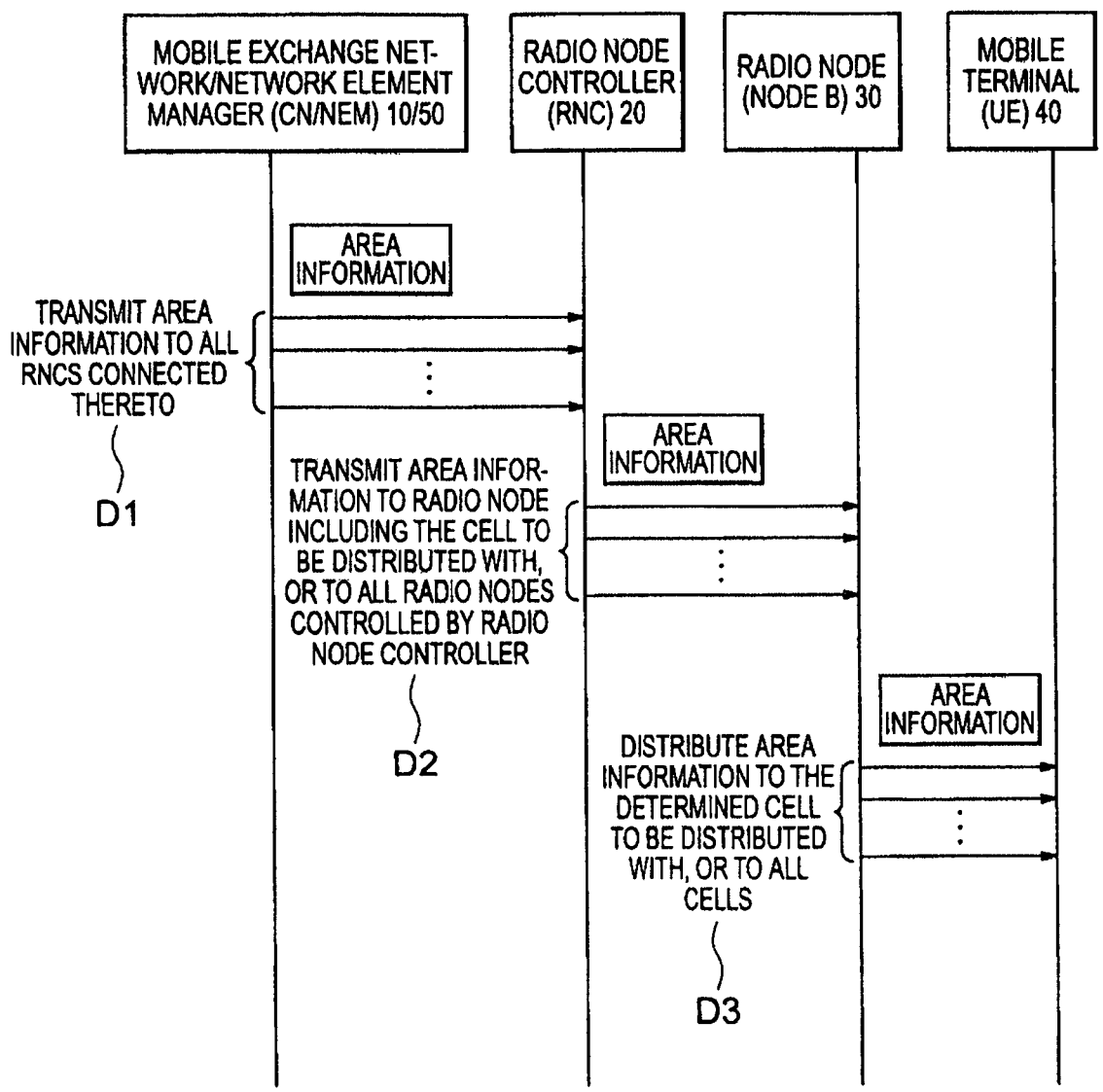
FIG. 15 shows an example of a sequence chart in which the radio Node controller and the radio Node execute determination of the cell to be distributed with the information.
Figure 16:
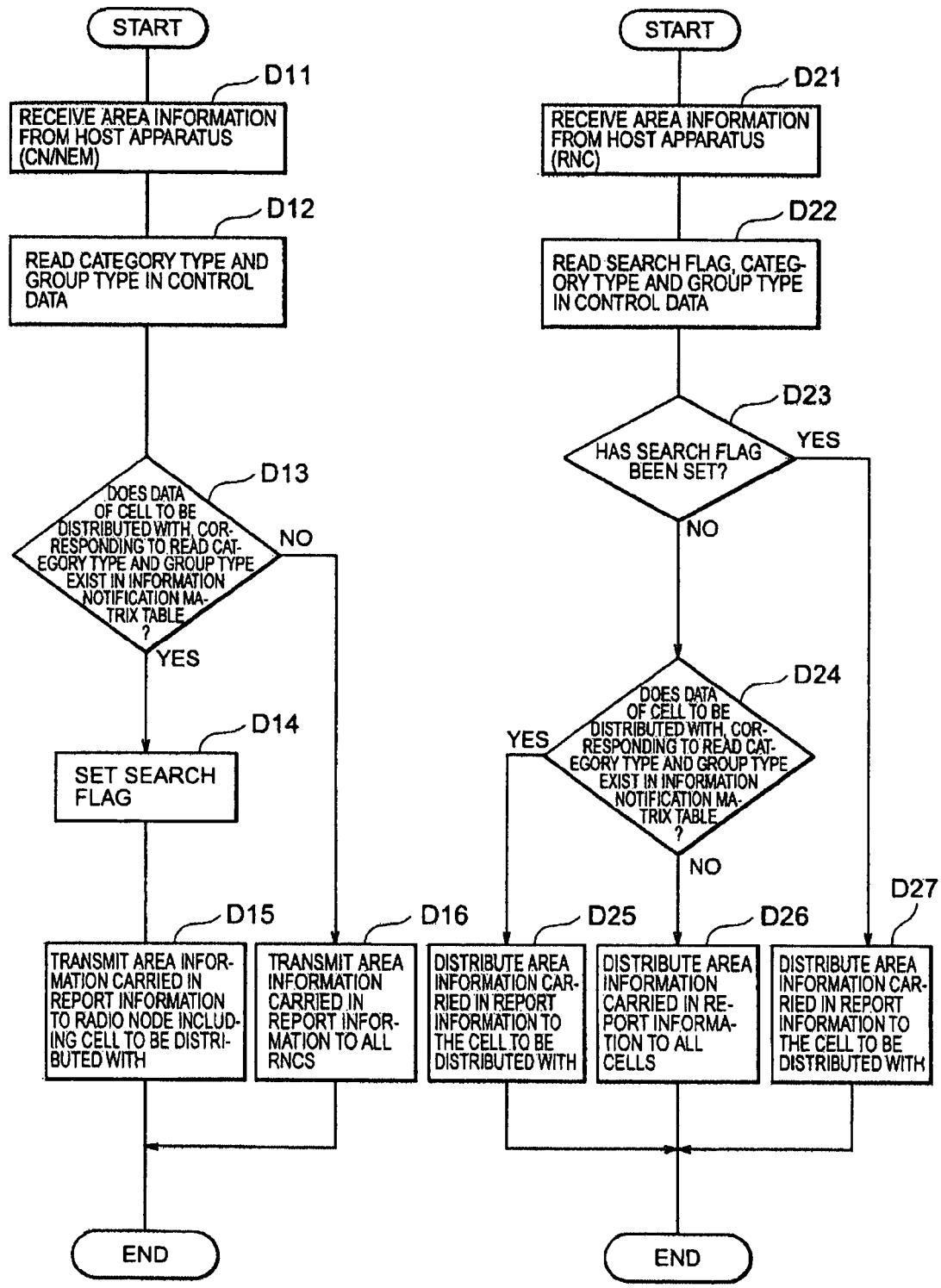
FIG. 16 shows an example of the processing flow executed by the radio Node controller and the radio Node shown in FIG. 15.
Figure 17:
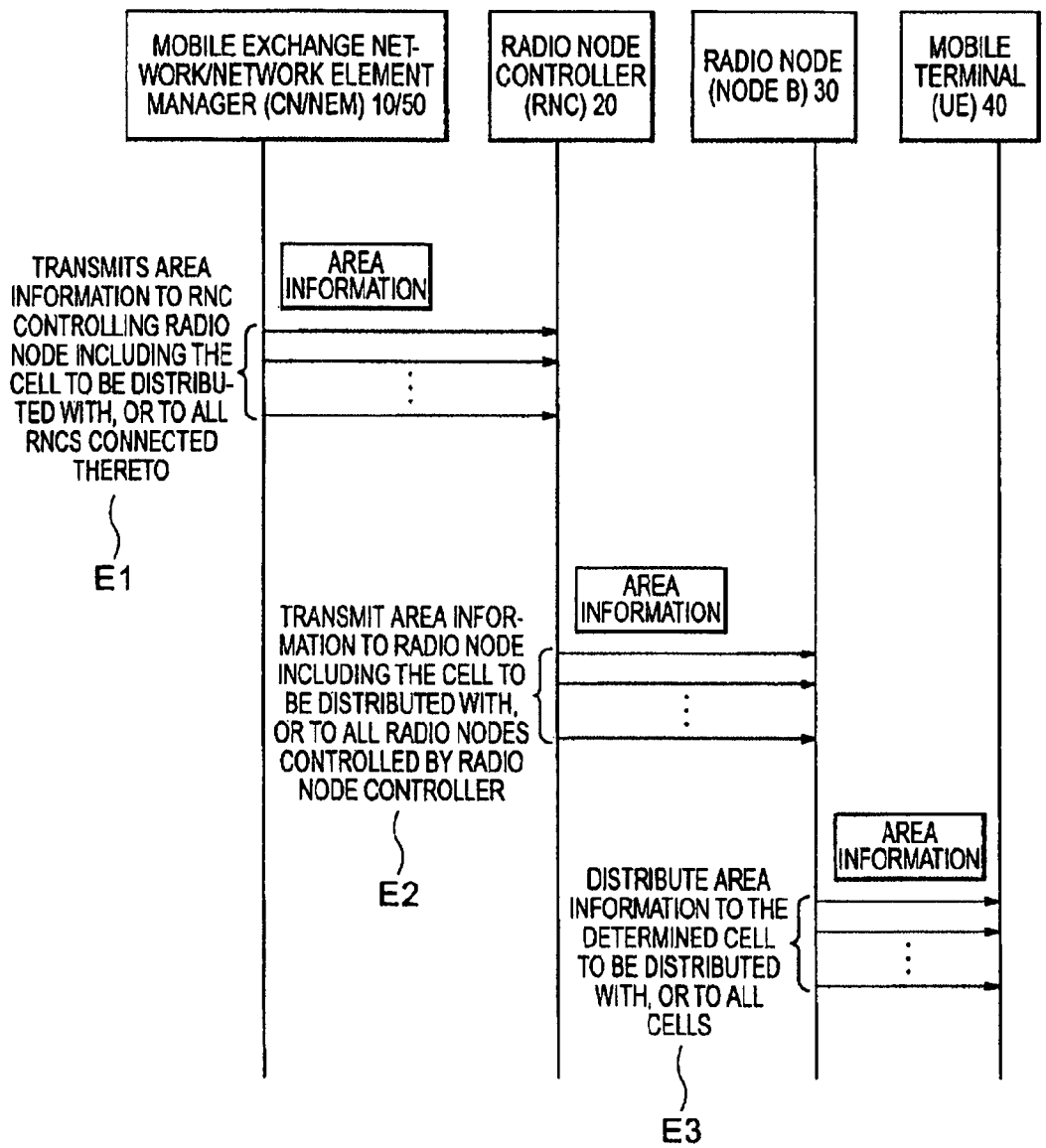
FIG. 17 shows an example of a sequence chart in which the mobile exchange network or the network element manager, and the radio Node controller execute determination of the cell to be distributed with the information.
Figure 18A:
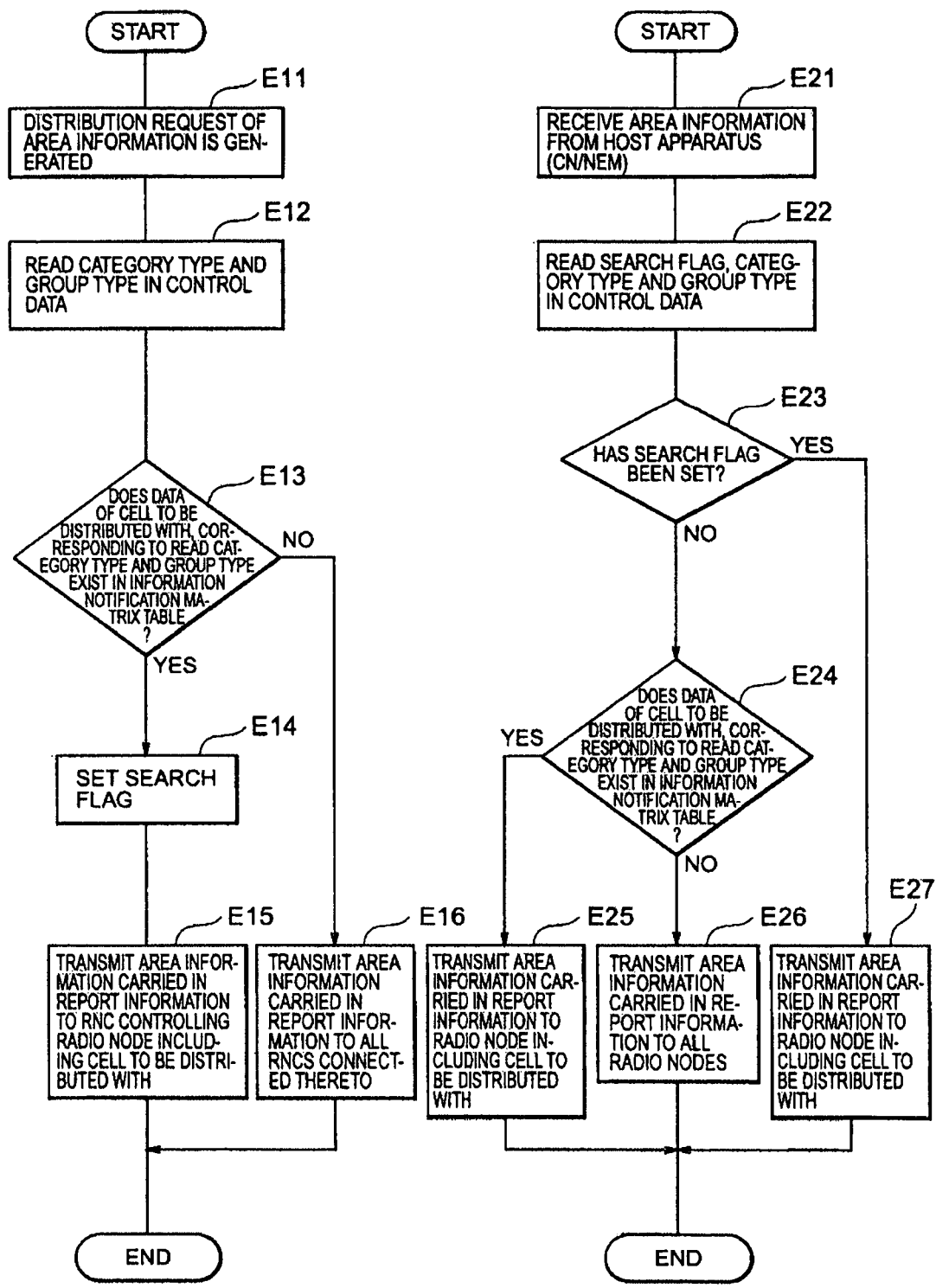
FIG. 18A shows an example of the processing flow executed by the mobile exchange network or the network element manager, and the radio Node controller shown in FIG. 17.
Figure 18B:
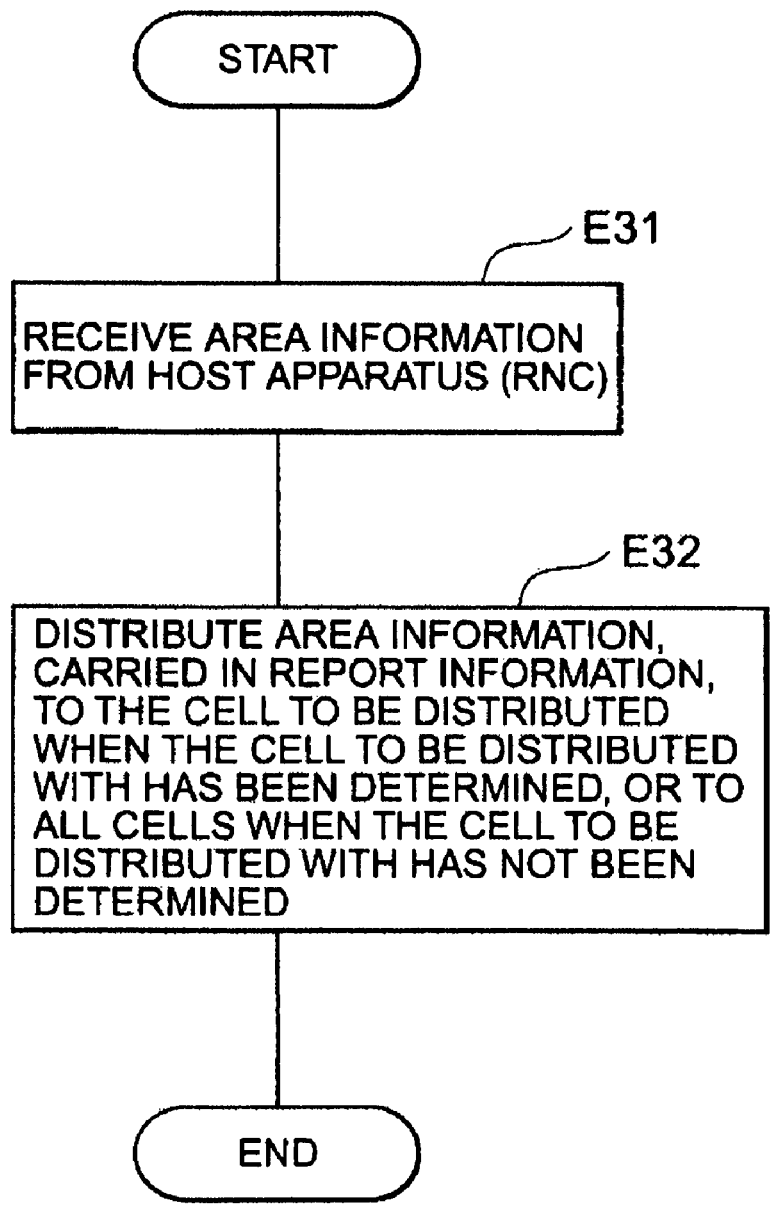
FIG. 18B shows an example of the processing flow executed by the radio Node shown in FIG. 17.
Figure 19:
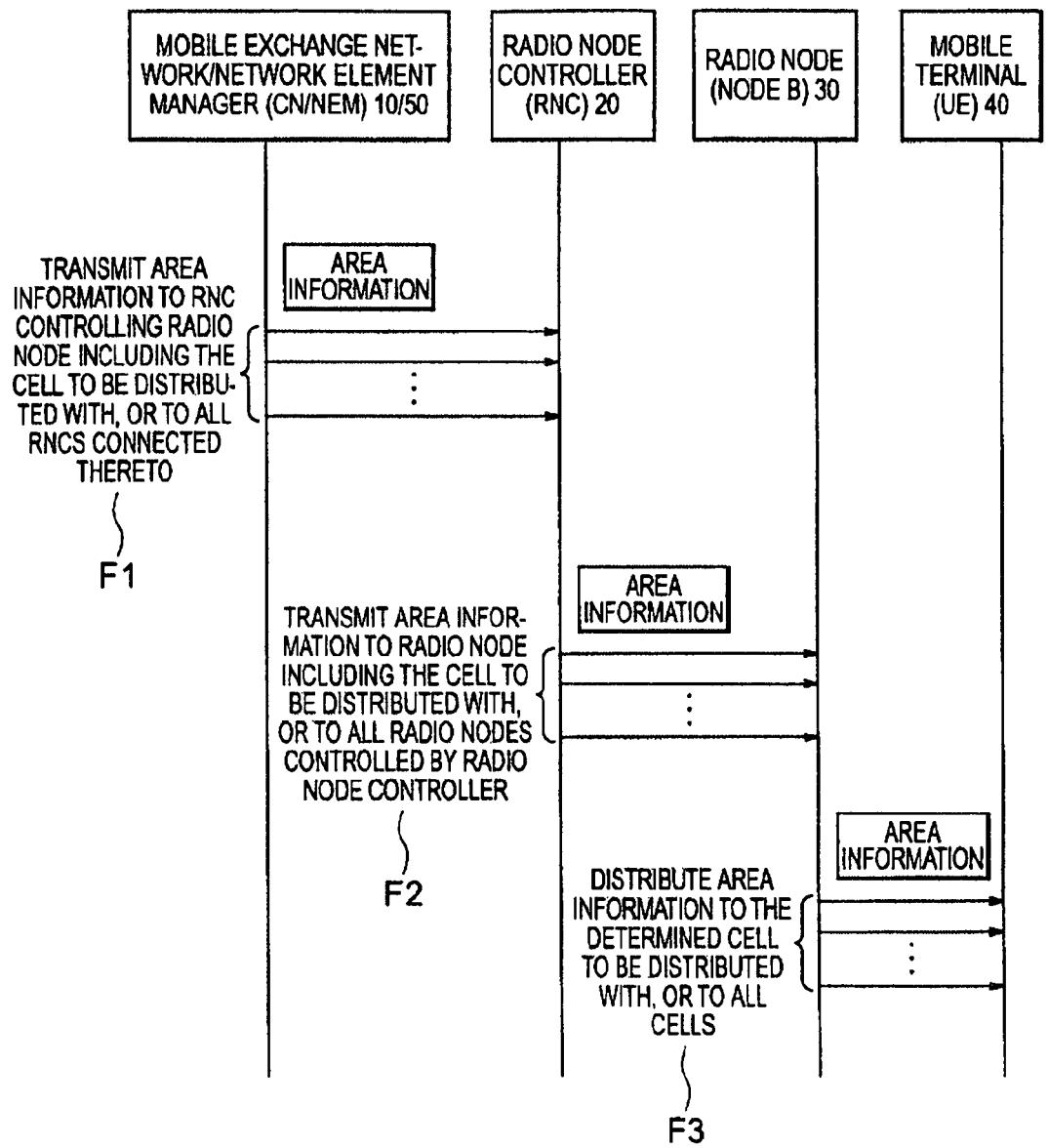
FIG. 19 shows an example of a sequence chart in which the mobile exchange network or the network element manager, and the radio Node execute determination of the cell to be distributed with the information.
Figure 20A:
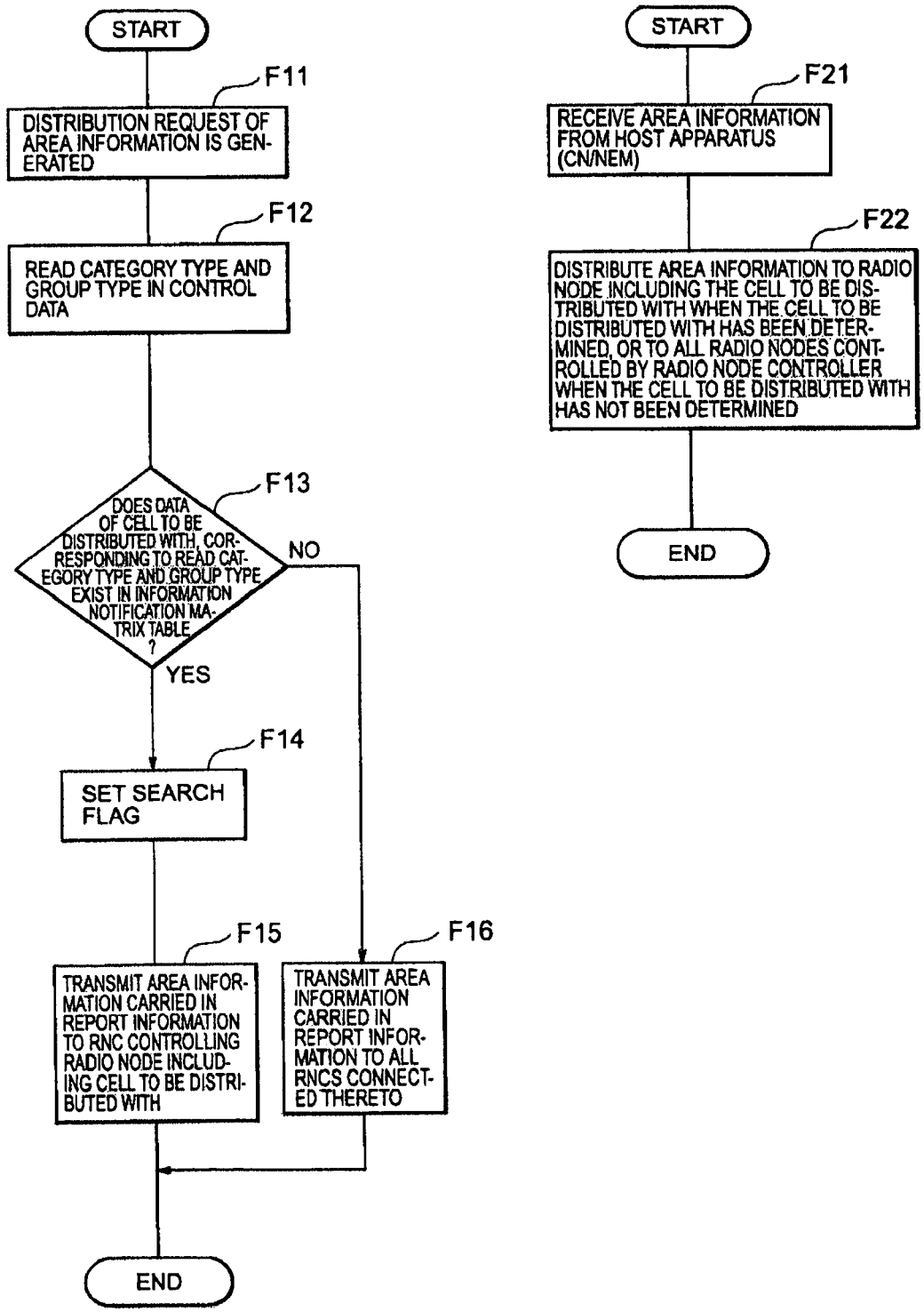
FIG. 20A shows an example of the processing flow executed by the mobile exchange network or the network element manager, and the radio Node shown in FIG. 19.
Figure 20B:
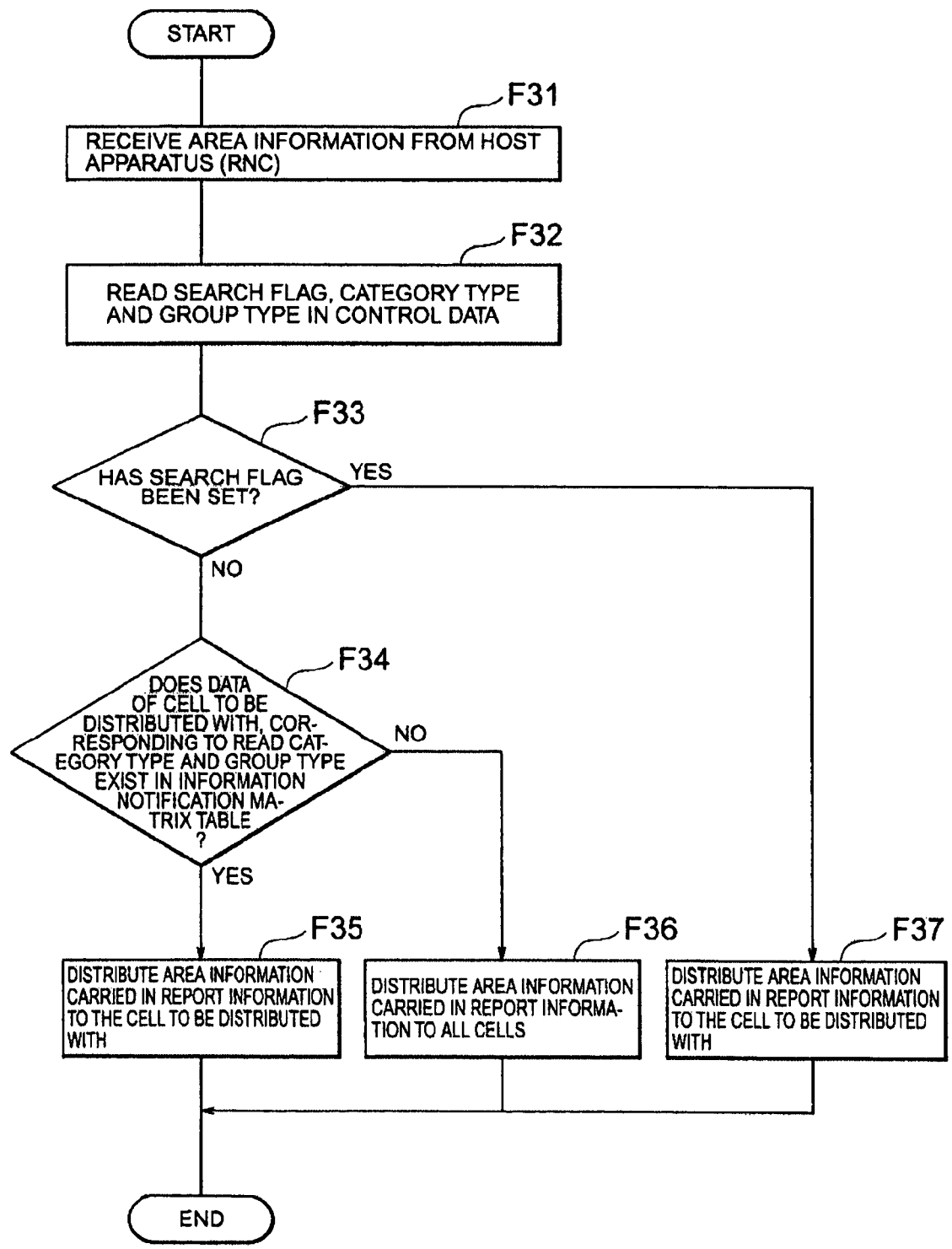
FIG. 20B shows an example of the processing flow executed by the radio Node shown in FIG. 19.
Figure 21:
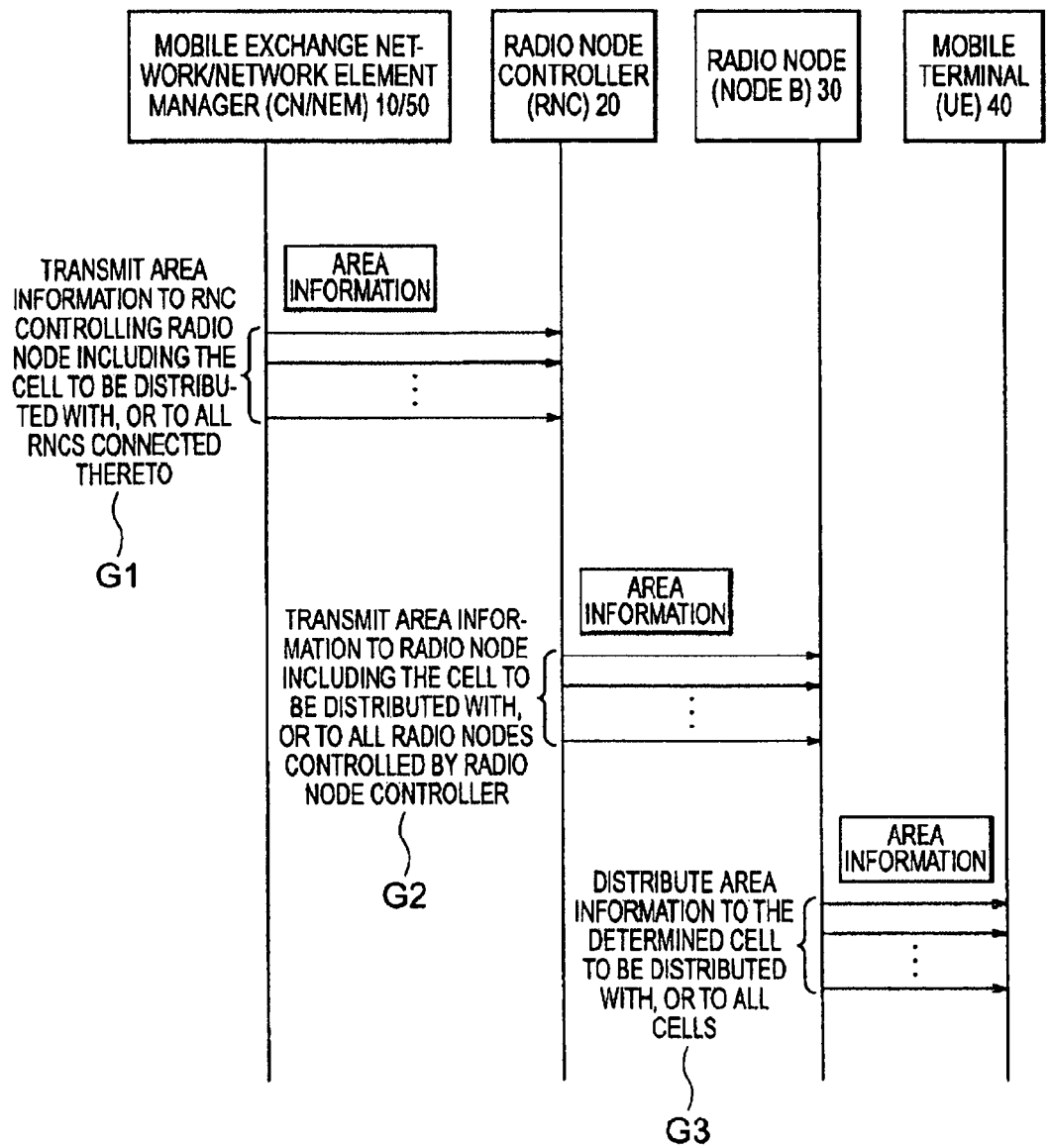
FIG. 21 shows an example of a sequence chart in which the mobile exchange network or the network element manager, the radio Node controller and the radio Node execute determination of the cell to be distributed with the information.
Figure 22A:
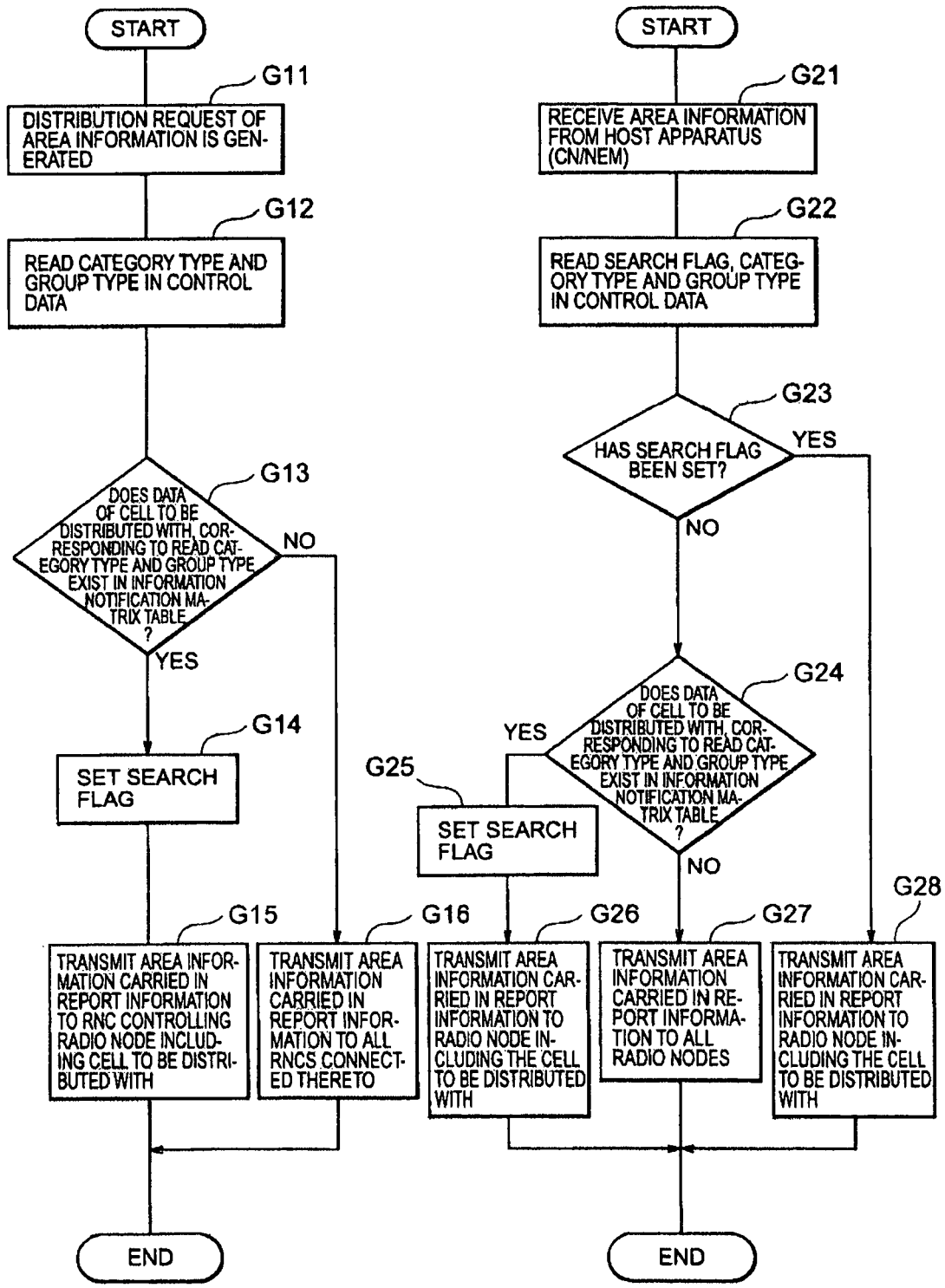
FIG. 22A shows an example of the processing flow executed by the mobile exchange network or the network element manager, and the radio Node controller shown in FIG. 21.
Figure 22B:
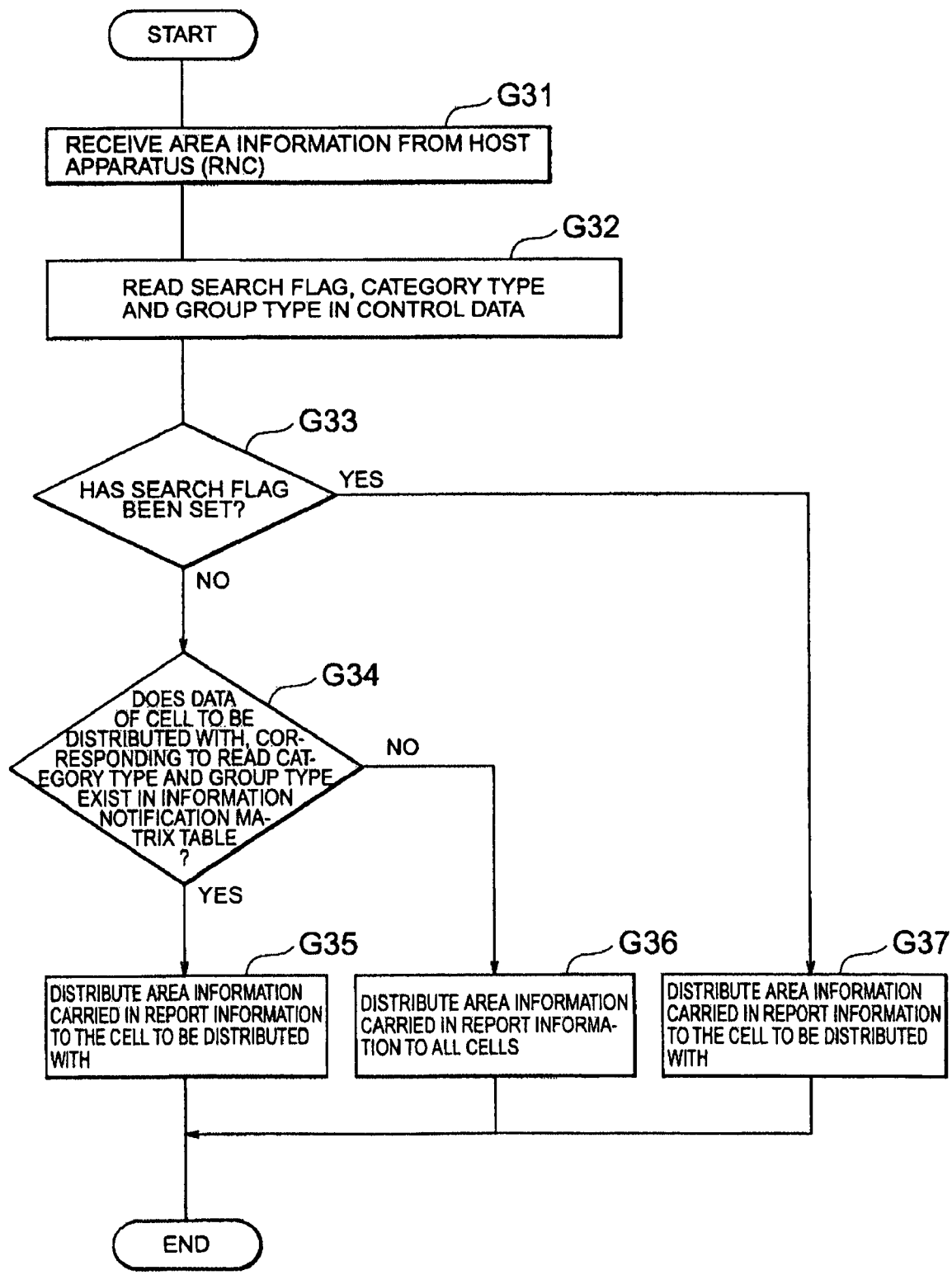
FIG. 22B shows an example of the processing flow executed by the radio Node shown in FIG. 21.
Figure 23:
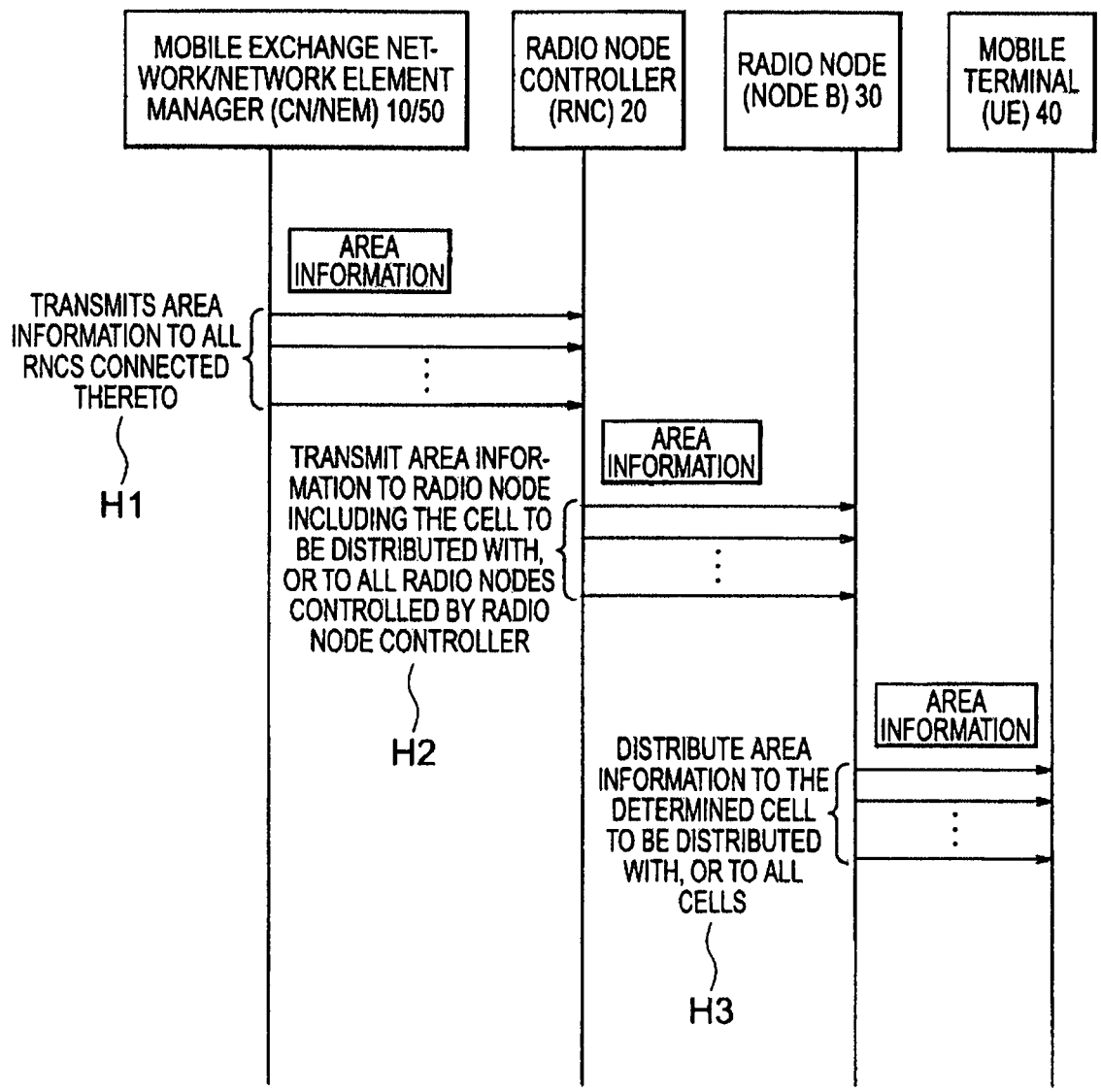
FIG. 23 shows an example of a sequence chart in which the radio Node controller executes determination of the cell to be distributed with the information.
Figure 24:
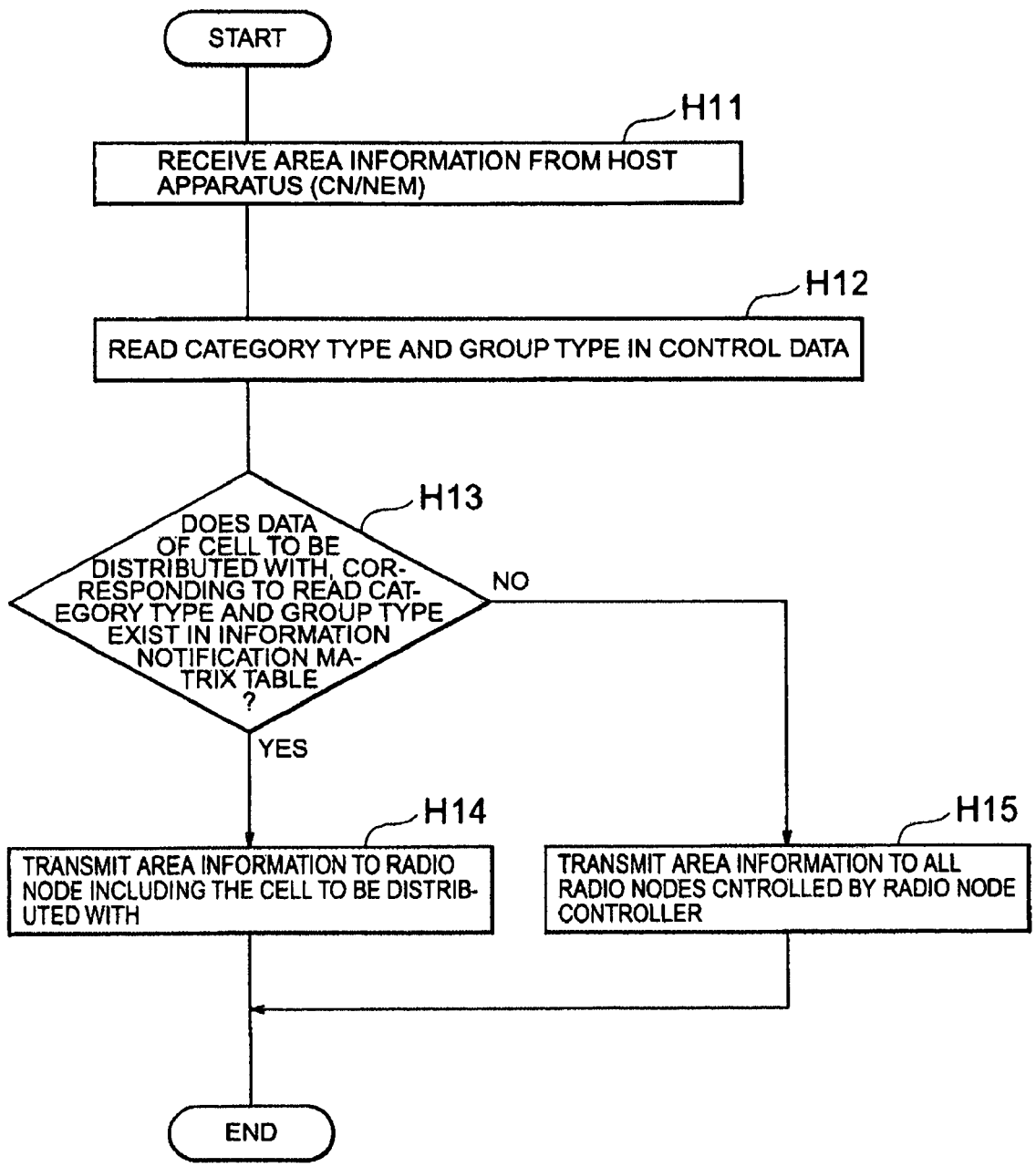
FIG. 24 shows an example of a processing flow executed by the radio Node controller shown in FIG. 23.
Figure 25:
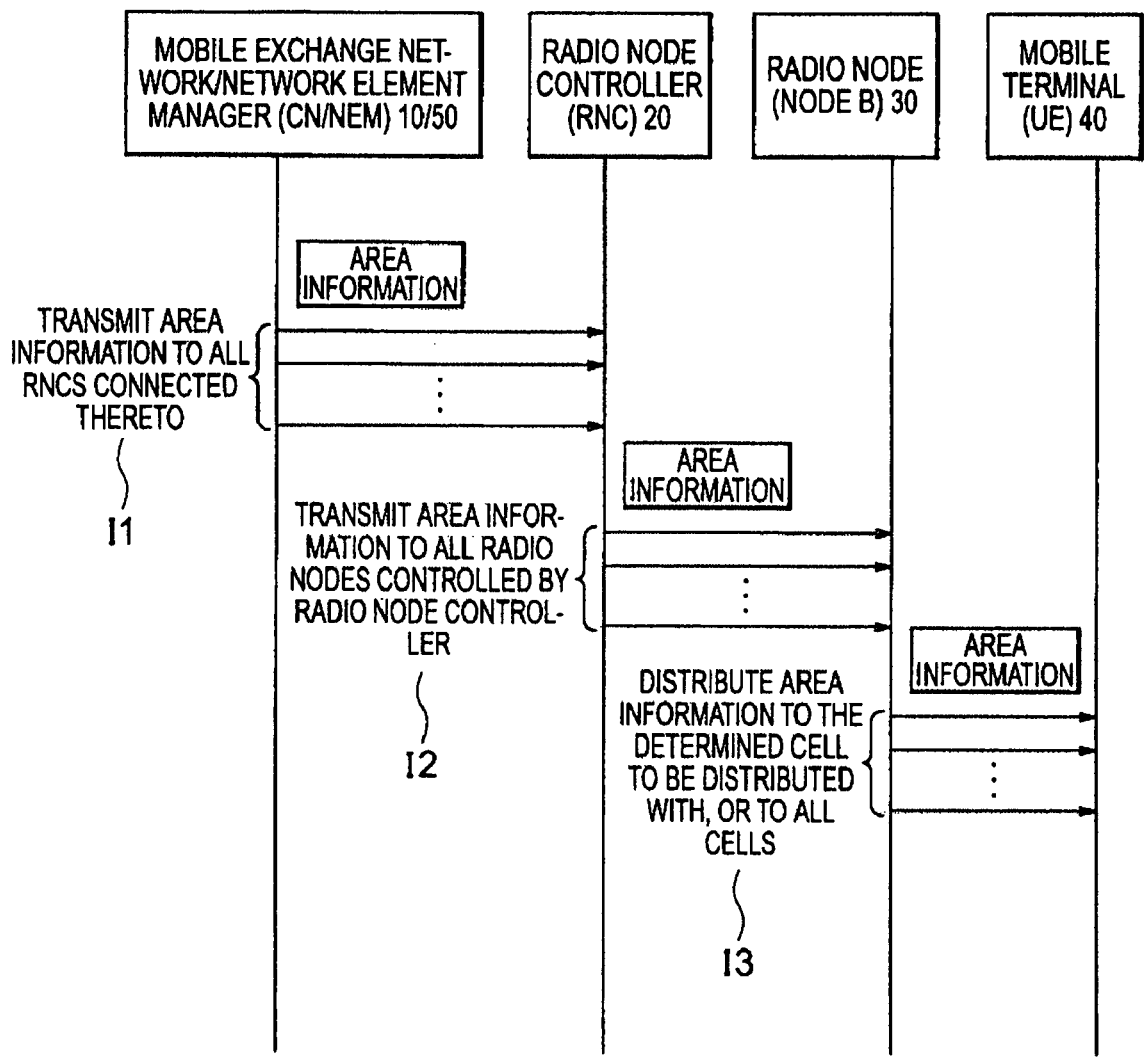
FIG. 25 shows an example of a sequence chart in which the radio Node determines the cell to be distributed with the information.
Figure 26:
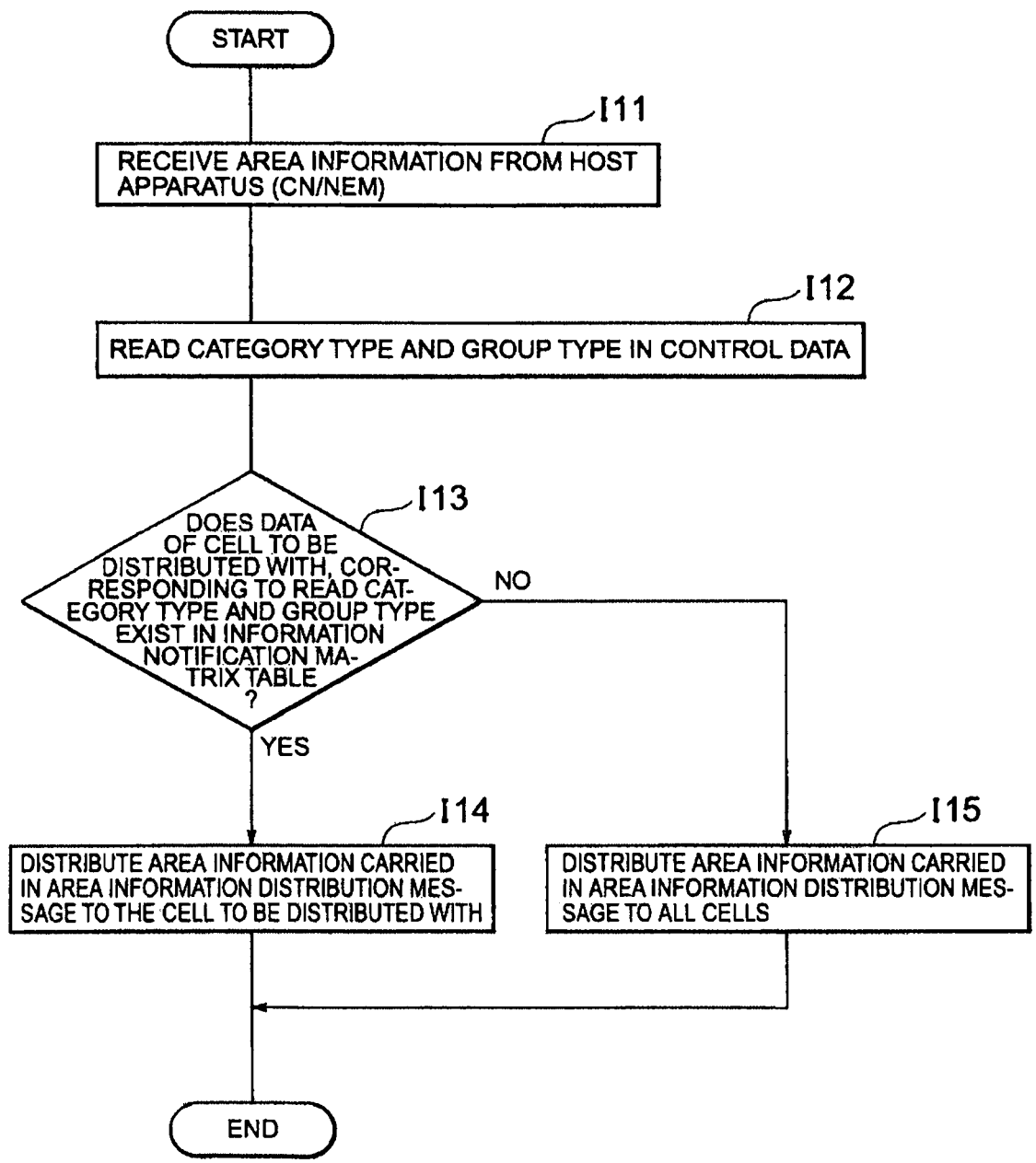
FIG. 26 shows an example of the processing flow executed by the radio Node shown in FIG. 25.
Figure 27:
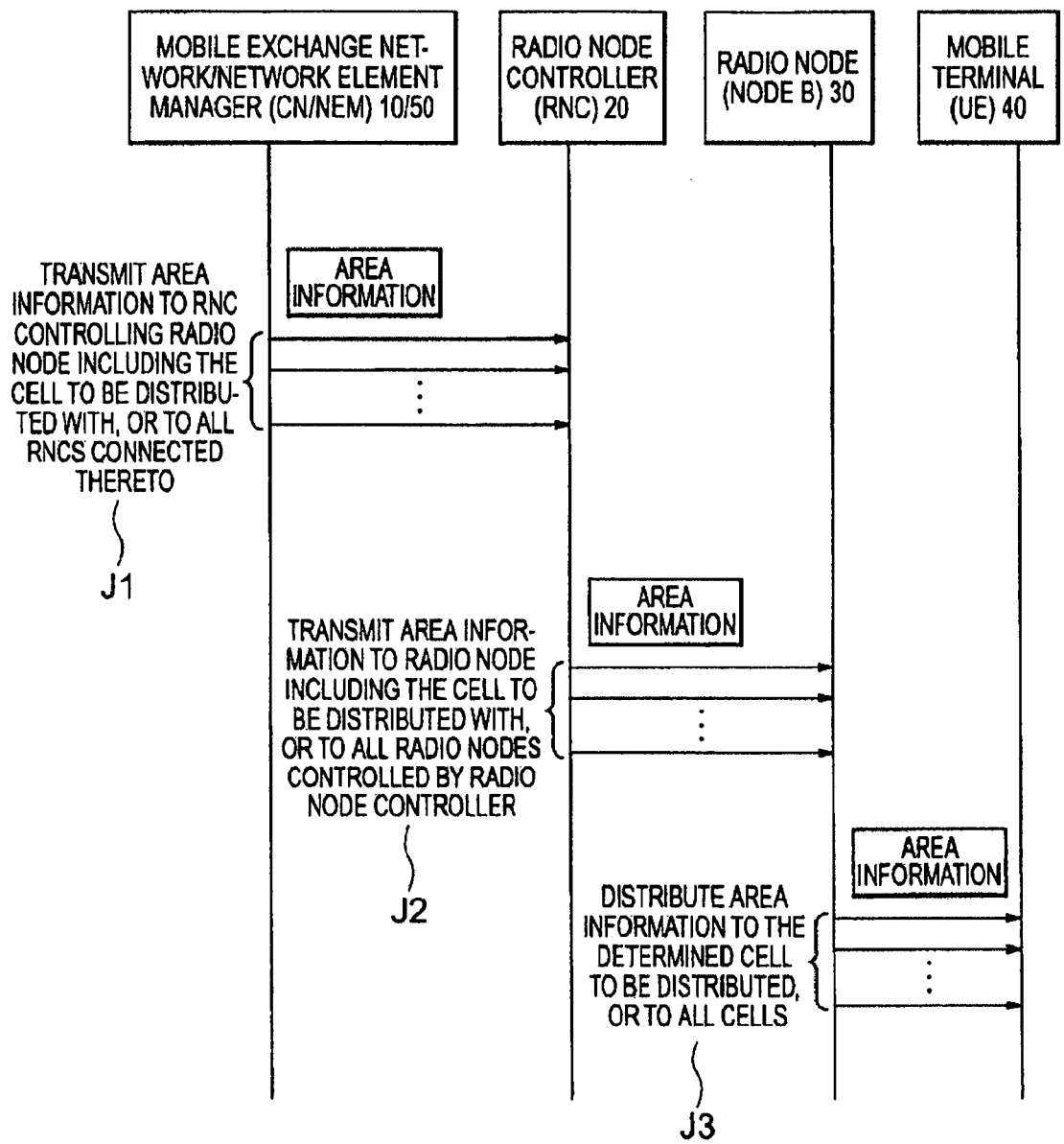
FIG. 27 shows an example of a sequence chart in which a mobile exchange network or a network element manager executes determination of the cell to be distributed with the information.
Figure 28:
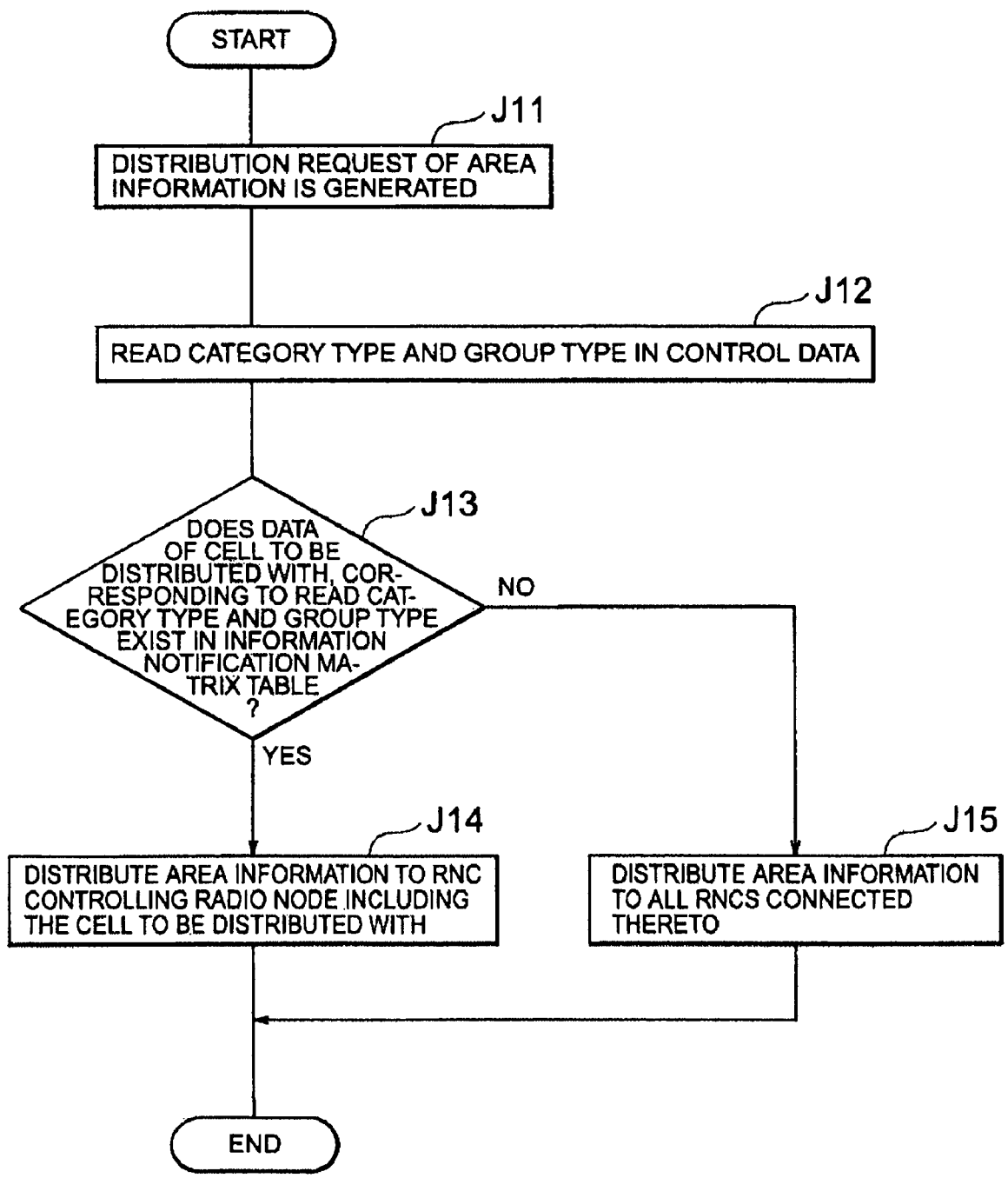
FIG. 28 shows an example of the processing flow executed by the mobile exchange network or the network element manager shown in FIG. 27.
Figure 29:
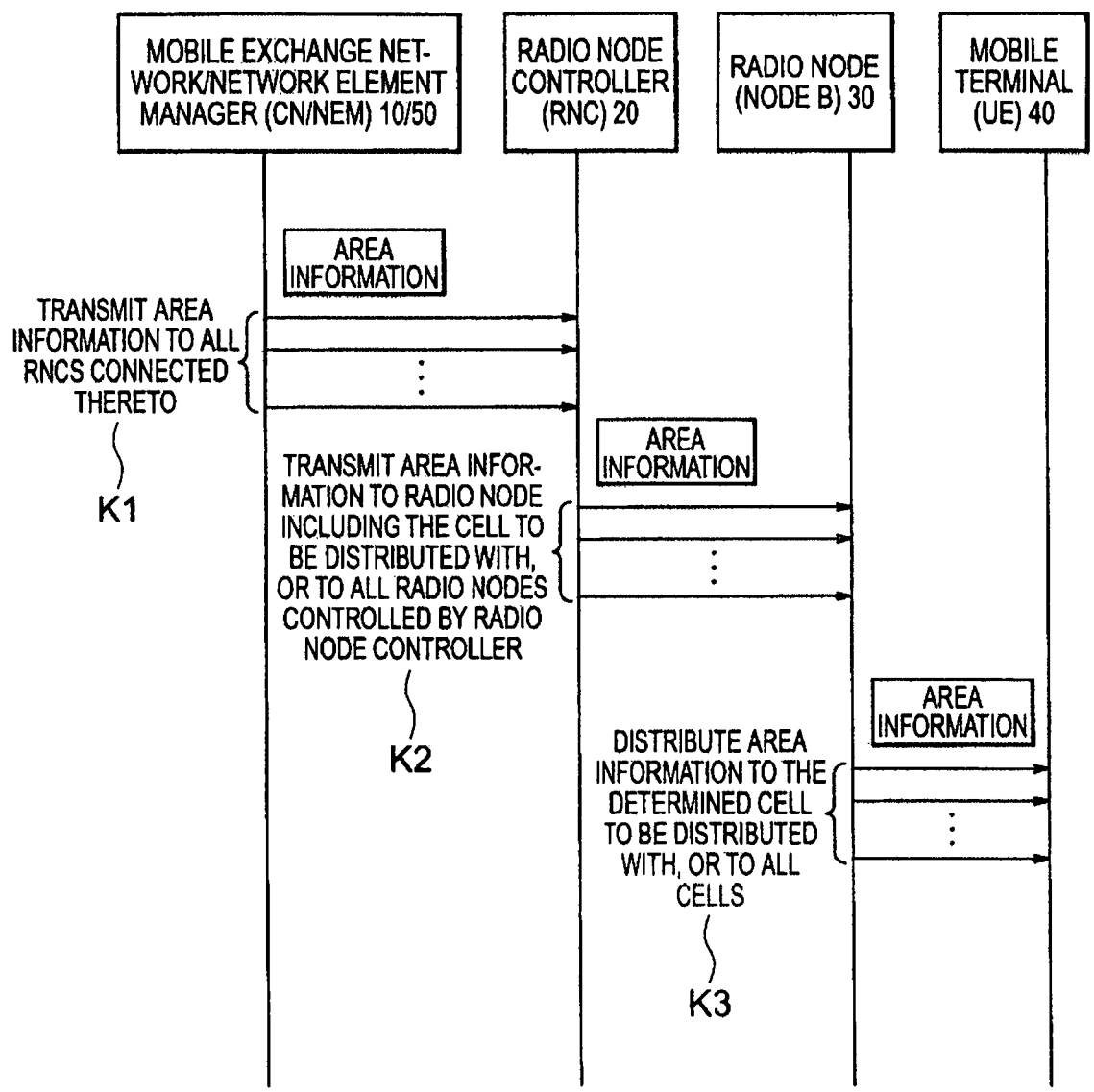
FIG. 29 shows an example of a sequence chart in which the radio Node controller and the radio Node execute determination of the cell to be distributed with the information.
Figure 30:
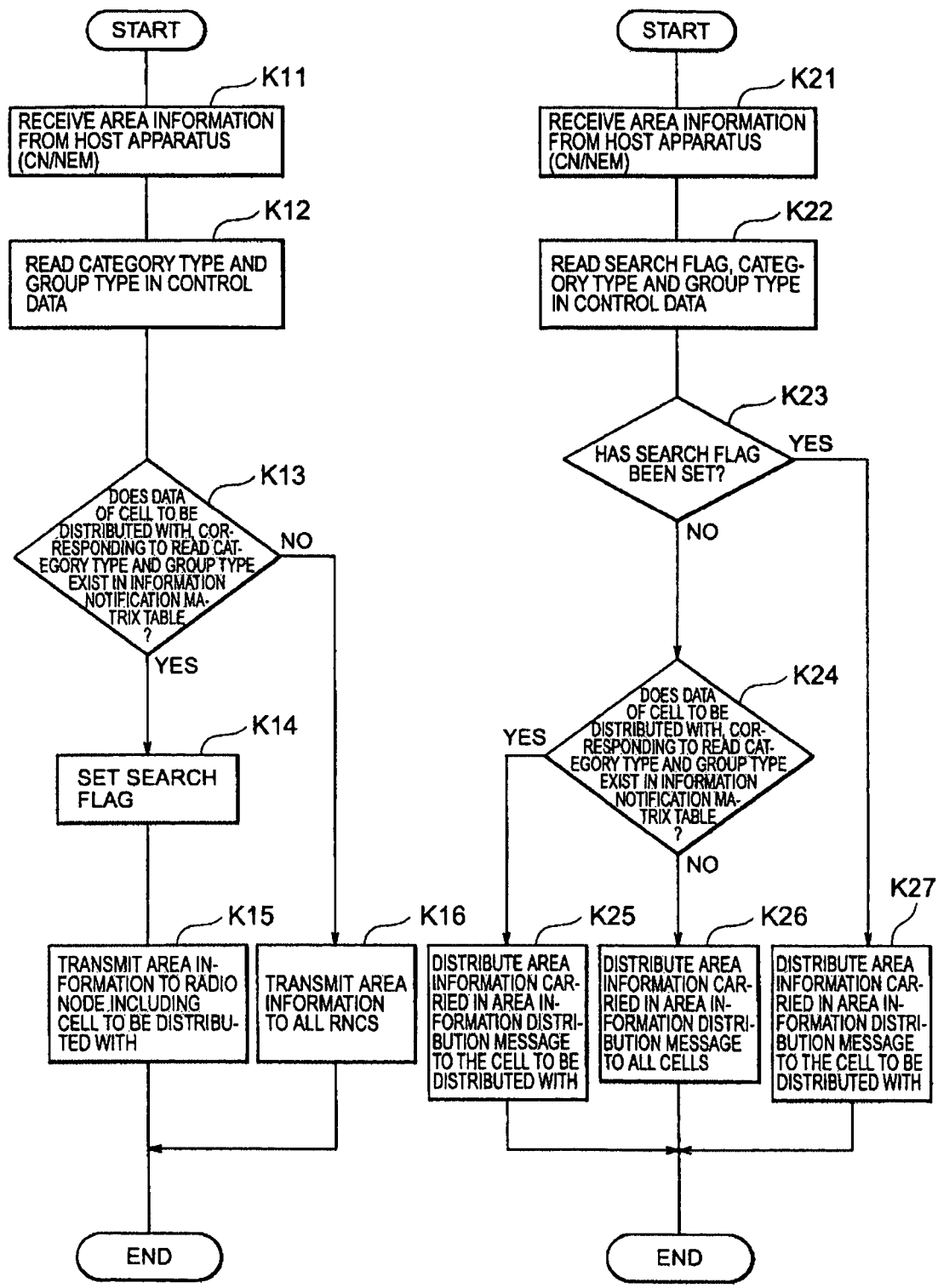
FIG. 30 shows an example of the processing flow executed by the radio Node controller and the radio Node shown in FIG. 29.
Figure 31:
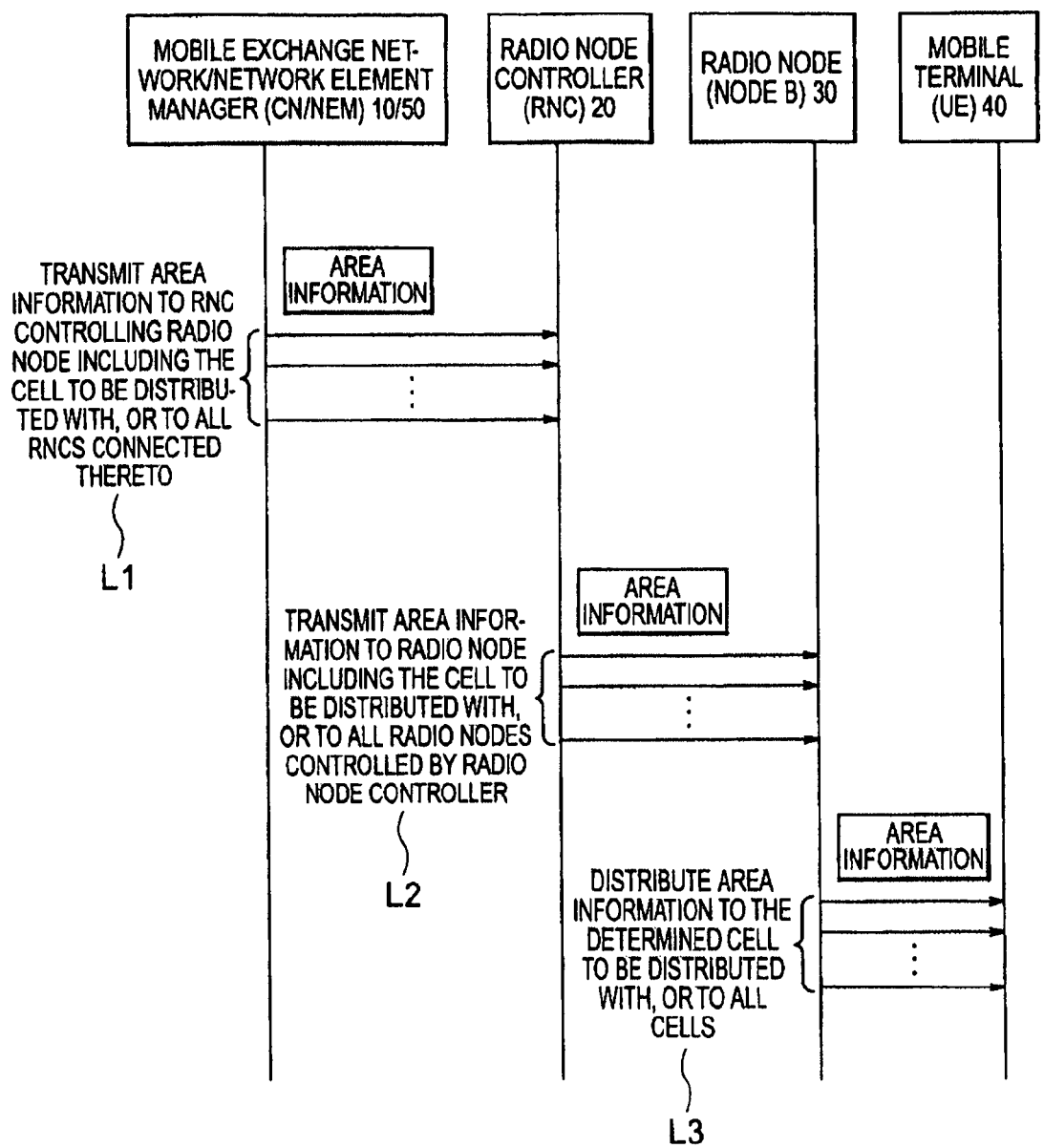
FIG. 31 shows an example of a sequence chart in which the mobile exchange network or the network element manager, and the radio Node controller execute determination of the cell to be distributed with the information.
Figure 32A:
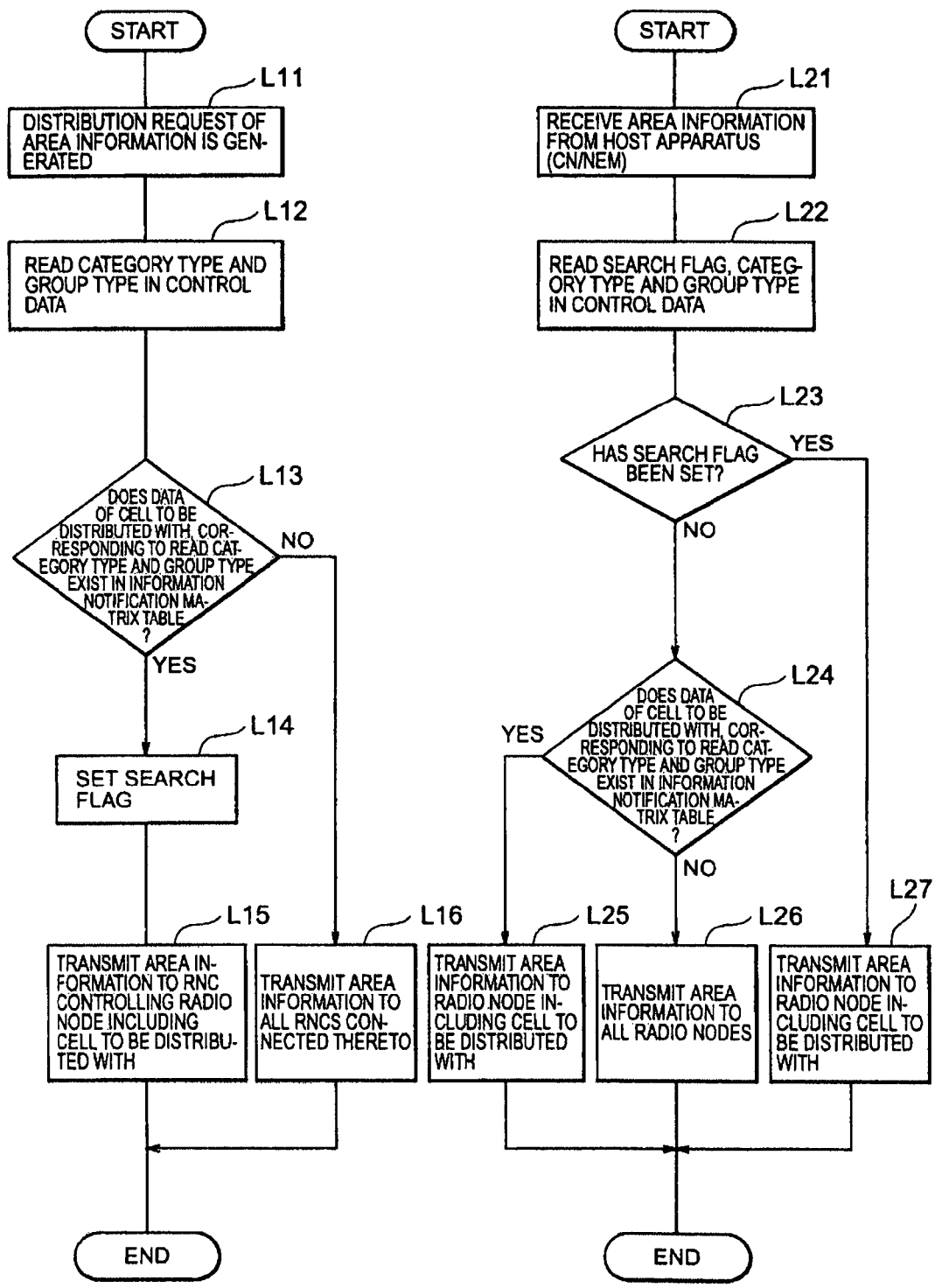
FIG. 32A shows an example of the processing flow executed by the mobile exchange network or the network element manager, and the radio Node controller shown in FIG. 31.
Figure 32B:
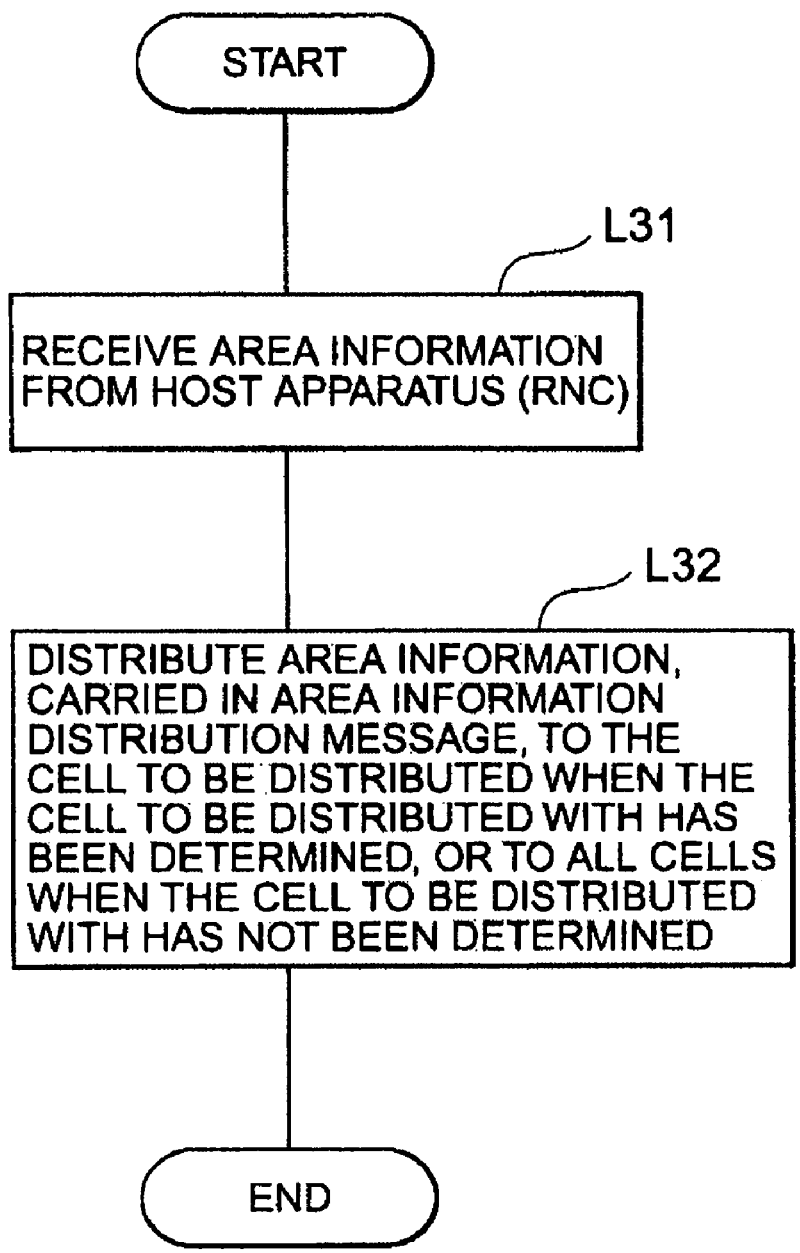
FIG. 32B shows an example of the processing flow executed by the radio Node shown in FIG. 31.
Figure 33:
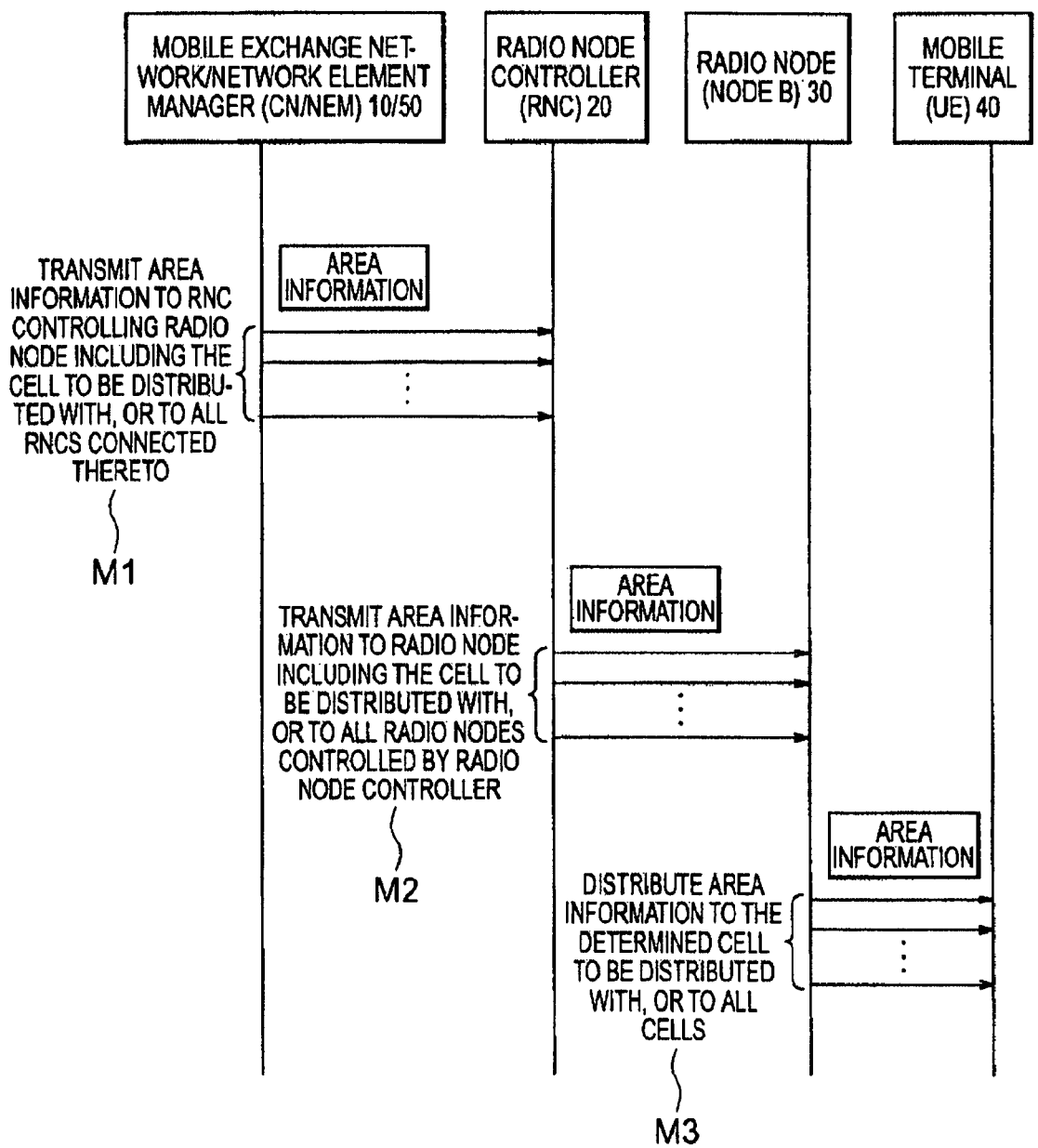
FIG. 33 shows an example of a sequence chart in which the mobile exchange network or the network element manager, and the radio Node execute determination of the cell to be distributed with the information.
Figure 34A:
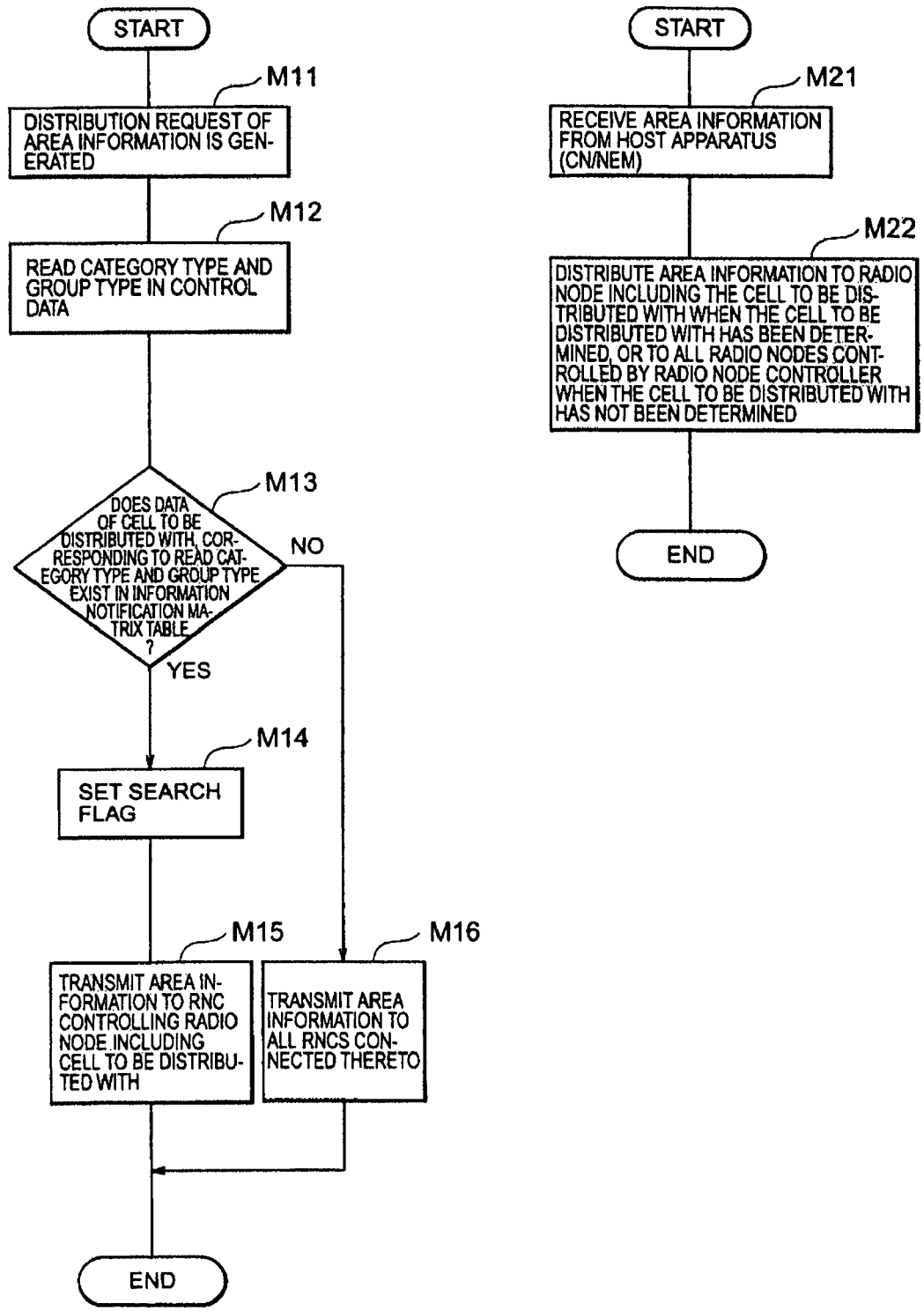
FIG. 34A shows an example of the processing flow executed by the mobile exchange network or the network element manager, and the radio Node shown in FIG. 33.
Figure 34B:
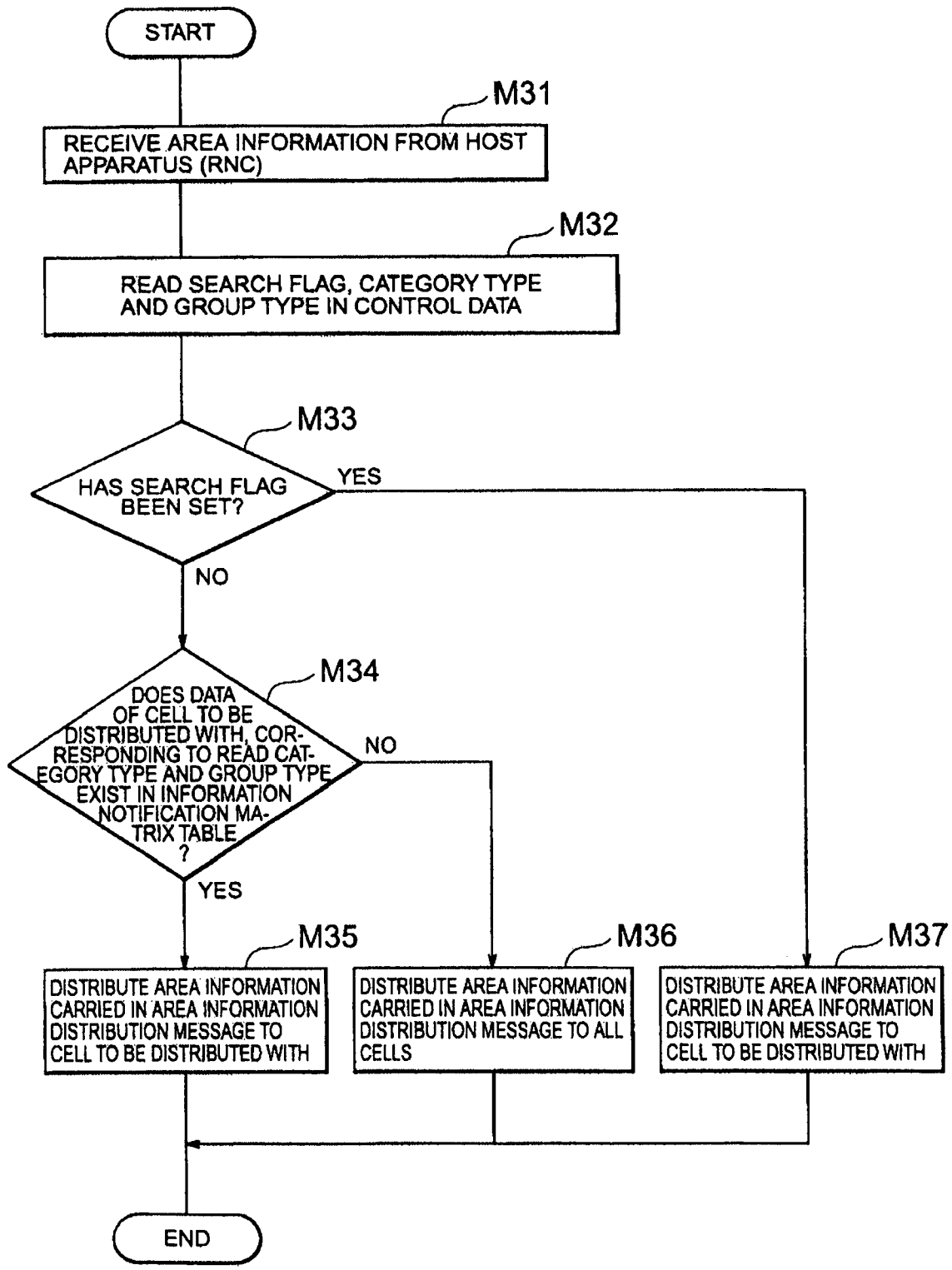
FIG. 34B shows an example of the processing flow executed by the radio Node shown in FIG. 33.
Figure 35:
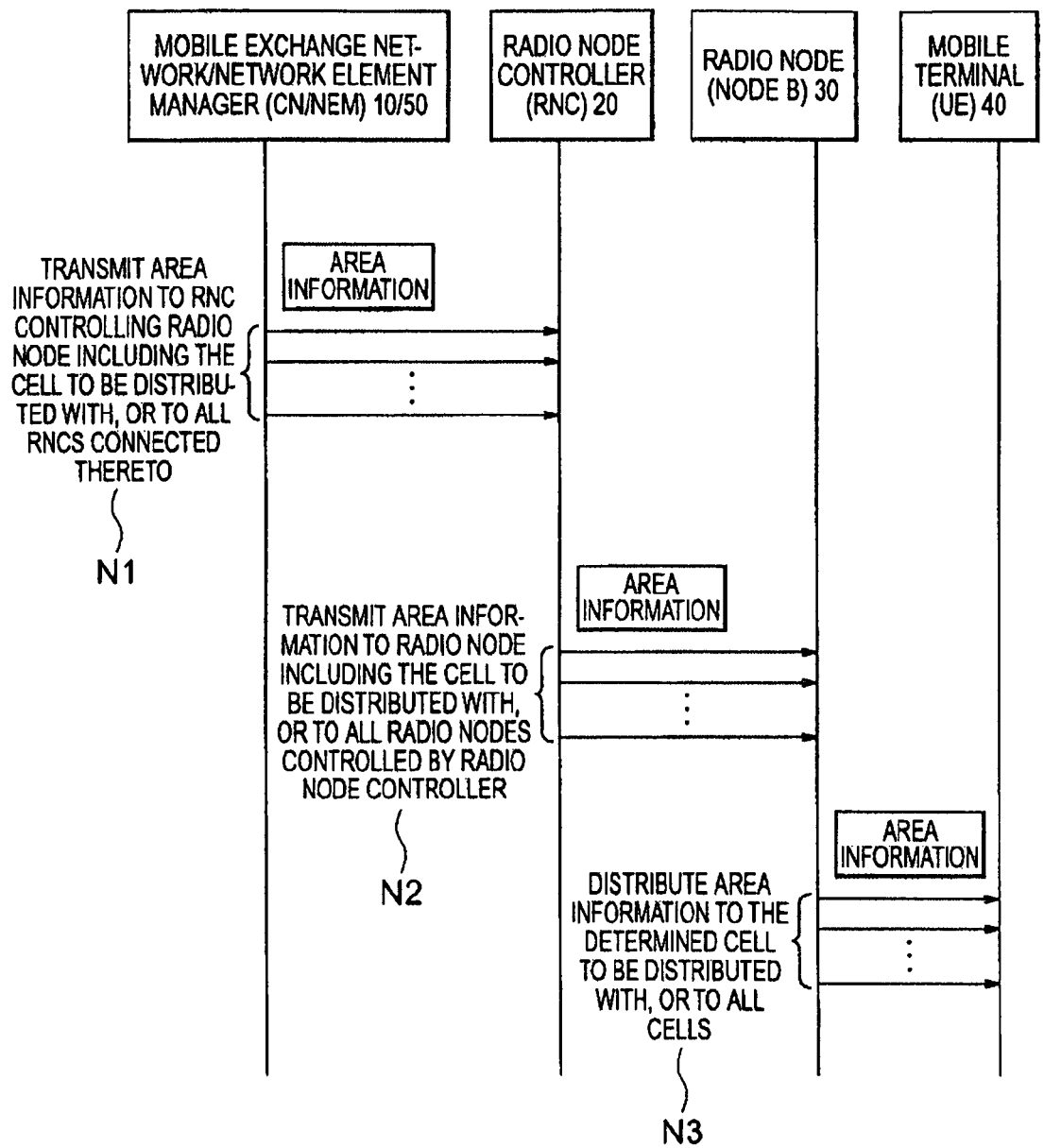
FIG. 35 shows an example of a sequence chart in which the mobile exchange network or the network element manager, the radio Node controller and the radio Node execute determination of the cell to be distributed with the information.
Figure 36A:
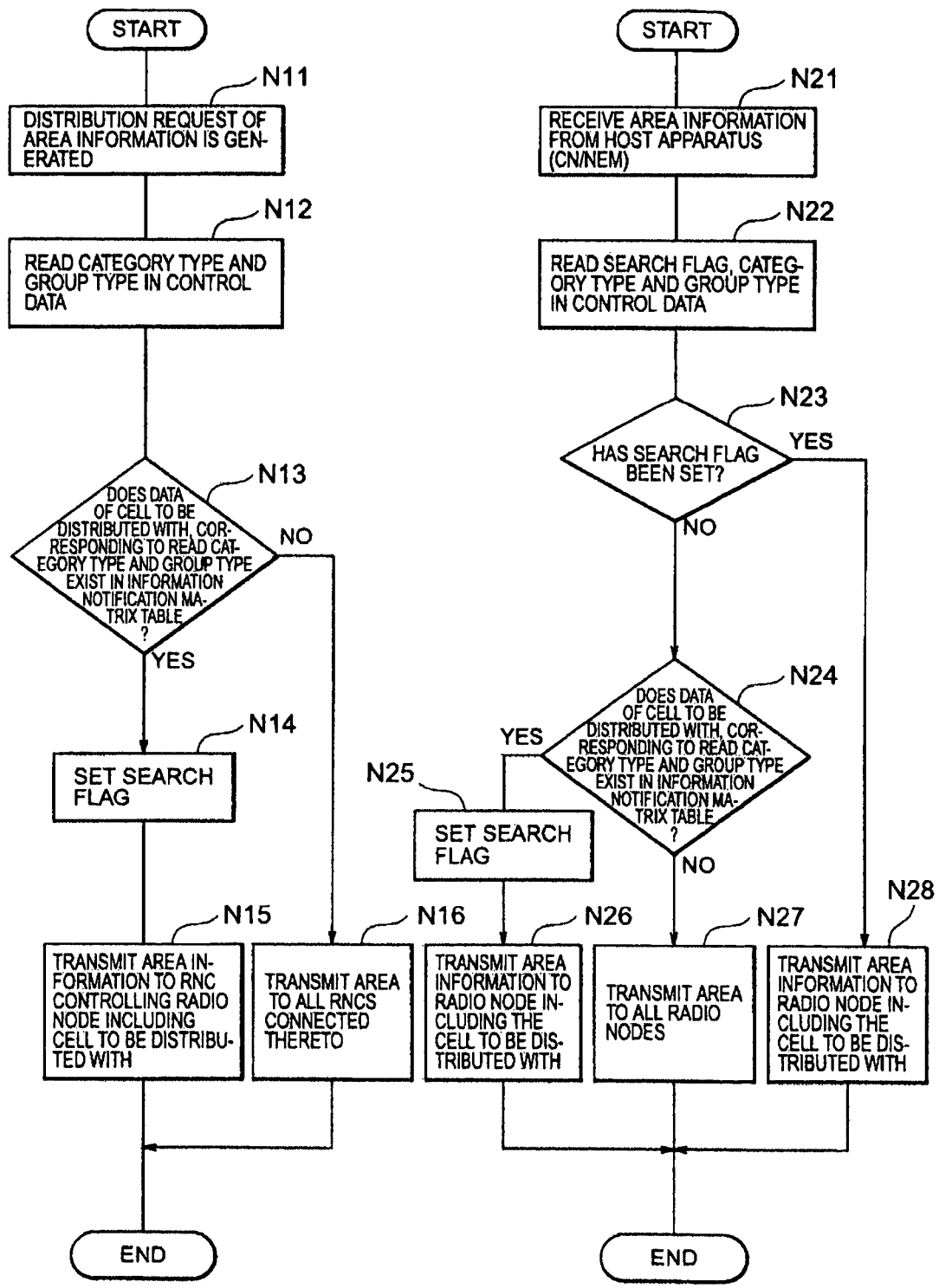
FIG. 36A shows an example of the processing flow executed by the mobile exchange network or the network element manager, and the radio Node controller shown in FIG. 35.
Figure 36B:
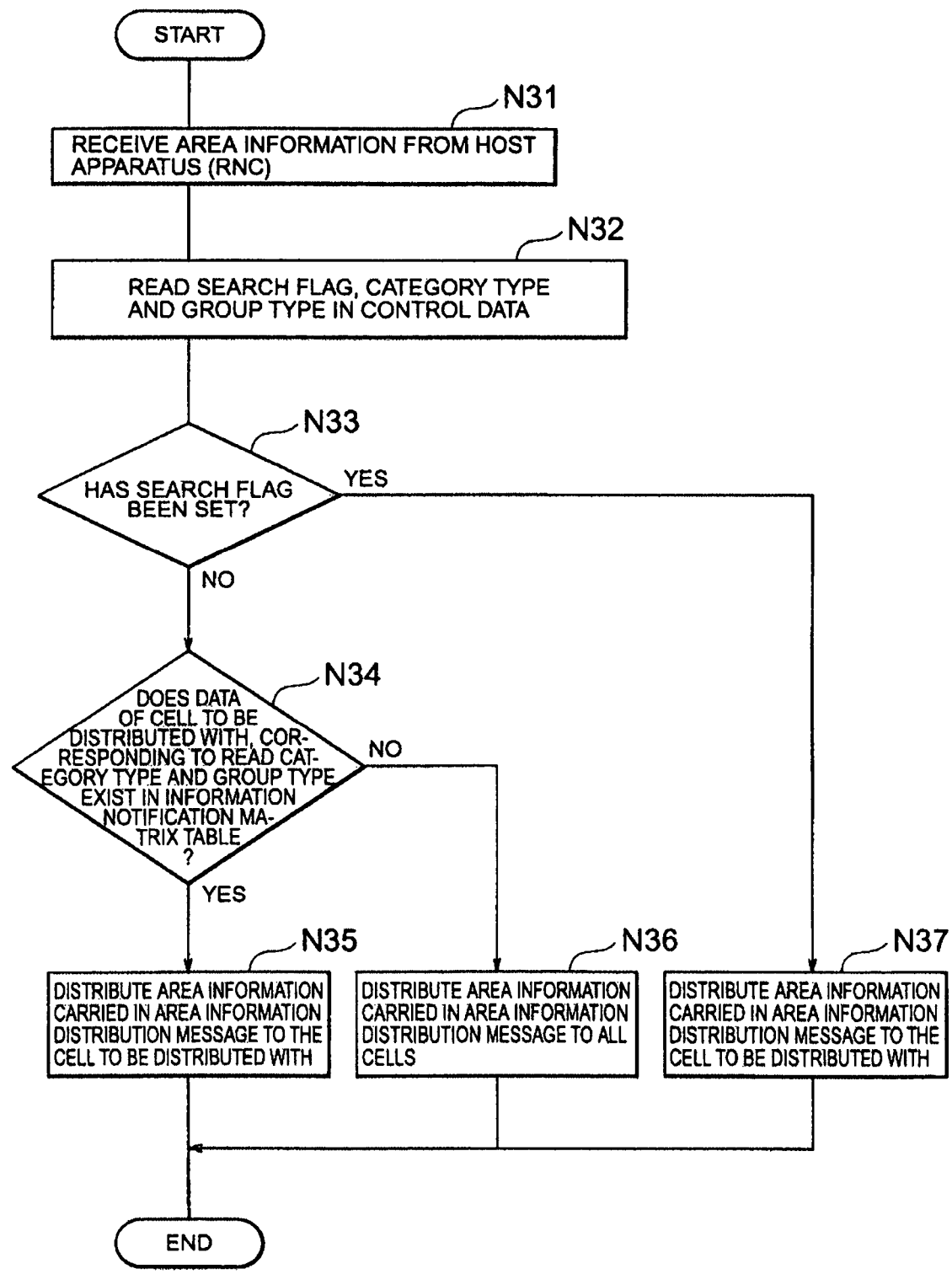
FIG. 36B shows an example of the processing flow executed by the radio Node shown in FIG. 35.

10 MOBILE EXCHANGE NETWORK (CN)
20-1, 20-2 RADIO NODE CONTROLLER (RNC)
30-1, 30-2 RADIO NODE (NODE B)
40 MOBILE TERMINAL (UE)
50 NETWORK ELEMENT MANAGER (NEM)
201, 301, 401 CONTROL MONITORING SECTION
202 RADIO NODE MONITORING SECTION
203, 302 REPORT SIGNAL GENERATING SECTION
204 SWITCH
205, 206, 305 LINE TERMINATION SECTION
303 BEARER SIGNAL TRANSFER SECTION
304, 407 RADIO TRANSMITTER-RECEIVER
402 MAN-MACHINE INTERFACE SECTION (MMI SECTION)
4021 DISPLAY
4022 INPUT KEY
4023 SPEAKER
4024 MICROPHONE
403 REPORT SIGNAL RECEIVING SECTION
404 MESSAGE SIGNAL TRANSMITTER-RECEIVER
405 VOICE SIGNAL TRANSMITTER-RECEIVER
406 DATA SIGNAL TRANSMITTER-RECEIVER

The invention claimed is:

1. A mobile communication system comprising:
a radio Node having a plurality of cells;
a radio Node controller connected to a plurality of radio Nodes so as to be able to communicate information with the radio Nodes;
a mobile exchange network or a network element manager connected to a plurality of radio Node controllers so as to be able to communicate information with the radio Node controllers; and
a mobile terminal receiving information distributed from the radio Node,
wherein area information different for each cell is distributed from the radio Node to the mobile terminals existing in the cell included in the radio Node,
wherein the area information is transmitted, together with control information including type information added according to a content of the area information, from the mobile exchange network or the network element manager to the radio Node controller, and from the radio Node controller to the radio Node,
wherein the cell to which each area information is to be distributed is determined based on the type information,
wherein the mobile exchange network or the network element manager being a distribution source of the area information,
wherein determination of the cell to which the area information is to be distributed based on the type information is performed by an arbitrary combination of the radio Node, the radio Node controller, and the mobile exchange network or the network element manager,
wherein an apparatus corresponding to an uppermost apparatus in the arbitrary combination determines the cell to which the area information is to be distributed based on the type information, sets up in the control information searched information indicating that the cell has been determined, and transmits the area information together with the control information to a lower apparatus, and
wherein the lower apparatus having received the area information checks if the searched information has been set up in the control information, and when the searched information has been set up, the lower apparatus distributes the area information to a lower apparatus including the cell to be distributed with the information or to the cell to be distributed with the information, without performing determination of the cell to be distributed with the information based on the type information, and when the searched information has not been set up, the lower apparatus performs determination of the cell to be distributed with the information based on the type information, sets up in the control information the searched information indicating that the cell has been determined, and distributes the area information to the lower apparatus including the cell to be distributed with the information or to the cell to be distributed with the information.

2. A mobile communication system comprising: a radio Node having a plurality of cells, wherein the radio node communicates with each cell of the plurality of cells; a radio Node controller connected to the radio Node so as to be able to communicate information with the radio Node;
a network element manager connected to the radio Node controller so as to be able to communicate information with the radio Node controller; and a mobile terminal receiving information distributed from the radio Node,
wherein area information different for each cell is distributed from the radio Node to the mobile terminals existing in the cell included in the radio Node, wherein the area information is transmitted, together with control information including type information added according to a content of the area information, from the network element manager to the radio Node controller, and from the radio Node controller to the radio Node,
wherein the cell to which each area information is to be distributed is determined based on the type information,
wherein an apparatus corresponding to either one of the radio Node, the radio Node controller, and the mobile exchange network or the network element manager performs determination of the cell to which the area information is to be distributed based on the type information,
wherein the apparatus corresponding to either one of the radio Node, the radio Node controller, and the mobile exchange network or the network element manager sets up in the control information searched information indicating that the cell has been determined, and transmits the area information together with the control information, and wherein a lower apparatus having received the area information checks if the searched information has been set up in the control information, and when the searched information has been set up, the lower apparatus distributes the area information to the lower apparatus including the cell to be distributed with the information or to the cell to be distributed with the information, without performing determination of the cell to be distributed with the information based on the type information, and when the searched information has not been set up, the lower apparatus performs determination of the cell to be distributed with the information based on the type information, sets up in the control information the searched information indicating that the cell has been determined, and distributes the area information to the lower apparatus including the cell to be distributed with the information or to the cell to be distributed with the information.

* * * * *